US012631810B2

(12) United States Patent
Kubo et al.

(10) Patent No.: US 12,631,810 B2
(45) Date of Patent: May 19, 2026

(54) LIGHT-ABSORBING COMPOSITION, LIGHT-ABSORBING FILM, METHOD FOR PRODUCING LIGHT-ABSORBING FILM, AND OPTICAL FILTER

(71) Applicant: Nippon Sheet Glass Company, Limited, Tokyo (JP)

(72) Inventors: Yuichiro Kubo, Tokyo (JP); Yoshihiro Takayanagi, Kanagawa (JP)

(73) Assignee: NIPPON SHEET GLASS COMPANY, LIMITED, Tokyo (JP)

(*) Notice: Subject to any disclaimer, the term of this patent is extended or adjusted under 35 U.S.C. 154(b) by 288 days.

(21) Appl. No.: 18/560,772

(22) PCT Filed: Apr. 11, 2022

(86) PCT No.: PCT/JP2022/017540
§ 371 (c)(1),
(2) Date: Nov. 14, 2023

(87) PCT Pub. No.: WO2022/239590
PCT Pub. Date: Nov. 17, 2022

(65) Prior Publication Data

US 2024/0377565 A1 Nov. 14, 2024

(30) Foreign Application Priority Data

May 14, 2021 (JP) ................................. 2021-082619

(51) Int. Cl.
*G02B 5/22* (2006.01)
*B05D 3/02* (2006.01)
*C08K 5/56* (2006.01)

(52) U.S. Cl.
CPC ................. *G02B 5/22* (2013.01); *B05D 3/02* (2013.01); *C08K 5/56* (2013.01)

(58) Field of Classification Search
CPC .......... G02B 5/22; G02B 5/208; G02B 5/223; B05D 3/02; B05D 3/0272; B05D 5/06;
(Continued)

(56) References Cited

U.S. PATENT DOCUMENTS 4,495,360 A * 1/1985 Anthony .................. C08J 7/046 428/447
4,525,426 A * 6/1985 Anthony ................ C08J 7/0427 525/266
(Continued)

FOREIGN PATENT DOCUMENTS

JP 2003107202 A 4/2003
JP 2007535708 A 12/2007
(Continued)

OTHER PUBLICATIONS

International Search Report and Written Opinion issued for International Patent Application No. PCT/JP2022/017540, Date of mailing: Jun. 28, 2022, 9 pages including English translation of Search Report.

*Primary Examiner* — William R Alexander
(74) *Attorney, Agent, or Firm* — HSML P.C.

(57) ABSTRACT

A light-absorbing composition according to the present invention includes: an ultraviolet absorber having a hydroxy group and a carbonyl group in a molecule; and a metal component. At least a portion of the metal component is bonded to an organic oxy group.

16 Claims, 23 Drawing Sheets

(58) Field of Classification Search

CPC ............ B05D 2203/35; B05D 2601/10; B05D 2601/22; B05D 2601/28; C08K 5/56; C08K 5/132; C08K 3/08; C08L 83/04; C08L 101/00

USPC ........................................................ 359/885

See application file for complete search history.

(56) References Cited

U.S. PATENT DOCUMENTS

| | | | | |
|---|---|---|---|---|
| 6,559,216 | B1 * | 5/2003 | Zhao | C08K 5/005 524/366 |
| 11,173,516 | B2 * | 11/2021 | Takai | B05D 7/24 |
| 2017/0021383 | A1 * | 1/2017 | Takai | B05B 5/0426 |
| 2018/0355149 | A1 * | 12/2018 | Sasaki | C09B 67/0034 |
| 2019/0346601 | A1 | 11/2019 | Kubo et al. | |
| 2020/0158930 | A1 | 5/2020 | Kubo | |
| 2022/0056187 | A1 | 2/2022 | Hanasaki et al. | |
| 2022/0112355 | A1 | 4/2022 | Sekiguchi et al. | |
| 2023/0257573 | A1 * | 8/2023 | Nielsen | C09D 5/14 106/287.23 |

FOREIGN PATENT DOCUMENTS

| | | | |
|---|---|---|---|
| JP | 6232161 | B1 | 11/2017 |
| JP | 2019014707 | A | 1/2019 |
| JP | 2020154320 | A | 9/2020 |
| JP | 2021006600 | A | 1/2021 |
| WO | 2005111702 | A1 | 11/2005 |
| WO | 2018088561 | A1 | 5/2018 |
| WO | 2020129930 | A1 | 6/2020 |

* cited by examiner

LIGHT-ABSORBING COMPOSITION, LIGHT-ABSORBING FILM, METHOD FOR PRODUCING LIGHT-ABSORBING FILM, AND OPTICAL FILTER

TECHNICAL FIELD

The present invention relates to a light-absorbing composition, a light-absorbing film, a method for producing a light-absorbing film, and an optical filter.

BACKGROUND ART

In imaging apparatuses employing a solid-state image sensing device such as a charge coupled device (CCD) or a complementary metal oxide semiconductor (CMOS), any of various optical filters is disposed ahead of the solid-state image sensing device in order to obtain an image with good color reproduction. Solid-state image sensing devices generally have spectral sensitivity over a wider wavelength range than a visual sensitivity region of humans which corresponds to a region of visible light. Thus, a technique is known in which an optical filter blocking a portion of infrared light or ultraviolet light is disposed ahead of a solid-state image sensing device in an imaging apparatus. The technique allows the spectral sensitivity of the solid-state image sensing device to approximate to the visual sensitivity of humans.

It has been common for such an optical filter to block infrared light or ultraviolet light by means of light reflection by a dielectric multilayer film. In recent years, optical filters including a film containing a light absorber have been attracting attention. The transmittance properties of an optical filter including a film containing a light absorber are unlikely to be dependent on the incident angle, and this makes it possible to obtain favorable images with less color change even when light is obliquely incident on the optical filter in imaging apparatuses. Good backlit or nightscape images are easily obtainable using light-absorbing type optical filters not including a light-reflecting film because such optical filters can reduce occurrence of ghosting and flare caused by multiple reflection in a light-reflecting film. Moreover, optical filters including a light-absorber-including film are advantageous also in terms of size reduction and thickness reduction of imaging apparatuses.

Light absorbers including a phosphonic acid and a copper ion are known as light absorbers for such use. For example, Patent Literature 1 describes an optical filter including a light-absorbing layer including a light absorber including a copper ion and a phosphonic acid (phenyl-based phosphonic acid) having a phenyl group or a halogenated phenyl group.

Patent Literature 2 describes an optical filter including a UV-IR absorbing layer capable of absorbing infrared light and ultraviolet light. The UV-IR absorbing layer includes a UV-IR absorber including a phosphonic acid and a copper ion. A UV-IR absorbing composition includes, for example, a phenyl-based phosphonic acid and a phosphonic acid (an alkyl-based phosphonic acid) having an alkyl group or a halogenated alkyl group so that the optical filter will satisfy predetermined optical properties.

Patent Literature 3 describes an ophthalmic device including a violet-light vertical cut-off filter. The violet-light vertical cut-off filter abruptly absorbs light approximately in the wavelength range of 400 nm to 450 nm.

CITATION LIST

Patent Literature

Patent Literature 1: WO 2018/088561
Patent Literature 2: JP 6232161 B1
Patent Literature 3: JP 2007-535708 A

SUMMARY OF INVENTION

Technical Problem

The techniques described in Patent Literatures 1 and 2 leave room for reexamination in terms of light absorption properties in a short wavelength region around a wavelength of 400 nm. Additionally, the violet-light vertical cut-off filter described in Patent Literature 3 is thought to have a low visible transmittance in the wavelength range of 500 to 650 nm. Therefore, the present invention provides a light-absorbing composition, a light-absorbing film, and an optical filter each having an advantage in reproducing the visual sensitivity of humans and, particularly, improving the light absorption properties in a short wavelength region. The present invention also provides a method for producing such a light-absorbing film.

Solution to Problem

The present invention provides a light-absorbing composition including:

an ultraviolet absorber having a hydroxy group and a carbonyl group in a molecule; and a metal component, wherein at least a portion of the metal component is bonded to an organic oxy group.

The present invention also provides a light-absorbing film including:

an ultraviolet absorber having a hydroxy group and a carbonyl group in a molecule; and a metal component, wherein at least a portion of the metal component is bonded to an organic oxy group.

The present invention also provides a method for producing a light-absorbing film, the method including curing the above light-absorbing composition by heating at a temperature of 120° C. or higher.

The present invention also provides an optical filter including the above light-absorbing film.

Advantageous Effects of Invention

The above light-absorbing composition has an advantage in reproducing the visual sensitivity of humans and, particularly, improving the light absorption properties in a short wavelength region. Moreover, the above light-absorbing film and the above optical filter have an advantage in reproducing the visual sensitivity of humans and, particularly, improving the light absorption properties in a short wavelength region.

DESCRIPTION OF EMBODIMENTS

Figure 1:
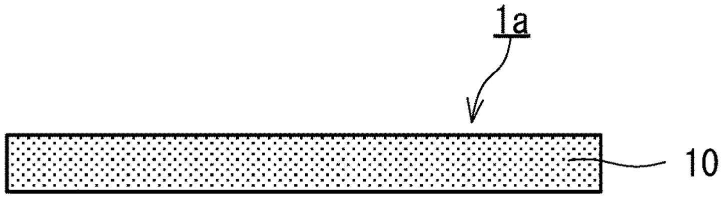
FIG. 1 is a cross-sectional view showing an example of a light-absorbing film according to the present invention.

If an optical filter for an imaging apparatus including a solid-state image sensing device can effectively absorb light in a short wavelength region around a wavelength of 400 nm, the optical filter can have a higher value in terms of reproducing the visual sensitivity of humans. As to the optical filter described in Patent Literature 1, the wavelength which lies in the wavelength range of 350 nm to 450 nm and at which the spectral transmittance is 50% is less than 400 nm. As to the optical filter described in Patent Literature 2, the wavelength which lies in the wavelength range of 350 nm to 450 nm and at which the spectral transmittance is 50% is in the wavelength range of about 390 nm to 415 nm. Judging from these facts, it cannot be said that the optical filters described in Patent Literatures 1 and 2 have an advantage in effectively absorbing light in a short wavelength region around a wavelength of 400 nm. Although the violet-light vertical cut-off filter described in Patent Literature 3 may be able to effectively absorb light in a short wavelength region around a wavelength of 400 nm, the filter is thought to have a low visible transmittance in the wavelength range of 500 to 650 nm.

Therefore, the present inventors made intensive studies to create a light-absorbing composition having an advantage in reproducing the visual sensitivity of humans and, particularly, effectively absorbing light in a short wavelength region around a wavelength of 400 nm. Through much trial and error, the present inventors have newly found that a light-absorbing composition including a given ultraviolet absorber and a given metal component has an advantage in effectively absorbing light in a short wavelength region, and have completed the present invention.

Embodiments of the present invention will be described hereinafter. The following description relates to examples of the present invention. The present invention is not limited to the embodiments given below.

The light-absorbing composition according to the present invention includes: an ultraviolet absorber having a hydroxy group and a carbonyl group in a molecule; and a metal component. Additionally, at least a portion of the metal component is bonded to an organic oxy group. Typically, at least a portion of the metal component is bonded to an oxygen atom in the organic oxy group. A light-absorbing film and an optical filter produced using this light-absorbing composition easily absorb light in a wavelength region around 400 nm and have an advantage in reproducing the visual sensitivity of humans.

Examples of requirements for advantageous ultraviolet absorbers include: having an appropriate light absorption range and an appropriate light transmission range; having photochemical stability; having a weak photosensitization effect as far as the photosensitization effect exerts no influence on use of an ultraviolet absorber; and having thermochemical stability. From the above viewpoints, using a photoexcitation-induced transfer reaction (a hydrogen abstraction reaction in a molecule) of a hydrogen atom in the hydroxy group in a molecule is conceivable as a mechanism of light absorption by the ultraviolet absorber. Examples of an ultraviolet absorber that exhibits such a mechanism include compounds such as hydroxybenzophenone, salicylic acid, hydroxyphenyl benzotriazole, hydroxyphenyl triazine, and a substituted acrylonitrile. In hydroxybenzophenone and salicylic acid, a reaction involving transfer of a hydrogen atom between a hydroxy group and a carbonyl group in a molecule relates to absorption of light such as ultraviolet light. On the other hand, in hydroxyphenyl benzotriazole, hydroxyphenyl triazine, and a substituted acrylonitrile, a reaction involving transfer of a hydrogen atom between a hydroxy group and a nitrogen atom in a molecule relates to absorption of light such as ultraviolet light. It is inferred that since these ultraviolet absorbers have a hydroxy group having an unshared electron pair in a molecule, these ultraviolet absorbers undergo an interaction, such as partial complexation, with a coexistent metal component or a coexistent hydrogen donor. A case where an ultraviolet absorber having a hydroxy group is present independently in a system including an ultraviolet-absorber-including light-absorbing composition, a cured product thereof, or the like and a case where an ultraviolet absorber having a hydroxy group is coexistent with a metal component or a hydrogen donor in a system as described above are compared. According to the comparison, optical properties such as light absorption spectra and light transmission spectra of the light-absorbing compositions, the cured products, or the like are different, which supports the above inference. According to the comparison, a phenomenon in which a light absorption band in the wavelength range of 300 to 500 nm shifts toward the long wavelength side occurs, in particular, in a light-absorbing film obtained by curing a light-absorbing composition including a metal component and an ultraviolet absorber having a hydroxy group and a carbonyl group in a molecule. Such a light-absorbing film has an advantage in effectively and appropriately absorbing light with a wavelength around 400 nm. It should be noted that the shifting of the light absorption band toward the long wavelength side can bring to the surface, for example, a phenomenon in which the maximum absorption wavelength in the wavelength range of 300 nm to 500 nm in a transmission spectrum shifts toward the long wavelength side or in which the wavelength (UV cut-off wavelength) at which the transmittance is 50% shifts toward the long wavelength side. As can be understood from the above, according to the light-absorbing composition of the present invention, a light-absorbing film being a cured product of the light-absorbing composition, and an optical filter including the light-absorbing film, the inherent absorption properties of the ultraviolet absorber are adjusted so that light in a short wavelength region can be effectively absorbed. Consequently, the light-absorbing film and the optical filter are likely to have spectral transmittances more appropriate for the use with, for example, a solid-state image sensing device.

As described above, in the light-absorbing composition, at least a portion of the metal component is bonded to the organic oxy group, and is typically present in an M-O-R state. The symbol R represents a given organic group, and is, for example, an alkyl group, an aryl group, or a vinyl group.

Disposition of the hydroxy group and the carbonyl group in the ultraviolet absorber is not particularly limited. In the ultraviolet absorber, the hydroxy group and the carbonyl group are desirably disposed with one to three atoms interposed between the hydroxy group and the carbonyl group. In this case, in the ultraviolet absorber, a hydrogen atom is thought to be likely to transfer between the hydroxy group and the carbonyl group. This is likely to effectively cause the phenomenon in which the light absorption band in the wavelength range of 300 to 500 nm shifts toward the long wavelength side. Consequently, it is more reliable that a light-absorbing film obtained by curing the light-absorbing composition is likely to absorb light with a wavelength around 400 nm effectively and appropriately.

A transmittance $T_{400}$ at a wavelength of 400 nm in a transmission spectrum measured for a light-absorbing film at an incident angle of 0° is, for example, 10% or less, the light-absorbing film being obtained by curing the light-absorbing composition according to the present invention. Consequently, it is more reliable that a light-absorbing film obtained by curing the light-absorbing composition is likely to absorb light with a wavelength around 400 nm effectively and appropriately.

The transmittance $T_{400}$ is desirably 3% or less, more desirably 1% or less.

The ultraviolet absorber is not limited to a particular ultraviolet absorber as long as the ultraviolet absorber has a hydroxy group and a carbonyl group in a molecule. The ultraviolet absorber is desirably a compound unlikely to form an aggregate when mixed with the metal component.

The ultraviolet absorber desirably includes a benzophenone-based compound represented by the following formula (A1). In this case, it is more reliable that a light-absorbing film and an optical filter produced using the light-absorbing composition are likely to effectively absorb light in a short wavelength region around a wavelength of 400 nm.

(A1)

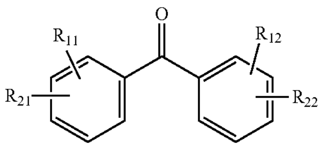

In the formula (A1), at least one of $R_{11}$, $R_{12}$, $R_{21}$, and $R_{22}$ is a hydroxy group. In the formula (A1), in the case where the $R_{11}$, the $R_{12}$, the $R_{21}$, or the $R_{22}$ is a functional group other than a hydroxy group, a plurality of the $R_{11}$s, a plurality of the $R_{12}$s, a plurality of the $R_{21}$s, or a plurality of the $R_{22}$s are optionally present and at least one of the $R_{11}$, the $R_{12}$, the $R_{21}$, and the $R_{22}$ are optionally absent.

In the case where the $R_{11}$, the $R_{12}$, the $R_{21}$, or the $R_{22}$ is a functional group other than a hydroxy group, the functional group is, for example, a carboxyl group, an aldehyde group, a halogen atom, an alkyl group having 1 to 12 carbon atoms, an alkyl group which has 1 to 12 carbon atoms and in which one or more hydrogen atoms are substituted by a halogen atom, an alkoxy group having 1 to 12 carbon atoms, or an alkoxy group which has 1 to 12 carbon atoms and in which one or more hydrogen atoms are substituted by a halogen atom.

The ultraviolet absorber more desirably includes a benzophenone-based compound represented by the following formula (A2). In this case, it is even more reliable that a light-absorbing film and an optical filter produced using the light-absorbing composition are likely to effectively absorb light in a short wavelength region around a wavelength of 400 nm.

(A2)

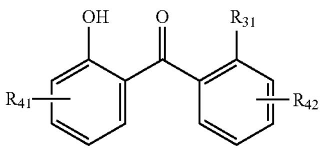

In the formula (A2), $R_{31}$ is a hydrogen atom, a hydroxy group, a carboxyl group, an aldehyde group, a halogen atom, a halogen-containing group, an alkyl group having 1 to 12 carbon atoms, or an alkoxy group having 1 to 12 carbon atoms. In the formula (A2), $R_{41}$ and $R_{42}$ are each optionally a hydroxy group, a carboxyl group, an aldehyde group, a halogen-containing group, an alkyl group having 1 to 12 carbon atoms, an aryl group having 6 to 12 carbon atoms, or an alkoxy group having 1 to 12 carbon atoms, or the $R_{41}$ and the $R_{42}$ are optionally absent. In the formula (A2), a plurality of the $R_{41}$s are optionally present and a plurality of the $R_{42}$s are optionally present. The halogen-containing group may be a halogenated alkyl group in which at least one hydrogen atom in an alkyl group is substituted by a halogen atom. The halogen-containing group may be a halogenated aryl group in which at least one hydrogen atom in an aryl group is substituted by a halogen atom. The halogen-containing group may be a halogenated alkoxy group in which at least one hydrogen atom in an alkoxy group is substituted by a halogen atom.

The benzophenone-based compound represented by the formula (A1) or (A2) is not limited to a particular compound. The benzophenone-based compound is, for example, at least one selected from the group consisting of 2,2'-dihydroxy-4,4'-dimethoxybenzophenone, 2,2',4,4'-tetrahydroxybenzophenone, 2-hydroxy-4-methoxybenzophenone, 2-hydroxy-4-methoxy-4'-chlorobenzophenone, 2-hydroxy-4-n-octoxybenzophenone, 2-hydroxy-4-dodecyloxybenzophenone, 2,4-dihydroxybenzophenone, 2-hydroxy-4-methoxy-2'-carboxybenzophenone, 2,2'-dihydroxy-4-methoxybenzophenone, 2,2'-dihydroxy-4-n-octoxybenzophenone, 2-hydroxy-5-chlorobenzophenone, and 2,4-dibenzoylresorcin.

The ultraviolet absorber may include a salicylic-acid-based compound represented by the following formula (B). In this case, it is more reliable that a light-absorbing film and an optical filter produced using the light-absorbing composition are likely to effectively absorb light in a short wavelength region around a wavelength of 400 nm.

(B)

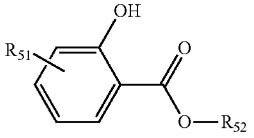

In the formula (B), $R_{51}$ is optionally a hydroxy group, a carboxy group, a halogen-containing group, an alkyl group having 1 to 12 carbon atoms, an aryl group having 6 to 12 carbon atoms, or an alkoxy group having 1 to 12 carbon atoms. In the formula (B), a plurality of the $R_{51}$s are optionally present or the $R_{51}$ is optionally absent. In the formula (B), $R_{52}$ is a hydrogen atom, an aryl group, or a halogenated aryl group in which one or more hydrogen atoms are substituted by a halogen atom. The halogen-containing group may be a halogenated alkyl group in which at least one hydrogen atom in an alkyl group is substituted by a halogen atom. The halogen-containing group may be a halogenated aryl group in which at least one hydrogen atom in an aryl group is substituted by a halogen atom. The halogen-containing group may be a halogenated alkoxy group in which at least one hydrogen atom in an alkoxy group is substituted by a halogen atom.

The salicylic-acid-based compound represented by the formula (B) is not limited to a particular compound. The salicylic-acid-based compound represented by the formula (B) includes, for example, at least one selected from the group consisting of phenyl salicylate, 4-butylphenyl salicylate, and octylphenyl salicylate.

The metal component is not limited to a particular metal component. The metal component is typically a thermally and chemically stable component not forming an aggregate in the light-absorbing composition and a light-absorbing film produced using the light-absorbing composition. Moreover, the metal component is typically a component capable of interacting with the above-described ultraviolet absorber.

The light-absorbing composition may include a given compound including the metal component. The compound is, for example, a complex. The light-absorbing composition desirably includes an alkoxide including the metal component.

The metal component includes, for example, at least one selected from the group consisting of Li, Na, Mg, Ca, Sr, Ba, Ge, Sn, Pb, Al, Ga, In, TI, Zn, Cd, Cu, Ag, Au, Ni, Pd, Pt, Co, Rh, Ir, Fe, Mn, Cr, Mo, W, V, Nb, Ta, Ti, and Zr. In this case, the metal component is likely to interact with the above-described ultraviolet absorber.

An ultraviolet absorber content in the light-absorbing composition is not limited to a particular value. The content is, for example, 0.05 to 10%, desirably 0.1 to 8%, more desirably 0.2 to 6% on a mass basis. The content may be 3% or less, 2% or less, or 1% or less.

A metal component content in light-absorbing composition is not limited to a particular value. The content is, for example, 0.005 to 5%, desirably 0.01 to 3%, more desirably 0.02 to 2% on a mass basis.

A ratio of the ultraviolet absorber content to the metal component content in the light-absorbing composition is not limited to a particular value. The ratio is, for example, 0.05 to 300, desirably 0.07 to 280, more desirably 0.1 to 260 on a mass basis. The ratio may be 240 or less, 200 or less, 150 or less, 100 or less, 50 or less, 40 or less, or 30 or less. Furthermore, a molar ratio of the ultraviolet absorber to the metal component is not limited to a particular value. The molar ratio is, for example, 0.001 to 40, desirably 0.005 to 35, more desirably 0.01 to 30. The molar ratio may be 25 or less, 20 or less, 15 or less, 10 or less, 5 or less, or 3 or less. In the above cases, it is more reliable that a light-absorbing film and an optical filter produced using the light-absorbing composition are likely to effectively absorb light in a short wavelength region around a wavelength of 400 nm.

The light-absorbing composition may further include a curable resin. In this case, a light-absorbing film including the ultraviolet absorber and the metal component can be formed by curing the resin in the light-absorbing composition. Moreover, an article including a substrate and having desired light-absorption properties can be produced, for example, by applying the light-absorbing composition to a given substrate and curing the resin.

The curable resin is not limited to a particular resin. The curable resin is, for example, an acrylic resin, an epoxy resin, a polycarbonate resin, a polyether resin, a polyester resin, a cyclic olefin resin, a silicone resin, or a polyvinyl acetal (PVA) resin.

The resin is desirably a silicone resin. The resin is more desirably a silicone resin containing an aryl group such as a phenyl group. If the resin included in a light-absorbing film is excessively hard (rigid), the likelihood of cure-shrinkage-induced cracking during production of the light-absorbing film increases with increasing thickness of a layer including the resin. If the resin is the silicone resin containing an aryl group, a light-absorbing film made of the light-absorbing composition is likely to have high crack resistance. The silicone resin containing an aryl group tends to have a high compatibility with or a high dispersibility in the metal component and the ultraviolet absorber, and reduces the likelihood of aggregation of these components. Specific examples of the silicone resin include KR-255, KR-300, KR-2621-1, KR-211, KR-311, KR-216, KR-212, KR-251, and KR-5230. All of these are silicone resins manufactured by Shin-Etsu Chemical Co., Ltd. Silicone resins tend to have a high thermal resistance. In the case where the light-absorbing composition includes the silicone resin, a light-absorbing film obtained using the light-absorbing composition also includes the silicone resin and can be thermally resistant. From this point of view as well, inclusion of the silicone resin as the curable resin in the light-absorbing composition is advantageous.

In the light-absorbing composition, a ratio of the ultraviolet absorber content to a solids content in the resin is not limited to a particular value. The ratio is, for example, 0.1% to 10%, desirably 0.2% to 5%, more desirably 0.4% to 3% on a mass basis. This is advantageous in reducing occurrence of problems such as weather resistance reduction and bleed out.

The resin may be desirably a PVA resin. More desirably, the PVA resin is a polyvinyl butyral (PVB) resin or a polyvinyl formal (PVF) resin. These resins are each obtained by a rection between polyvinyl alcohol and aldehyde. The PVB resin and the PVF resin include, in addition to a butyral group or a formal group, an acetyl group and a hydroxy group each bonded to a vinyl group. These resins can have the advantage of having a high affinity for the metal component owing to a portion of the hydroxy group included therein. The PVB resin and the PVF resin can include a relatively large amount of the ultraviolet absorber, and a cured resin composition including the PVB resin or the PVF resin is likely to have a high flexibility and a high durability.

Specific examples of the PVB resin include S-LECs KS-1, KS-3, KS-5, KX-1, BL-1, BL-S, and BX-L. All of these are PVA resins (PVB resins) manufactured by Sekisui Chemical Co., Ltd., and "S-LEC" is a registered trademark. Specific examples of the PVB resin include Mowitals B20H, B30T, B30H, and B45H. All of these are PVA resins (PVB resins) manufactured by KURARAY CO., LTD., and "Mowital" is a registered trademark. Specific examples of the PVF resin include Vinylec K and Vinylec H. All of these are PVA resins (PVF resins) manufactured by JNC Corporation, and "Vinylec" is a registered trademark. In the case where the light-absorbing composition includes the PVA resin, a light-absorbing film obtained using the light-absorbing composition also includes the PVA resin and is likely to have a high flexibility and a high durability. High transparency and high yellowing resistance can be achieved by, in particular, PVB resins, which have many track records of use as intermediate films of windshields of automobiles.

PVB resins and PVF resins, including the products mentioned above as specific examples, are commonly available in the form of powder. To include the PVB resin or the PVF resin in the resin composition in liquid form, an adequate amount of the PVB resin or the PVF resin is dissolved in, for example, (I) an alcohol-based solvent such as methanol, ethanol, n-propanol, isopropanol, or n-butanol, (II) an aromatic-based solvent such as toluene, cyclopentanone, or xylene, (III) a ketone-based solvent such as methyl ethyl ketone (MEK), methyl butyl ketone (MBK), or ethyl acetate, (IV) an ester-based solvent such as ethyl acetate, n-propyl acetate, isopropyl acetate, or isobutyl acetate, (V) a glycol-ester-based organic solvent such as propylene glycol monomethyl ether acetate, or (VI) a glycol-ether-based organic solvent such as propylene glycol monomethyl ether or dipropylene glycol methyl ether. One of these organic solvents may be used alone, or two or more of these organic solvents may be used in combination. Among these, the organic solvent is desirably the aromatic-based organic solvent, the alcohol-based organic solvent, or a mixture thereof, and more desirably a mixture of the aromatic-based organic solvent and the alcohol-based organic solvent, because these organic solvents have high transparency and resin solutions containing these organic solvents are stable over time. In these cases, the aromatic-based organic solvent is desirably toluene, and the alcohol-based organic solvent is desirably ethanol or propanol, and more desirably ethanol. Moreover, in the case of using a mixture of the aromatic-based organic solvent and the alcohol-based organic solvent as the organic solvent, a ratio of the mass of the aromatic-based organic solvent to the mass of the alcohol-based organic solvent is preferably 1:0.1 to 10, more preferably 1:0.5 to 5. The PVB resin is desirably used in view of the solubility in various solvents.

The light-absorbing composition's including the ultraviolet absorber having the hydroxy group and the carbonyl group in a molecule, the metal component, and the PVA resin is advantageous in terms of reducing bleed out of the ultraviolet absorber. In the case where the ultraviolet absorber included in the PVB resin is an additive ultraviolet absorber, a phenomenon such as chalking of the ultraviolet absorber on a surface of a light-absorbing film or an optical film or emergence of the ultraviolet absorber onto the surface can occur depending on the environment of use and conditions of the light-absorbing film production method. When the light-absorbing composition or a light-absorbing film includes the ultraviolet absorber having the hydroxy group and the carbonyl group in a molecule, the metal component, and the PVA resin, the ultraviolet absorber bonded to the metal component, for example, by partial complexation is likely to be bonded to some hydroxy groups in the PVA resin via the metal component. As a result, the ultraviolet absorber is relatively strongly held in the resin matrix, and bleed out of the ultraviolet absorber is likely to be reduced.

An example of the method for preparing the light-absorbing composition will be described. The ultraviolet absorber is added into a given solvent and the mixture was stirred to prepare an ultraviolet absorber solution. Additionally, a compound including the metal component and the resin are mixed and stirred to prepare a metal-component-including liquid composition. Given amounts of the ultraviolet absorber solution and the metal-component-including liquid composition are mixed and stirred, so that the light-absorbing composition can be prepared.

The light-absorbing composition may be a liquid composition including the PVB resin. The liquid composition commonly includes a solvent that allows the PVB to dissolve or disperse therein. The solvent is not limited to a particular solvent; however, in the case of selecting a solvent that allows the PVB to dissolve therein, the solvent can be an organic solvent in view of the solubility of the PVB. The PVB concentration in the liquid composition is not limited to a particular value. The concentration is determined as appropriate in view of the solubility of the PVB in the solvent. The concentration is, for example, approximately 10 to 50 mass %.

For example, a light-absorbing film 10 shown in FIG. 1 can be provided using the light-absorbing composition. The light-absorbing film 10 can be obtained, for example, by curing a coating film made of the light-absorbing composition. The light-absorbing film 10 includes: an ultraviolet absorber having a hydroxy group and a carbonyl group in a molecule; and a metal component. In the light-absorbing film 10, at least a portion of the metal component is bonded to an organic oxy group. At least a portion of the metal component is bonded to an oxygen atom of the organic oxy group. Because of this, the light-absorbing film 10 is likely to effectively absorb light in a short wavelength region around a wavelength of 400 nm.

As described above, in the light-absorbing composition, at least a portion of the metal component is bonded to the organic oxy group, and is typically present in an M-O-R state. The symbol R represents a given organic group, and is, for example, an alkyl group, an aryl group, or a vinyl group.

In the ultraviolet absorber of the light-absorbing film 10, the hydroxy group and the carbonyl group are desirably disposed with one to three atoms interposed between the hydroxy group and the carbonyl group. In this case, it is more reliable that the light-absorbing film 10 is likely to absorb light with a wavelength around 400 nm effectively and appropriately.

The ultraviolet absorber in the light-absorbing film 10 includes, for example, a benzophenone-based compound represented by the above formula (A1). In this case, it is more reliable that the light-absorbing film 10 is likely to effectively absorb light in a short wavelength region around a wavelength of 400 nm.

The ultraviolet absorber in the light-absorbing film 10 desirably includes a benzophenone-based compound represented by the above formula (A2). In this case, it is even more reliable that the light-absorbing film 10 is likely to effectively absorb light in a short wavelength region around a wavelength of 400 nm.

The ultraviolet absorber in the light-absorbing film 10 includes, for example, a salicylic-acid-based compound represented by the above formula (B). In this case, it is more reliable that the light-absorbing film 10 is likely to effectively absorb light in a short wavelength region around a wavelength of 400 nm.

The light-absorbing film 10 includes, for example, an alkoxide including the metal component.

The metal component in the light-absorbing film 10 includes, for example, at least one selected from the group consisting of Li, Na, Mg, Ca, Sr, Ba, Ge, Sn, Pb, Al, Ga, In, TI, Zn, Cd, Cu, Ag, Au, Ni, Pd, Pt, Co, Rh, Ir, Fe, Mn, Cr, Mo, W, V, Nb, Ta, Ti, and Zr.

An ultraviolet absorber content in the light-absorbing film 10 is not limited to a particular value. The content is, for example, 0.1% to 10%, desirably 0.2% to 5%, more desirably 0.4% to 3% on a mass basis.

A metal component content in the light-absorbing film 10 is not limited to a particular value. The content is, for example, 0.02% to 5%, desirably 0.04% to 4%, more desirably 0.06% to 3.5% on a mass basis.

A thickness of the light-absorbing film 10 is not limited to a particular value. The thickness of the light-absorbing film 10 is, for example, 10 μm to 600 μm, and may be 10 μm to 400 μm or 10 μm to 300 μm.

The transmittance $T_{400}$ at a wavelength of 400 nm in a transmission spectrum measured for the light-absorbing film 10 at an incident angle of 0° is, for example, 5% or less.

In production of the light-absorbing film 10, the method for curing the light-absorbing composition is not limited to a particular method. For example, the light-absorbing composition may be cured by heating at a given temperature. In this case, the given temperature is not limited to a particular temperature as long as the light-absorbing composition can be cured at the given temperature. The given temperature is, for example, 85° C. or higher, desirably 120° C. or higher, more desirably 140° C. or higher, even more desirably 150 to 160° C. In these cases, it is likely that deterioration of the ultraviolet absorber is prevented and the light-absorbing film 10 has a good thermal resistance.

The transmittance $T_{400}$ is desirably 3% or less, more desirably 1% or less.

As shown in FIGS. 1 and 2, for example, optical filters 1*a* and 1*b* including the light-absorbing film 10 can be provided. The optical filters 1*a* and 1*b* are likely to effectively absorb light in a short wavelength region around a wavelength of 400 nm.

A maximum transmittance $T^{M}_{300\text{-}380}$ in a wavelength range of 300 to 380 nm in a transmission spectrum measured for each of the optical filters 1*a* and 1*b* at an incident angle of 0° is, for example, 3% or less. In this case, the optical filters are likely to effectively absorb light in a short wavelength region around a wavelength of 400 nm.

The maximum transmittance $T^{M}_{300\text{-}380}$ is desirably 2% or less, more desirably 1% or less.

In terms of the transmission spectra measured for the optical filters 1*a* and 1*b* at an incident angle of 0°, a wavelength which lies in a wavelength range of 300 to 520 nm and at which a transmittance is 50% is defined as an ultraviolet cut-off wavelength $\lambda_{UV}$. The optical filters 1*a* and 1*b* satisfy, for example, a requirement 405 nm$\le\lambda_{UV}\le$500 nm. Because of this, the light-absorbing film 10 is likely to effectively absorb light in a short wavelength region around a wavelength of 400 nm.

The optical filters 1*a* and 1*b* desirably satisfy a requirement 405 nm$\le\lambda_{UV}\le$490 nm, more desirably a requirement 405 nm$\le\lambda_{UV}\le$480 nm.

An average transmittance $T^{A}_{550\text{-}570}$ in a wavelength range of 550 to 570 nm in the transmission spectrum measured for each of the optical filters 1*a* and 1*b* at an incident angle of 0° is, for example, 87% or more. In this case, the optical filters 1*a* and 1*b* can appropriately transmit visible light and therefore have an advantage in reproducing the visual sensitivity of humans.

The average transmittance $T^{A}_{550\text{-}570}$ is desirably 88% or more, more desirably 90% or more.

Transmission spectra obtained by allowing light in the wavelength range of 300 nm to 1200 nm to be incident on the optical filters 1*a* and 1*b* at an incident angle of 0° may satisfy the following requirements (i-a), (ii-a), (iii-a), (iv-a), (v-a), and (vi-a).

(i-a) The maximum transmittance $T^{M}_{300-380}$ in the wavelength range of 300 nm to 380 nm is 3% or less.

(ii-a) The transmittance $T_{400}$ at a wavelength of 400 nm is 5% or less.

(iii-a) A transmittance $T_{410}$ at a wavelength of 410 nm is 10% or less.

(iv-a) The wavelength $\lambda_{UV}$ [nm] which lies in the wavelength range of 350 nm to 500 nm and at which the transmittance is 50% lies in the range of 405 nm to 490 nm.

(v-a) The average transmittance $T^{A}_{550-570}$ in the wavelength range of 550 nm to 570 nm is 87% or more.

(vi-a) A ratio $T^{0}_{UV+}/T^{0}_{UV-}$ of a transmittance $T^{0}_{UV+}$ at a wavelength of $(\lambda_{UV}+10)$ nm to a transmittance $T^{0}_{UV-}$ at a wavelength of $(\lambda_{UV}-10)$ nm is 1.8 or more.

When satisfying the above requirement (i-a), the optical filters 1*a* and 1*b* can exhibit high ultraviolet absorbency. The maximum transmittance $T^{M}_{300-380}$ is more desirably 2% or less, even more desirably 1% or less, particularly desirably 0.5% or less, more particularly desirably 0.3% or less.

When satisfying the following requirements (ii-a) and (iii-a) as well as the requirement (i-a), the optical filters 1*a* and 1*b* can exhibit a higher ultraviolet absorbency. In particular, the optical filters 1*a* and 1*b* can be used in applications where optical filters are required to exhibit higher ultraviolet absorption performance. The transmittance $T_{400}$ is desirably 4% or less, more desirably 3% or less, even more desirably 1% or less. The transmittance $T_{410}$ is desirably 9% or less, more desirably 8% or less, even more desirably 6% or less, particularly desirably 3% or less, more particularly desirably 1% or less.

When satisfying the above requirement (iv-a), the optical filters 1*a* and 1*b* can exhibit a high ultraviolet absorbency and a spectrum of light sensed by an imaging device is likely to coincide with a spectrum corresponding to the visual sensitivity of humans. The wavelength $\lambda_{UV}$ is desirably 420 nm to 490 nm, more desirably 420 nm to 450 nm. In this case, purple fringing is likely to be reduced in images produced using the optical filters 1*a* and 1*b*. Purple fringing is a color bleeding that produces a near purple color along an edge of a subject. Moreover, in the above case, the transmittance of light belonging to a visible light region for humans can be increased and bright images are likely to be obtained.

When the above requirement (v-a) is satisfied, the transmission of light belonging to the visible light region for humans is likely to be high and bright images are likely to be obtained. In particular, the transmittance in a wavelength region including a wavelength corresponding to that of the maximum sensitivity in a visual sensitivity curve of humans is likely to be increased, and images will appear to be brighter in human eyes. The average transmittance $T^{A}_{550-570}$ is desirably 88% or more, more desirably 90% or more.

When the above requirement (vi-a) is satisfied, the transmission spectrum abruptly varies in a vicinity of the wavelength $\lambda_{UV}$ (UV cut-off wavelength); therefore, it is possible to more sharply block ultraviolet invisible to humans and increase the amount of light in the visible light region, the light passing through the optical filter. The ratio $T^{0}_{UV+}/T^{0}_{UV-}$ is desirably 1.9 or more, more desirably 2.0 or more, even more desirably 2.2 or more, particularly desirably 2.4 or more.

Reflection spectra obtained by allowing light in the wavelength range of 300 nm to 1200 nm to be incident on the optical filters 1*a* and 1*b* at an incident angle of 5° may satisfy the following requirements (i-b) and (ii-b). Moreover, reflection spectra obtained by allowing light in the wavelength range of 300 nm to 1200 nm to be incident on the optical filters 1*a* and 1*b* at an incident angle of 40° may satisfy the following requirements (iii-b) and (iv-b). Furthermore, reflection spectra obtained by allowing light in the wavelength range of 300 nm to 1200 nm to be incident on the optical filters 1*a* and 1*b* at an incident angle of 60° may satisfy the following requirements (v-b) and (vi-b).

(i-b) A maximum reflectance $R^{5}_{300-450}$ in the wavelength range of 300 nm to 450 nm is 20% or less.

(ii-b) A maximum reflectance $R^{5}_{300-600}$ in the wavelength range of 300 nm to 600 nm is 25% or less.

(iii-b) A maximum reflectance $R^{40}_{300-450}$ in the wavelength range of 300 nm to 450 nm is 20% or less.

(iv-b) A maximum reflectance $R^{40}_{300-600}$ of the wavelength range of 300 nm to 600 nm is 25% or less.

(v-b) A maximum reflectance $R^{60}_{300-450}$ of the wavelength range of 300 nm to 450 nm is 30% or less.

(vi-b) A maximum reflectance $R^{60}_{300-600}$ of the wavelength range of 300 nm to 600 nm is 35% or less.

Satisfying the above requirements (i-b) to (vi-b) is very advantageous, for example, in preventing ghost, flare, and noise occurring due to multiple scattering of reflected light, for example, inside or at an edge of a camera module or a housing, the reflected light being reflected on a surface of the optical filter 1*a* or 1*b*. The maximum reflectance $R^{5}_{300-450}$ is desirably 15% or less. The maximum reflectance $R^{40}_{300-450}$ is desirably 15% or less. The maximum reflectance $R^{60}_{300-450}$ is desirably 20% or less. The maximum reflectance $R^{5}_{300-600}$ is desirably 20% or less. The maximum reflectance $R^{40}_{300-600}$ is desirably 20% or less. The maximum reflectance $R^{60}_{300-600}$ is desirably 25% or less.

The optical filters 1*a* and 1*b* each may satisfy the following requirements (i-c), (ii-c), (iii-c), (iv-c), and (v-c). The symbol $\lambda_{UV}$ [nm] in (i-c) represents a wavelength which lies in the wavelength range of 350 nm to 500 nm and at which the transmittance is 50% in a transmission spectrum obtained by allowing light in the wavelength range of 300 nm to 1200 nm to be incident on the optical filter at an incident angle of 30°. The symbol $\lambda^{40}_{UV}$ [nm] in (ii-c) represents a wavelength which lies in the wavelength range of 350 nm to 500 nm and at which the transmittance is 50% in a transmission spectrum obtained by allowing light in the wavelength range of 300 nm to 1200 nm to be incident on the optical filter at an incident angle of 40°. The symbol $\lambda^{50}_{UV}$ [nm] in (iii-c) represents a wavelength which lies in the wavelength range of 350 nm to 500 nm and at which the transmittance is 50% in a transmission spectrum obtained by allowing light in the wavelength range of 300 nm to 1200 nm to be incident on the optical filter at an incident angle of 50°. The symbol $\lambda^{60}_{UV}$ [nm] in (iv-c) represents a wavelength which lies in the wavelength range of 350 nm to 500 nm and at which the transmittance is 50% in a transmission spectrum obtained by allowing light in the wavelength range of 300 nm to 1200 nm to be incident on the optical filter at an incident angle of 60°. The symbol $\lambda^{70}_{UV}$ [nm] in (v-c) represents a wavelength which lies in the wavelength range of 350 nm to 500 nm and at which the transmittance is 50% in a transmission spectrum obtained by allowing light in the wavelength range of 300 nm to 1200 nm to be incident on the optical filter at an incident angle of 70°.

$$|\lambda^{30}_{UV}-\lambda_{UV}|\leq 2.4\text{ nm} \quad \text{(i-c)}$$

$$|\lambda^{40}_{UV}-\lambda_{UV}|\leq 3.0\text{ nm} \quad \text{(ii-c)}$$

$$|\lambda^{50}_{UV}-\lambda_{UV}|\leq 5.0\text{ nm} \quad \text{(iii-c)}$$

$$|\lambda^{60}_{UV}-\lambda_{UV}|\leq 9.0\text{ nm} \quad \text{(iv-c)}$$

$$|\lambda^{70}_{UV}-\lambda_{UV}|\leq 18.0\text{ nm} \quad \text{(v-c)}$$

An ultraviolet cut-off filter of full absorption type can have an advantage in that a transmission spectrum thereof has a small angle dependence. The UV cut-off wavelength of an ultraviolet cut-off filter that cuts off ultraviolet by means of its reflecting film tends to shift toward the short wavelength side when light is obliquely incident. Because of this, ultraviolet that should be cut off may be detected by a sensor depending on the incident angle. On the other hand, in the case of the optical filters 1_a_ and 1_b_ satisfying the above requirements (i-c) to (v-c), the UV cut-off wavelength varies less upon oblique incidence and is less likely to shift toward the short wavelength side. Therefore, the optical filters 1_a_ and 1_b_ are likely to achieve, in addition to the function of reducing ghost and flare, such good color reproduction that uneven in-plane coloring happens less, and are likely to produce high-quality images.

As to (i-c), $|\lambda^{30}_{UV}-\lambda_{UV}|$ desirably satisfies $|\lambda^{30}_{UV}-\lambda_{UV}|\leq 1.6$ nm, more desirably $|\lambda^{30}_{UV}-\lambda_{UV}|\leq 1.2$ nm. As to (ii-c), $|\lambda^{40}_{UV}-\lambda_{UV}|$ desirably satisfies $|\lambda^{40}_{UV}-\lambda_{UV}|\leq 2.0$ nm, more desirably $|\lambda^{40}_{UV}-\lambda_{UV}|\leq 1.5$ nm. As to (iii-c), $|\lambda^{50}_{UV}-\lambda_{UV}|$ is desirably $|\lambda^{50}_{UV}-\lambda_{UV}|\leq 3.5$ nm, more desirably $|\lambda^{50}_{UV}-\lambda_{UV}|\leq 2.5$ nm. As to (iv-c), $|\lambda^{60}_{UV}-\lambda_{UV}|$ is desirably $|\lambda^{60}_{UV}-\lambda_{UV}|\leq 6.0$ nm, more desirably $|\lambda^{60}_{UV}-\lambda_{UV}|\leq 4.5$ nm. As to (v-c), $|\lambda^{70}_{UV}-\lambda_{UV}|$ is desirably $|\lambda^{70}_{UV}-\lambda_{UV}|\leq 12.0$ nm, more desirably $|\lambda^{70}_{UV}-\lambda_{UV}|\leq 9.0$ nm.

The optical filters 1_a_ and 1_b_ each may satisfy the following requirements (i-d), (ii-d), and (iii-d). In these requirements, $T^{m}_{480\text{-}600}$ represents the minimum transmittance in the wavelength range of 480 nm to 600 nm in a transmission spectrum measured for the optical filter at an incident angle of 0° before the start of a high-temperature and high-humidity test and a heat cycle test. The high-temperature and high-humidity test is performed at a temperature of 85° C. and a relative humidity of 85%. As to (i-d), $\lambda^{DH\text{-}240}_{UV}$ [nm] represents a wavelength which lies in the wavelength range of 350 nm to 500 nm and at which the transmittance is 50% in a transmission spectrum measured for the optical filter at an incident angle of 0° 240 hours after the start of the high-temperature and high-humidity test, and $T^{DH\text{-}240}_{480\text{-}600}$ represents the minimum transmittance in the wavelength range of 480 nm to 600 nm in the transmission spectrum. As to (ii-d), $\lambda^{DH\text{-}480}_{UV}$ [nm] represents a wavelength which lies in the wavelength range of 350 nm to 500 nm and at which the transmittance is 50% in a transmission spectrum measured for the optical filter at an incident angle of 0° 480 hours after the start of the high-temperature and high-humidity test, and $T^{DH\text{-}480}_{480\text{-}600}$ represents the minimum transmittance in the wavelength range of 480 nm to 600 nm in the transmission spectrum. As to (iii-d), $\lambda^{DH\text{-}1K}_{UV}$ [nm] represents a wavelength which lies in the wavelength range of 350 nm to 500 nm and at which the transmittance is 50% in a transmission spectrum measured for the optical filter at an incident angle of 0° 1008 hours after the start of the high-temperature and high-humidity test, and $T^{DH\text{-}1K}_{480\text{-}600}$ represents the minimum transmittance in the wavelength range of 480 nm to 600 nm in the transmission spectrum.

$$|\lambda^{DH\text{-}240}_{UV}-\lambda_{UV}|\leq 3\text{ nm and }|T^{DH\text{-}240}_{480\text{-}600}-T^{m}_{480\text{-}600}|\leq 2\% \quad \text{(i-d)}$$

$$|\lambda^{DH\text{-}480}_{UV}-\lambda_{UV}|\leq 3.5\text{ nm and }|T^{DH\text{-}480}_{480\text{-}600}-T^{m}_{480\text{-}600}|\leq 2.5\% \quad \text{(ii-d)}$$

$$|\lambda^{DH\text{-}1K}_{UV}-\lambda_{UV}|\leq 4\text{ nm and }|T^{DH\text{-}1K}_{480\text{-}600}-T^{m}_{480\text{-}600}|\leq 3\% \quad \text{(iii-d)}$$

When satisfying the requirements (i-d), (ii-d), and (iii-d), even in a high-temperature and high-humidity environment, the optical filters 1_a_ and 1_b_ can exhibit a high ultraviolet absorbency and a spectrum of light sensed by an imaging device is likely to coincide with a spectrum corresponding to the visual sensitivity of humans. Moreover, even in a high-temperature and high-humidity environment, the transmission of light belonging to the visible light region for humans is likely to be high and bright images are likely to be obtained.

The optical filters 1_a_ and 1_b_ each may satisfy the following requirements (i-e), (ii-e), and (iii-e). In these requirements, $T^{m}_{480\text{-}600}$ represents the minimum transmittance in the wavelength range of 480 nm to 600 nm in a transmission spectrum measured for the optical filter at an incident angle of 0° before the start of the high-temperature and high-humidity test and the heat cycle test. One cycle of the heat cycle test consists of the following steps in the following order: keeping an environmental temperature at 85° C. for 30 minutes; varying the environmental temperature from 85° C. to −40° C. over 5 minutes; keeping the environmental temperature at −40° C. for 30 minutes; and varying the environmental temperature from −40° C. to 85° C. over 5 minutes. The symbol $\lambda^{HC\text{-}144}_{UV}$ [nm] in (i-e) represents a wavelength which lies in the wavelength range of 350 nm to 500 nm and at which the transmittance is 50% in a transmission spectrum measured for the optical filter at an incident angle of 0° after 144 cycles in the heat cycle test, and $T^{HC\text{-}144}_{480\text{-}600}$ in (i-e) represents the minimum transmittance in the wavelength range of 480 nm to 600 nm in the transmission spectrum. The symbol $\lambda^{HC\text{-}576}_{UV}$ [nm] in (ii-e) represents a wavelength which lies in the wavelength range of 350 nm to 500 nm and at which the transmittance is 50% in a transmission spectrum measured for the optical filter at an incident angle of 0° after 576 cycles in the heat cycle test, and $T^{HC\text{-}576}_{480\text{-}600}$ in (ii-e) represents the minimum transmittance in the wavelength range of 480 nm to 600 nm in the transmission spectrum. The symbol $\lambda^{HC\text{-}1K}_{UV}$ [nm] in (iii-e) represents a wavelength which lies in the wavelength range of 350 nm to 500 nm and at which the transmittance is 50% in a transmission spectrum measured for the optical filter at an incident angle of 0° after 1008 cycles in the heat cycle test, and $T^{HC\text{-}1K}_{480\text{-}600}$ in (iii-e) represents the minimum transmittance in the wavelength range of 480 nm to 600 nm in the transmission spectrum.

$$|\lambda^{HC\text{-}144}_{UV}-\lambda_{UV}|\leq 3\text{ nm and }|T^{HC\text{-}144}_{480\text{-}600}-T^{m}{}_{480\text{-}600}|\leq 2\% \quad \text{(i-e)}$$

$$|\lambda^{HC\text{-}576}_{UV}-\lambda_{UV}|\leq 3.5\text{ nm and }|T^{HC\text{-}576}_{480\text{-}600}-T^{m}_{480\text{-}600}|\leq 2.5\% \quad \text{(ii-e)}$$

$$|\lambda^{HC\text{-}1K}_{UV}-\lambda_{UV}|\leq 4\text{ nm and }|T^{HC\text{-}1K}_{480\text{-}600}-T^{m}_{480\text{-}600}|\leq 3\% \quad \text{(iii-e)}$$

When satisfying the requirements (i-e), (ii-e), and (iii-e), regardless of variations in environmental temperatures of the optical filters 1_a_ and 1_b_, the optical filters 1_a_ and 1_b_ can exhibit a high ultraviolet absorbency and a spectrum of light sensed by an imaging device is likely to coincide with a spectrum corresponding to the visual sensitivity of humans. Moreover, regardless of variations in environmental temperatures of the optical filters 1*a* and 1*b*, the transmission of light belonging to the visible light region for humans is likely to be high and bright images are likely to be obtained.

The optical filter 1*a* consists of, for example, the light-absorbing film 10 alone. In this case, the optical filter 1*a* can be used, for example, independently of an imaging device or an optical component. The optical filter 1*a* may be joined to an imaging device or an optical component. Alternatively, the optical filter 1*a* may be formed by applying the above light-absorbing composition to an imaging device or an optical component and curing the light-absorbing composition.

The optical filter 1*a* can be produced, for example, by peeling the light-absorbing film 10 formed on a substrate off the substrate. In this case, the material of the substrate may be a glass, a resin, or a metal. A surface of the substrate may have been subjected to a surface treatment such as coating with a fluorine-containing compound.

Figure 2A:
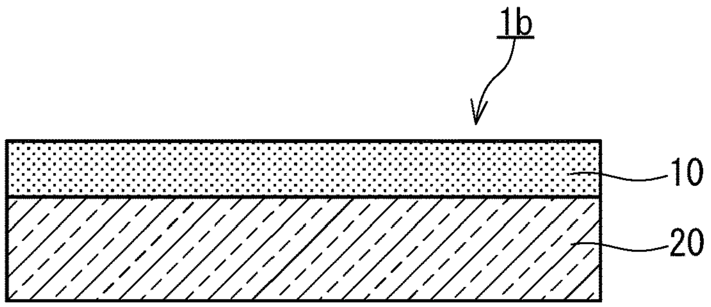
FIG. 2A is a cross-sectional view showing an example of an optical filter according to the present invention.

As shown in FIG. 2A, the optical filter 1*b* includes the light-absorbing film 10 and a transparent dielectric substrate 20. The light-absorbing film 10 is provided parallel with one principal surface of the transparent dielectric substrate 20. The light-absorbing film 10 may be in contact, for example, with the one principal surface of the transparent dielectric substrate 20. In this case, for example, the light-absorbing film 10 can be formed by applying the above light-absorbing composition to the one principal surface of the transparent dielectric substrate 20 and curing the light-absorbing composition.

The type of the transparent dielectric substrate 20 is not limited to a particular type. The transparent dielectric substrate 20 may have the absorption ability in an infrared region. The transparent dielectric substrate 20 may have an average spectral transmittance of 90% or more, for example, in the wavelength range of 350 nm to 900 nm. The material of the transparent dielectric substrate 20 is not limited to a particular material and is, for example, a certain type of glass or resin. When the material of the transparent dielectric substrate 20 is a glass, the transparent dielectric substrate 20 can be, for example, a transparent glass substrate made of a silicate glass such as soda-lime glass or borosilicate glass or a substrate made of a phosphate or fluorophosphate glass containing a coloring component such as Cu or Co. The phosphate or fluorophosphate glass containing the coloring component is, for example, an infrared-absorbing glass, and has light-absorption properties in itself. In the case where the light-absorbing film 10 is used along with the transparent dielectric substrate 20 being an infrared-absorbing glass, an optical filter having desired optical properties can be produced by adjusting the light-absorption properties and transmission spectra of the light-absorbing film 10 and the transparent dielectric substrate 20 and the flexibility in designing optical filters is high.

When the material of the transparent dielectric substrate 20 is a resin, the resin is, for example, a cyclic olefin resin such as a norbornene resin, a polyarylate resin, an acrylic resin, a modified acrylic resin, a polyimide resin, a polyetherimide resin, a polysulfone resin, a polyethersulfone resin, a polycarbonate resin, or a silicone resin.

The optical filters 1*a* and 1*b* each may be modified to further include another functional film such as an infrared-absorbing film, an infrared-reflecting film, or an antireflection film. Such a functional film can be laid on the light-absorbing film 10 or the transparent dielectric substrate 20. For example, in the case where the optical filter includes an antireflection film, the transmittance in a given wavelength range (e.g., a visible light region) can be increased. The antireflection film may be configured as a layer of a low-refractive-index material such as $MgF_2$ or $SiO_2$, may be configured as a laminate composed of a layer of such a low-refractive-index material and a layer of a high-refractive-index material such as $TiO_2$, or may be configured as a dielectric multilayer film. The antireflection film can be formed by a method including a physical reaction such as vacuum deposition or sputtering or a method including a chemical reaction such as CVD or a sol-gel process.

The optical filter may be configured, for example, in such a manner that the light-absorbing film 10 is disposed between two glass plates. This improves the stiffness and the mechanical strength of the optical filter. This also makes a principal surface of the optical filter hard, which is advantageous, for example, in preventing scratches. This advantage is important, in particular, in the case where a relatively flexible resin is included as a binder or a matrix in the light-absorbing film 10.

Figure 2B:
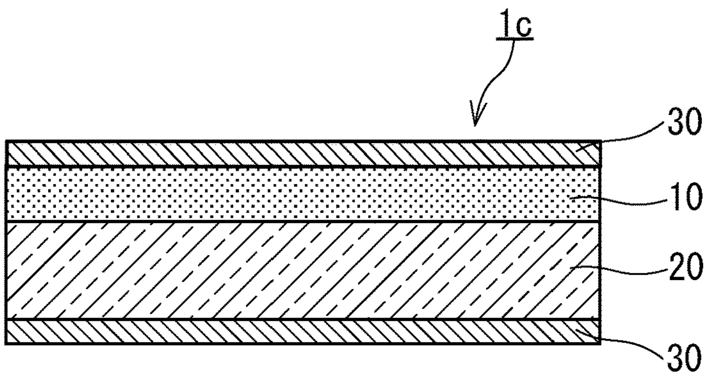
FIG. 2B is a cross-sectional view showing an example of the optical filter according to the present invention.

An optical filter having even better optical properties can be provided by laying an antireflection film on a surface of a light-absorbing film or an optical filter obtained by curing the light-absorbing composition. For example, as shown in FIG. 2B, an optical filter 1*c* including the light-absorbing film 10 and an antireflection film 30 can be provided. When light is incident on the optical filter including the antireflection film at a given incident angle, light reflected by the optical filter is reduced to almost zero. This is very advantageous, for example, for an imaging apparatus equipped with the optical filter including the antireflection film in preventing ghost, flare, and noise occurring due to multiple scattering of reflected light, for example, inside the imaging apparatus or a camera module.

The material of the antireflection film is not limited to a particular material. The method for forming the antireflection film is not limited to a particular method. The method for forming the antireflection film may be a gas-phase method or a liquid-phase method. For example, the method for forming the antireflection film may be deposition. The method for forming the antireflection film may be a sol-gel process using a reactive material including silicon. A sol-gel process is a liquid-phase method suitable for formation of antireflection films.

The antireflection film is in the form of a single-layer film made of a single material or a multilayer film made of two or more different materials. The materials of the film and the layers in the multilayer film are not limited to particular materials. Examples of the materials include inorganic compounds such as $SiO_2$, $TiO_2$, $Ta_2O_3$, $MgF_2$, $Al_2O_3$, $CaF_2$, $ZrO_2$, $CeO_2$, and ZnS. For example, in the case where the antireflection film or a layer included in the antireflection film includes $SiO_2$, the film or the layer may be formed by what is called a sol-gel process using an alkoxysilane compound as a starting material. By the sol-gel process, the alkoxysilane compound undergoes hydrolysis and then polycondensation under the presence of water and a catalyst to give a dense and hard film including $SiO_2$. The sol-gel process has an advantage in that the $SiO_2$-including film or layer can be formed thereby without need for high temperatures.

The starting material used to form the antireflection film by the sol-gel process is not limited to a particular material, and a functional group in the starting material is not limited to a particular functional group, either. The starting material desirably includes an alkyl-containing trifunctional silane and a tetrafunctional silane such as methyltriethoxysilane (MTES) and tetraethoxysilane (TEOS). The tetrafunctional silane is indispensable in formation of the film or layer having a firm and dense structure. However, it is difficult to control the reactivity and adjust the porosity of the film or layer by the tetrafunctional silane alone. Moreover, the use of the tetrafunctional silane alone tends to cause a crack in the film or layer. The starting material including the trifunctional silane as well as the tetrafunctional silane improves the flexibility of a silica structure, makes it easy to adjust the porosity of the film or layer, and makes it likely to reduce cracking in the film or layer. The ease of adjustment of the porosity of the film or layer is desired from the viewpoint of adjustment of the refractive index of the antireflection film. An organic functional group in the trifunctional silane is basically not limited to a particular functional group. The trifunctional silane desirably includes a methyl group as the organic functional group especially to form a homogeneous liquid and a homogeneous coating film in combination with the tetrafunctional silane.

In the starting material, the ratio between the amount of the alkyl-containing trifunctional silane and the amount of the tetrafunctional silane is not limited to a particular value. In the starting material, the following relation is desirably satisfied on a mass basis: the amount of the alkyl-containing trifunctional silane: the amount of the tetrafunctional silane=5:1 to 1:3. In this case, cracking in the antireflection film is likely to be reduced and a firm structure is likely to be formed owing to the tetrafunctional silane. The starting material may include a component other than the components involved in the sol-gel process. For example, the starting material may include fine particles and fillers for refractive index adjustment. In this case, the fine particles and the fillers may be hollow and/or may be made of a high-refractive-index material. The starting material may include a component that decomposes at low temperatures. In this case, it is easy to adjust the refractive index of the antireflection film. In the sol-gel process, a temperature at which the coating film is sintered is not limited to a particular temperature. The temperature is, for example, in the range of 60° C. to 250° C., desirably in the range of 70° C. to 230° C., more desirably in the range of 80° C. to 200° C. Since the light-absorbing film and the optical filter can have a high thermal resistance, the sintering of the coating film in the sol-gel process is trouble-free and the antireflection film formed thereby is likely to be firm.

In the case where the antireflection film is a single-layer film, the material of the single-layer film desirably has a low refractive index. The reflectance tends to be smallest at $n_1=\sqrt{n_0}$, where $n_1$ is a refractive index of the material of the antireflection film. The symbol $n_0$ represents a refractive index of a substrate for formation of the antireflection film. For example, in the case where the antireflection film includes hollow particles made of a metal oxide such as $SiO_2$ or $TiO_2$ or an organic material such as PMMA, the antireflection film is likely to have a low refractive index because the inside of the hollow particle is occupied by air, which has a refractive index of approximately 1. When the refractive index required of the antireflection film is not very low, the antireflection film may include solid particles made of any of the above materials. Including such solid particles in the antireflection film is advantageous for the antireflection film required to have mechanical strength such as scratch resistance. The film may be formed by the sol-gel process with the above hollow particles or solid particles included therein. In particular, in the case of using hollow particles or solid particles made of $SiO_2$, an affinity between the $SiO_2$ in the film formed by the sol-gel process and the hollow particles or the solid particles is high enough to reduce aggregation of the hollow particles or the solid particles, and thus, for example, bleed out can be reduced.

The antireflection film may have a multilayer structure including the $SiO_2$-including layer formed by the sol-gel process and a layer formed by, for example, vacuum deposition, the sol-gel process, or another method. For example, the multilayered antireflection film formed of two or more materials having different refractive indices is likely to ensure a relatively wide wavelength band where a reflection prevention effect is achieved and decrease the minimum reflectance of the optical filter. In the case where the $SiO_2$-including layer formed by the sol-gel process is combined with another layer to form the multilayer structure of the antireflection film, the other layer may be, for example, a $SiO_2$-including layer including the hollow particles and formed by the sol-gel process, a layer made of a material, such as $TiO_2$ or $Ta_2O_3$, having a relatively high refractive index, or a layer made of another material such as $MgF_2$.

As shown in FIG. 2B, for example, a light incident surface and a light emergent surface of the optical filter 1*c* are formed of the antireflection film 30. In other words, the optical filter 1*c* includes, for example, the antireflection film 30 on each surface thereof. The antireflection film 30 includes, for example, $SiO_2$. A transmission spectrum obtained by allowing light in the wavelength range of 300 nm to 1200 nm to be incident on the optical filter 1*c* at an incident angle of 0° satisfies, for example, the following requirements (i-f), (ii-f), (iii-f), (iv-f), (v-f), (vi-f), and (vii-f).

(i-f) A maximum transmittance $Tb^{M}_{300-380}$ in the wavelength range of 300 nm to 380 nm is 0.1% or less.

(ii-f) A transmittance $Tb_{400}$ at a wavelength of 400 nm is 5% or less.

(iii-f) A transmittance $Tb_{410}$ at a wavelength of 410 nm is 10% or less.

(iv-f) A wavelength $\lambda b_{UV}$ [nm] which lies in the wavelength range of 350 nm to 500 nm and at which the transmittance is 50% lies in the range of 405 nm to 490 nm.

(v-f) A minimum transmittance $Tb^{m}_{480-600}$ in the wavelength range of 480 nm to 600 nm is 92% or more.

(vi-f) An average transmittance $Tb^{a}_{550-570}$ in the wavelength range of 550 nm to 570 nm is 90% or more.

(vii-f) A ratio $Tb^{0}_{UV+}/Tb^{0}_{UV-}$ of a transmittance $Tb^{0}_{UV+}$ at a wavelength of $(\lambda b_{UV}+10)$ nm to a transmittance $Tb^{0}_{UV-}$ at a wavelength of $(\lambda b_{UV}-10)$ nm is 2.5 or more.

A reflection spectrum obtained by allowing light in the wavelength range of 300 nm to 1200 nm on the optical filter 1*c* at an incident angle of 5° satisfies, for example, the following requirements (i-g) and (ii-g). A reflection spectrum obtained by allowing light in the wavelength range of 300 nm to 1200 nm on the optical filter 1*c* at an incident angle of 40° satisfies, for example, the following requirements (iii-g) and (iv-g). A reflection spectrum obtained by allowing light in the wavelength range of 300 nm to 1200 nm on the optical filter 1*c* at an incident angle of 60° satisfies, for example, the following requirements (v-g) and (vi-g).

(i-g) The maximum reflectance $R^{5}_{300-450}$ in the wavelength range of 300 nm to 450 nm is 7% or less.

(ii-g) The maximum reflectance $R^{5}_{300-600}$ in the wavelength range of 300 nm to 600 nm is 9% or less.

(iii-g) The maximum reflectance $R^{40}_{300-450}$ in the wavelength range of 300 nm to 450 nm is 8% or less.

(iv-g) The maximum reflectance $R^{40}_{300-600}$ in the wavelength range of 300 nm to 600 nm is 10% or less.

(v-g) The maximum reflectance $R^{60}_{300-450}$ in the wavelength range of 300 nm to 450 nm is 12% or less.

(vi-g) The maximum reflectance $R^{60}_{300-600}$ in the wavelength range 300 nm to 600 nm is 14% or less.

EXAMPLES

The present invention will be described in more detail by examples. The present invention is not limited to the examples given below. First, methods for evaluating optical filters according to Examples and Comparative Examples will be described.

<Transmission Spectrum Measurement>

Transmission spectra and reflection spectra were measured for the optical filters at given incident angles using an ultraviolet-visible-near-infrared spectrophotometer (manufactured by JASCO Corporation; product name: V-670).

<Thickness Measurement>

The thickness of a light-absorbing film of each optical filter was measured using a laser displacement meter (manufactured by Keyence Corporation; product name: LK-H008) by measuring a distance to a surface of the optical filter and then subtracting the thickness of a transparent glass substrate of the optical filter from the distance.

<Ultraviolet Absorber>

The following ultraviolet absorbers were used to produce the optical filters according to Examples and Comparative Examples.

TABLE 1

| Ultraviolet absorber | Name of substance |
|---|---|
| (1-i) | 2,2',4,4'-tetrahydroxybenzophenone |
| (1-ii) | 2,2'-dihydroxy-4,4'-dimethoxybenzophenone |
| (1-iii) | 2-hydroxybenzophenone |
| (1-iv) | benzophenone |

Structural formulae of ultraviolet absorbers (1-i), (1-ii), (1-iii), and (1-iv) are respectively represented by the following formulae (C), (D), (E), and (F).

(C)

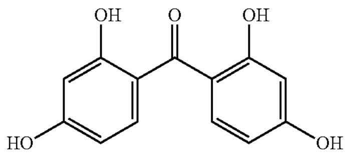

(D)

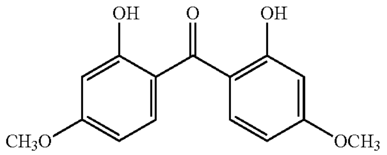

(E)

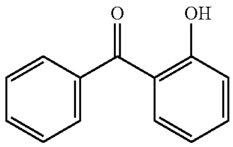

-continued (F)

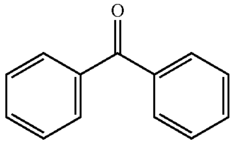

<Metal-Component-Including Compound>

The following metal-component-including compounds were used to produce the optical filters according to Examples and Comparative Example 5.

TABLE 2

| Metal-component-including compound | Metal component | Name of complex salt | Metal component content [%] |
|---|---|---|---|
| (2-i) | Al | Aluminum tris(ethyl acetoacetate) | 6.5 |
| (2-ii) | Ti | Titanium diisopropoxy bis(ethyl acetoacetate) | 11.3 |
| (2-iii) | Ti | Titanium diisopropoxy bis(acetylacetonate) | 13.2 |

Example 1

An amount of 5.0 g of the ultraviolet absorber (1-i) and 95.0 g of ethanol were mixed and then stirred for 30 minutes to obtain an ultraviolet absorber solution according to Example 1. Next, 99.38 g of a silicone resin (manufactured by Shin-Etsu Chemical Co., Ltd.; product name: KR-300) and 0.62 g of the metal-component-including compound (2-i) were mixed and then stirred for 30 minutes to obtain a metal-component-including liquid composition according to Example 1. An amount of 2.0 g of the ultraviolet absorber solution according to Example 1 and 10.0 g of the metal-component-including liquid composition according to Example 1 were mixed and then stirred for 30 minutes to obtain a light-absorbing composition according to Example 1. Table 3 shows the contents of the components and the mass ratio between given components in the ultraviolet absorber solution, the metal-component-including liquid composition, and the light-absorbing composition. Incidentally, the amount of solids in the light-absorbing composition was determined assuming that the solids content in the silicone resin KR-300 was 50 mass % and the metal component content in the metal-component-including compound (2-i) was 6.5 mass %.

Figure 3:
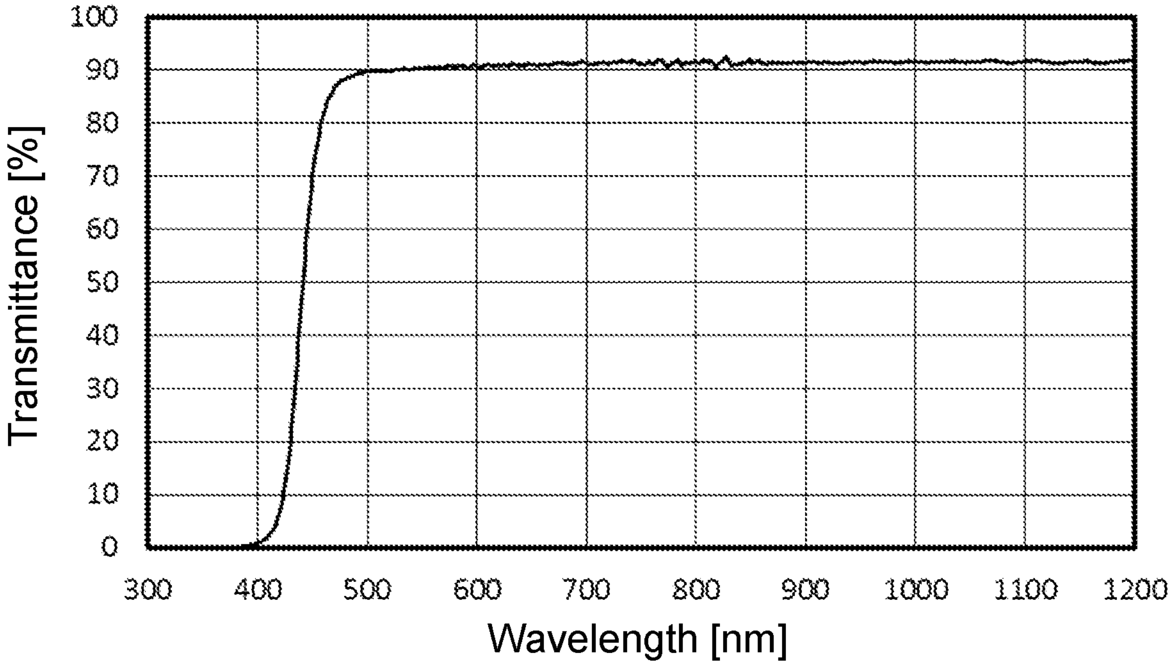
FIG. 3 shows a transmission spectrum of an optical filter according to Example 1.

The light-absorbing composition was applied with a dispenser to a 40 mm×40 mm region at a central portion of one principal surface of a transparent glass substrate (manufactured by SCHOTT AG; product name: D263 T eco) made of borosilicate glass having dimensions of 76 mm×76 mm×0.21 mm to form a coating film. After sufficiently dried at room temperature, the coating film was put in an oven and subjected to heat treatment at 160° C. for 1 hour to evaporate the solvent and cure the coating film. A light-absorbing film according to Example 1 including the ultraviolet absorber and the metal component was thereby obtained. An optical filter according to Example 1 including the light-absorbing film according to Example 1 was produced in this manner. FIG. 3 shows a transmission spectrum of the optical filter according to Example 1. Furthermore, Table 5 shows wavelength- and transmittance-related properties obtained from FIG. 3 and the thickness of the light-absorbing film.

Example 2

An amount of 2.0 g of the ultraviolet absorber (1-ii) and 98.0 g of toluene were mixed and then stirred for 30 minutes to obtain an ultraviolet absorber solution according to Example 2. Next, 99.38 g of a silicone resin (manufactured by Shin-Etsu Chemical Co., Ltd.; product name: KR-300) and 0.62 g of the metal-component-including compound (2-i) were mixed and then stirred for 30 minutes to obtain a metal-component-including liquid composition according to Example 2. An amount of 5.0 g of the ultraviolet absorber solution according to Example 2 and 10.0 g of the metal-component-including liquid composition according to Example 2 were mixed and then stirred for 30 minutes to obtain a light-absorbing composition according to Example 2. Table 3 shows the contents of the components and the mass ratio between the given components in the ultraviolet absorber solution, the metal-component-including liquid composition, and the light-absorbing composition.

Figure 4:
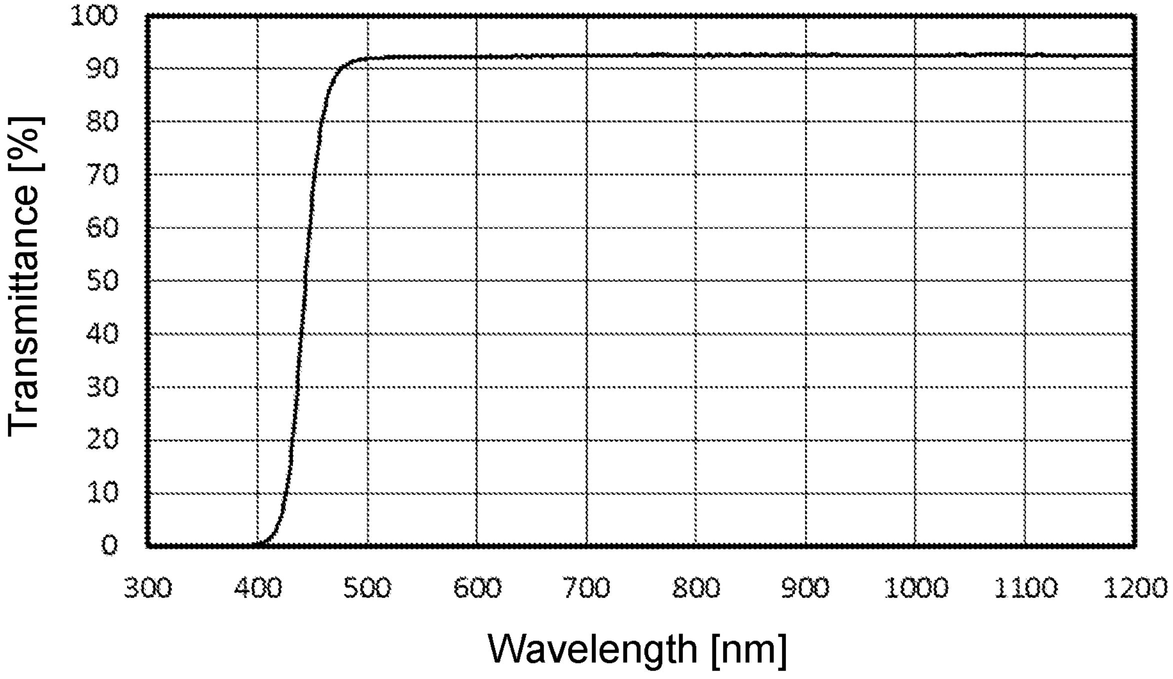
FIG. 4 shows a transmission spectrum of an optical filter according to Example 2.

A coating film of the light-absorbing composition was cured on a transparent glass substrate in the same manner as in Example 1, except that the light-absorbing composition according to Example 2 was used instead of the light-absorbing composition according to Example 1 and that the temperature of the thermal treatment was 120° C. A light-absorbing film according to Example 2 was thereby obtained. An optical filter according to Example 2 including the light-absorbing film according to Example 2 was produced in this manner. FIG. 4 shows a transmission spectrum of the optical filter according to Example 2. Furthermore, Table 5 shows wavelength- and transmittance-related properties obtained from FIG. 4 and the thickness of the light-absorbing film.

Examples 3 and 4

Figure 5:
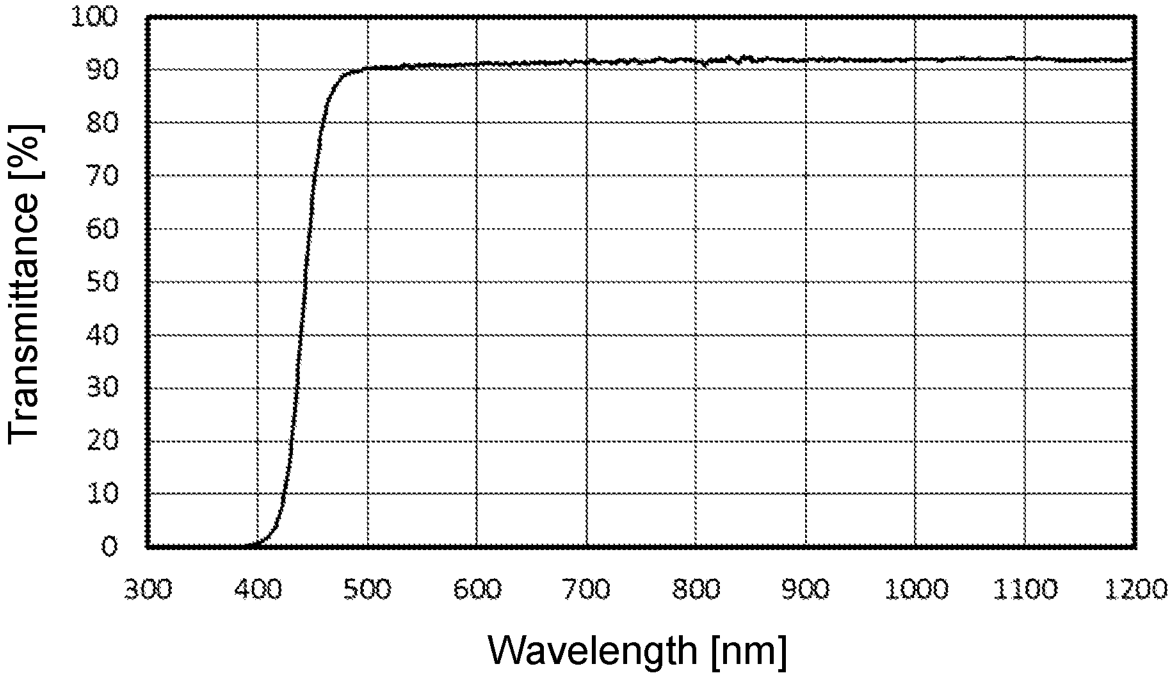
FIG. 5 shows a transmission spectrum of an optical filter according to Example 3.
Figure 6:
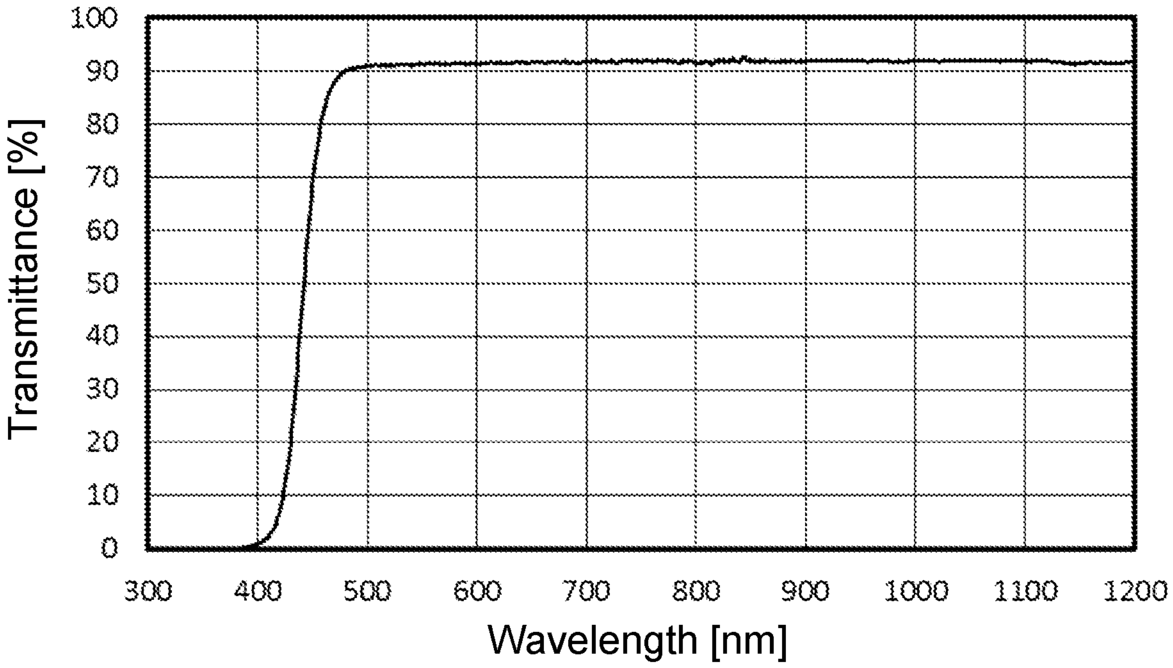
FIG. 6 shows a transmission spectrum of an optical filter according to Example 4.
Figure 7:
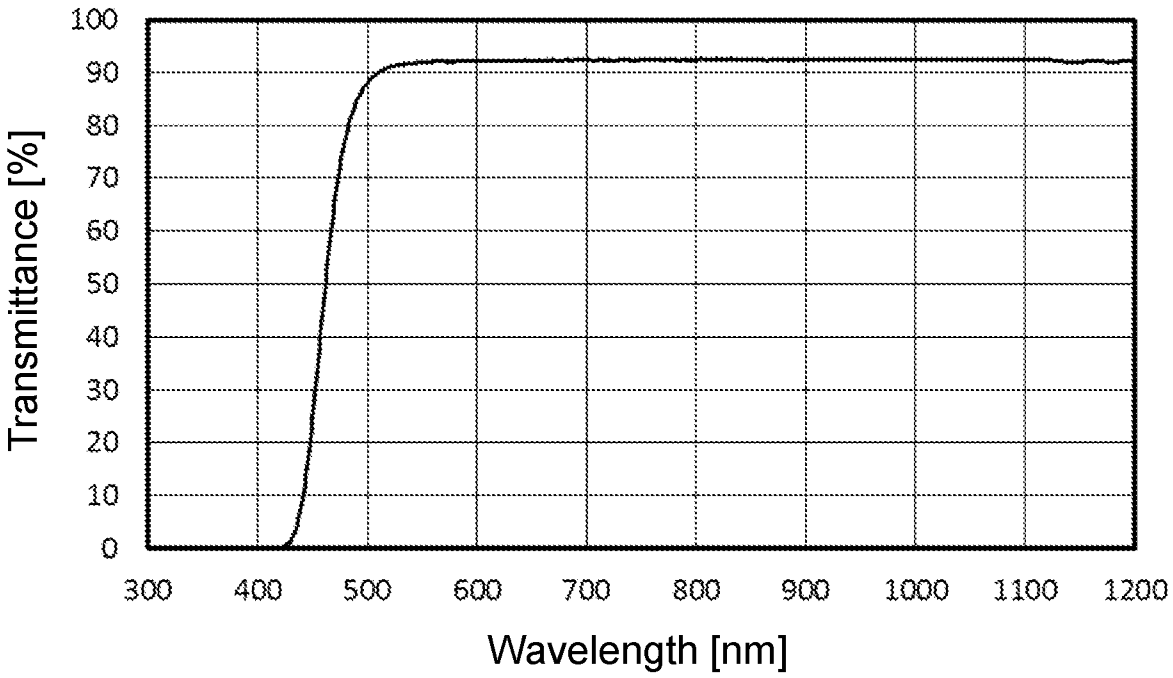
FIG. 7 shows a transmission spectrum of an optical filter according to Example 5.
Figure 8:
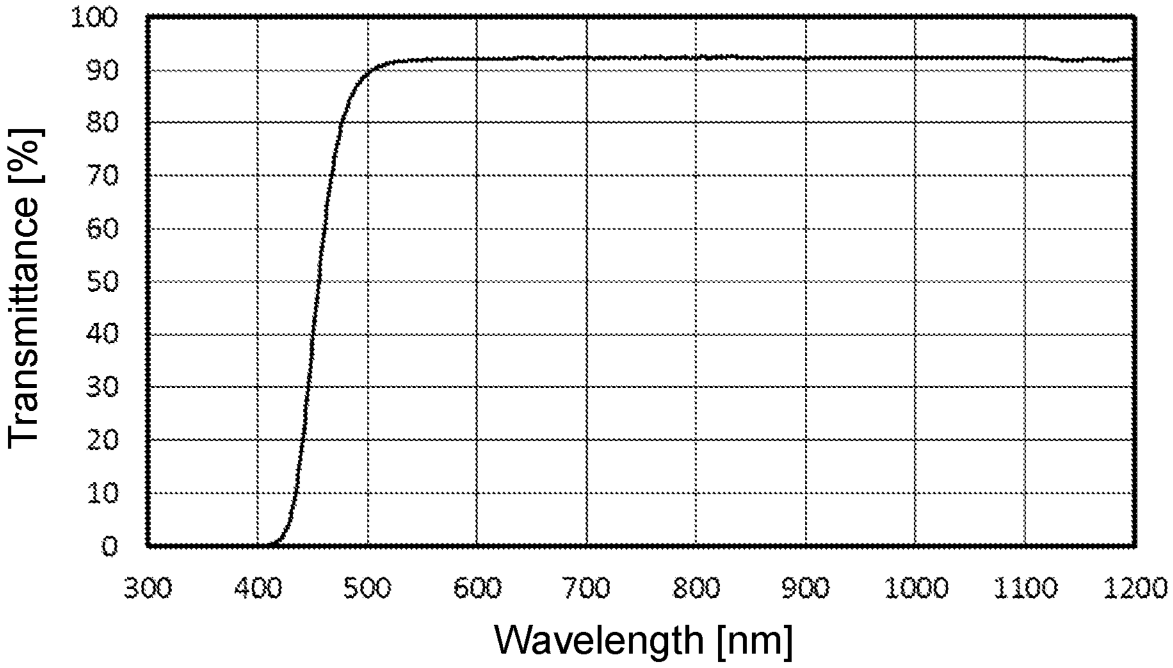
FIG. 8 shows a transmission spectrum of an optical filter according to Example 6.
Figure 9:
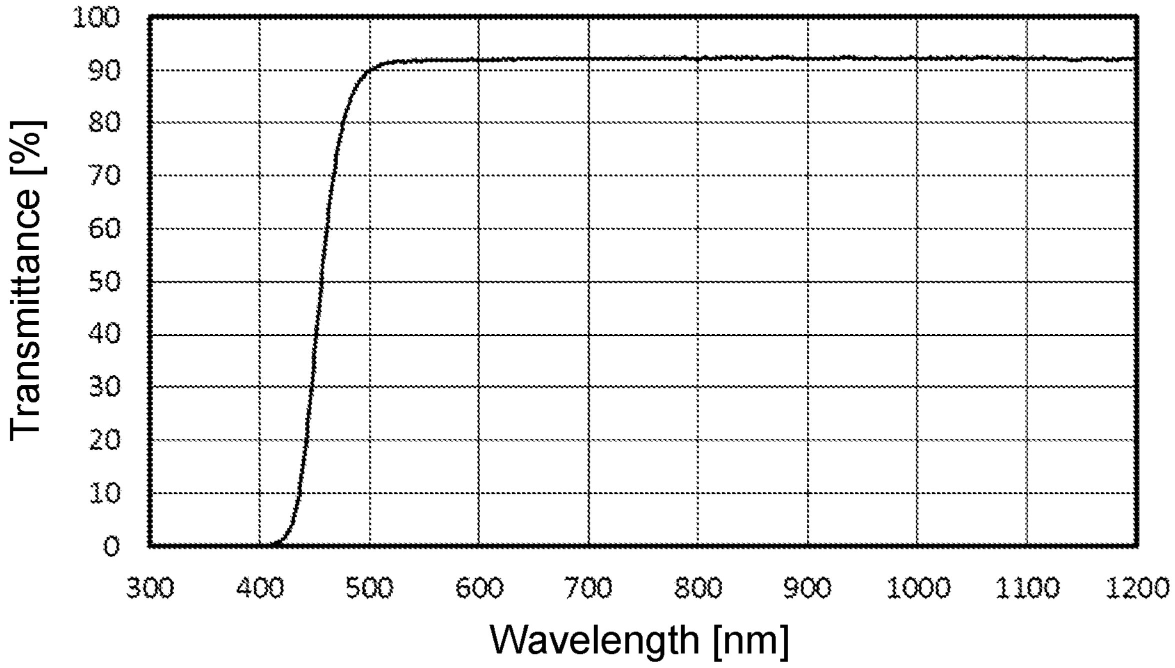
FIG. 9 shows a transmission spectrum of an optical filter according to Example 7.
Figure 10:
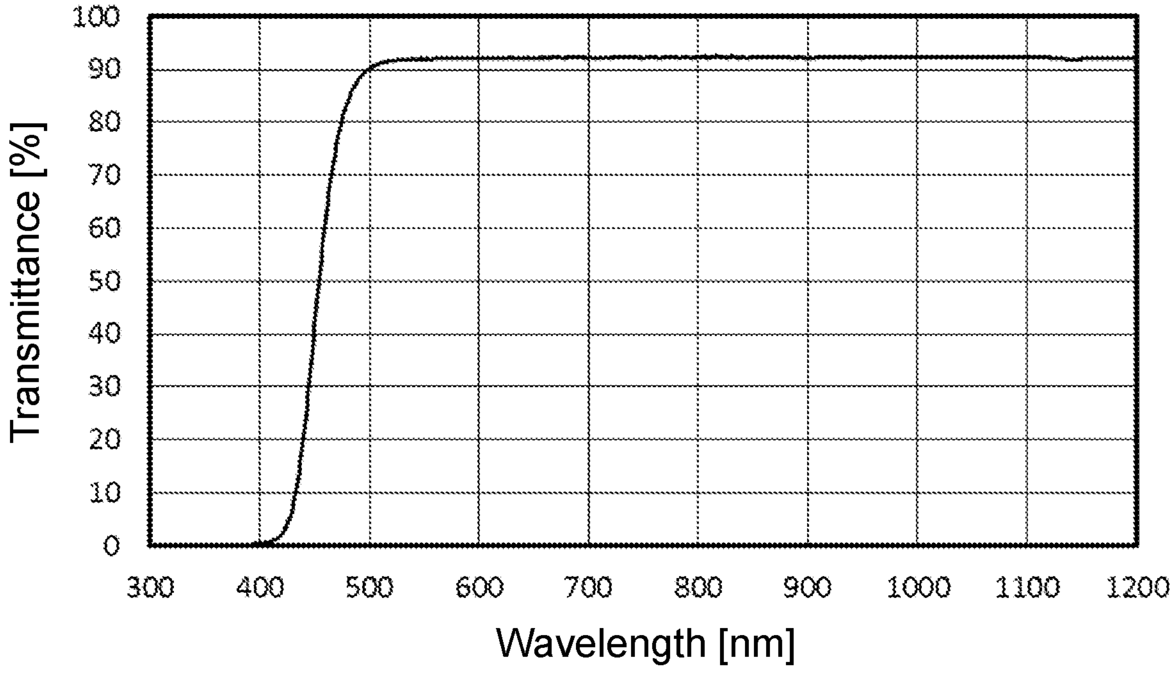
FIG. 10 shows a transmission spectrum of an optical filter according to Example 8.
Figure 11:
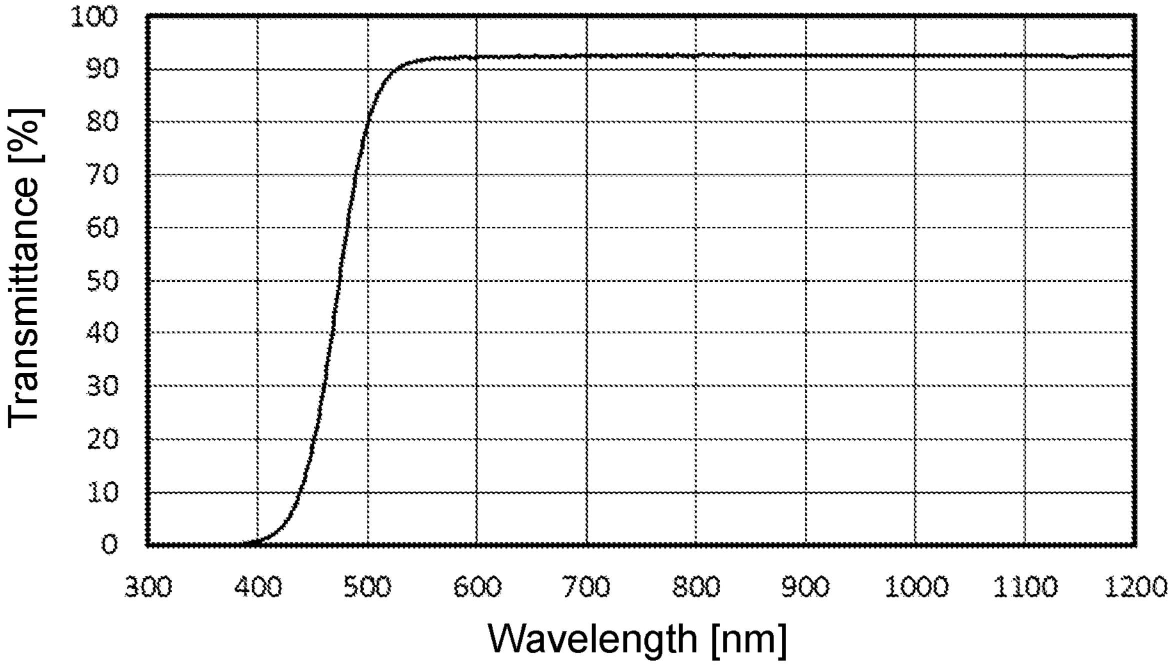
FIG. 11 shows a transmission spectrum of an optical filter according to Example 9.
Figure 12:
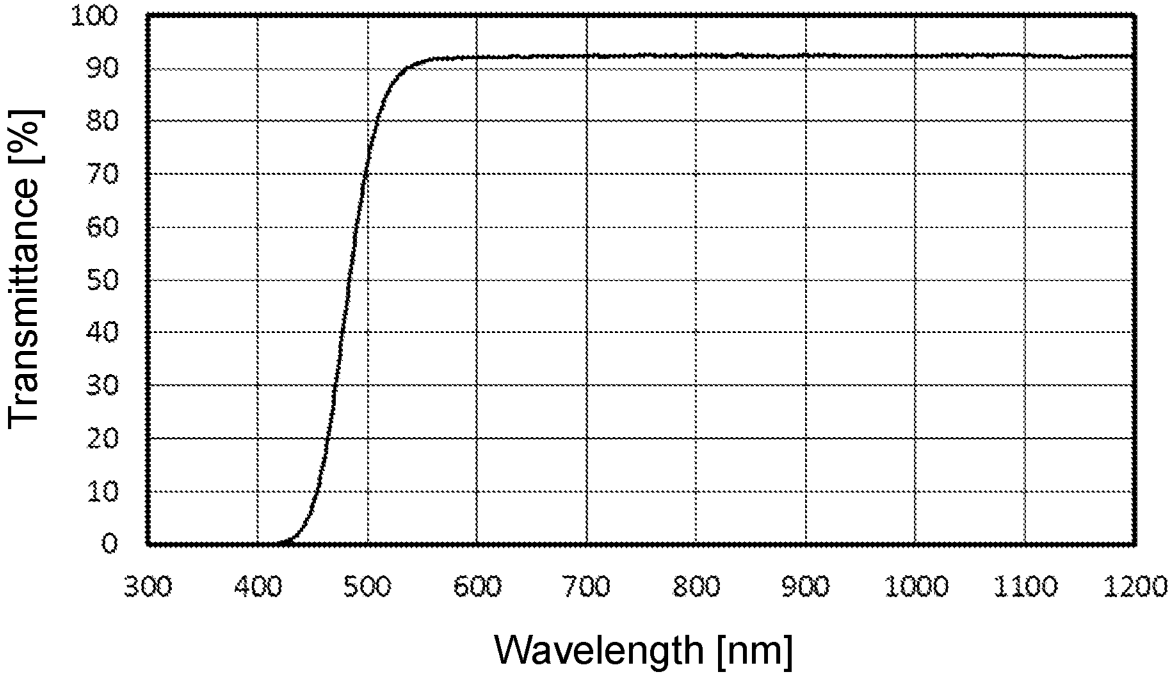
FIG. 12 shows a transmission spectrum of an optical filter according to Example 10.
Figure 13:
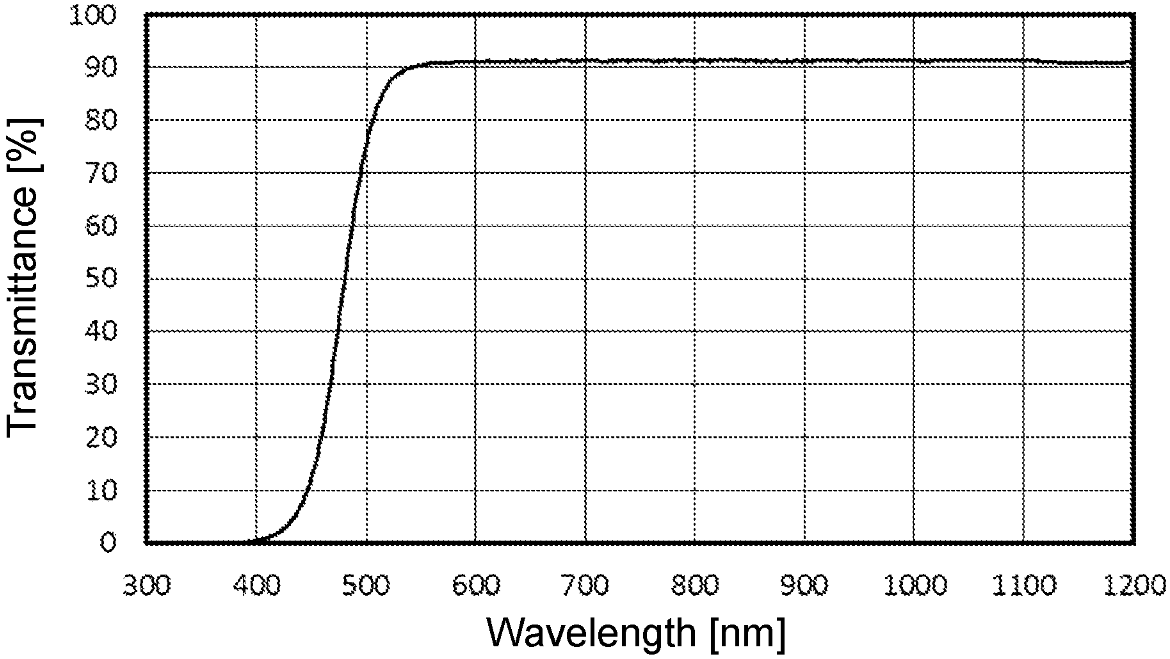
FIG. 13 shows a transmission spectrum of an optical filter according to Example 11.
Figure 14:
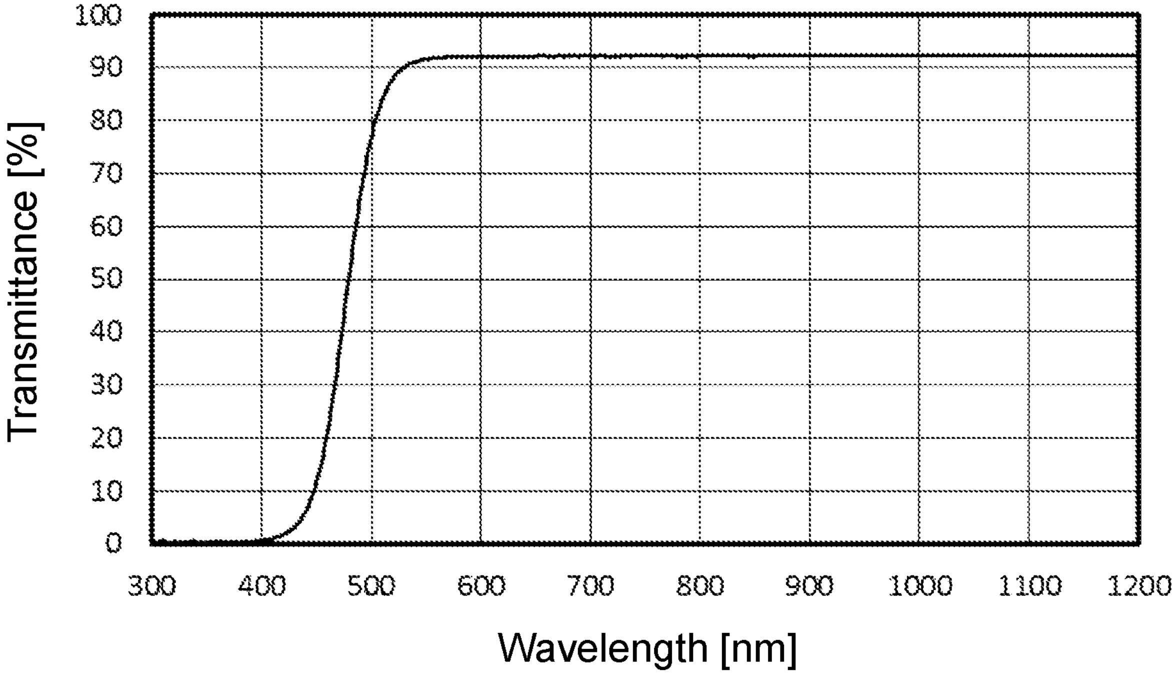
FIG. 14 shows a transmission spectrum of an optical filter according to Example 12.
Figure 15:
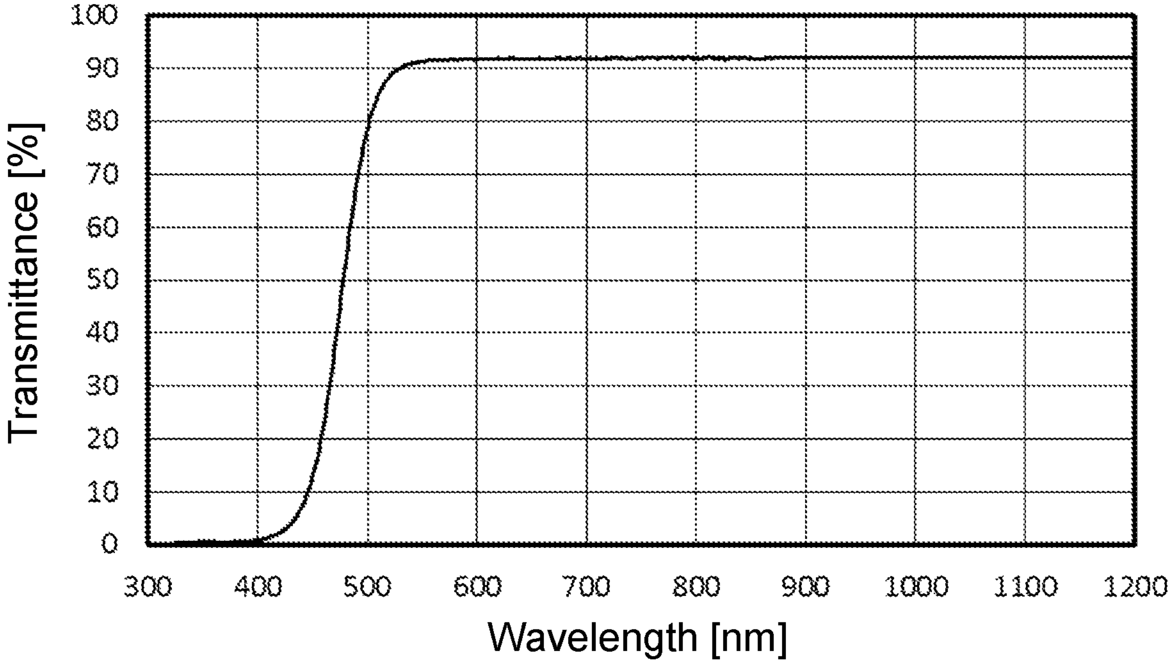
FIG. 15 shows a transmission spectrum of an optical filter according to Example 13.
Figure 16:
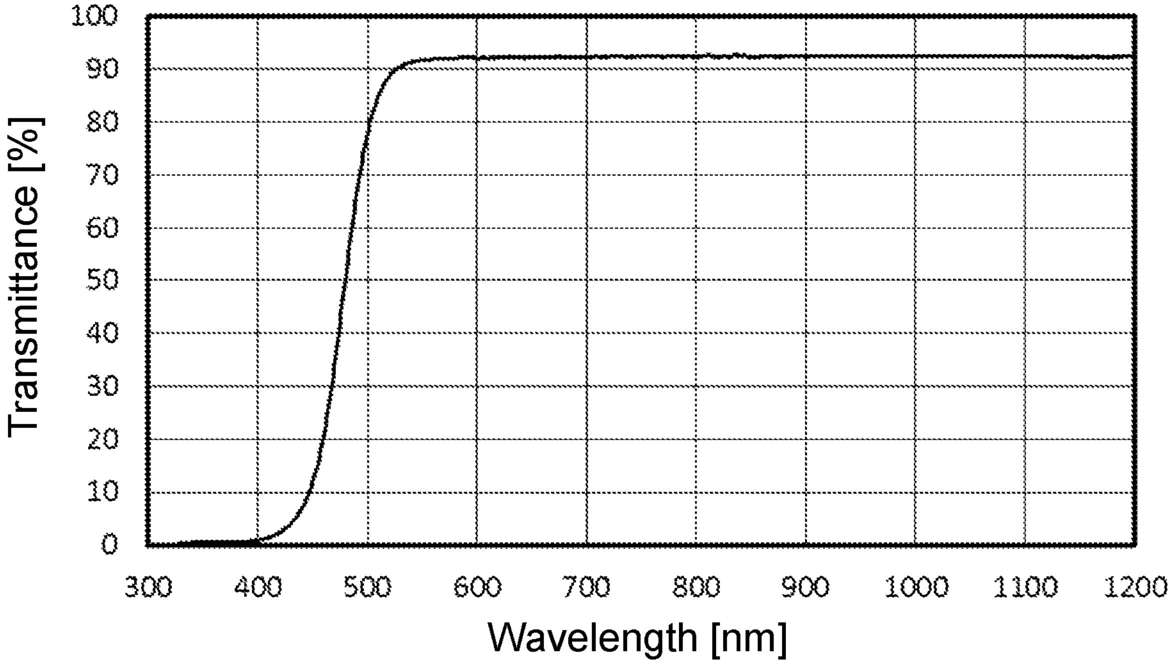
FIG. 16 shows a transmission spectrum of an optical filter according to Example 14.
Figure 17:
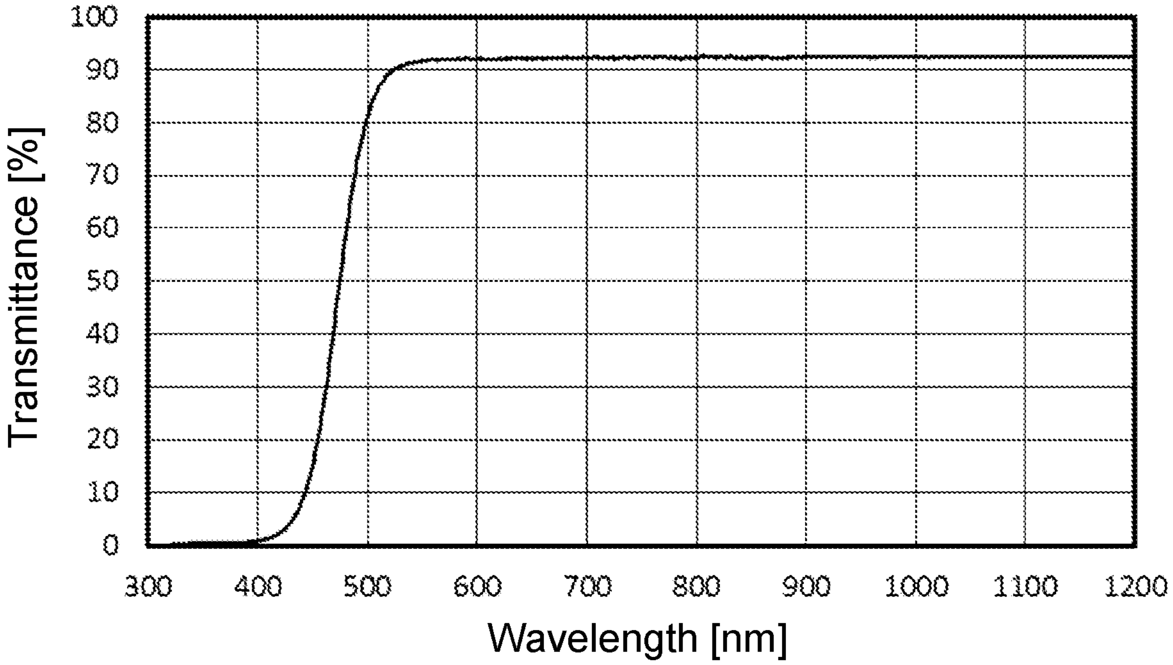
FIG. 17 shows a transmission spectrum of an optical filter according to Example 15.
Figure 18:
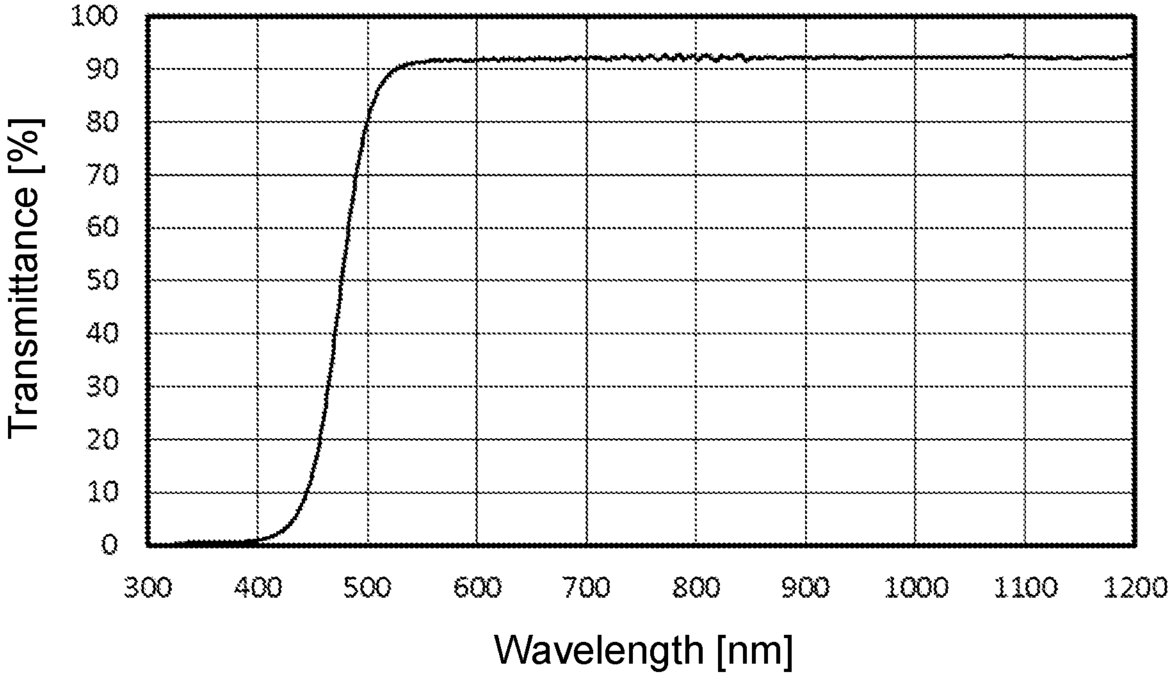
FIG. 18 shows a transmission spectrum of an optical filter according to Example 16.
Figure 19:
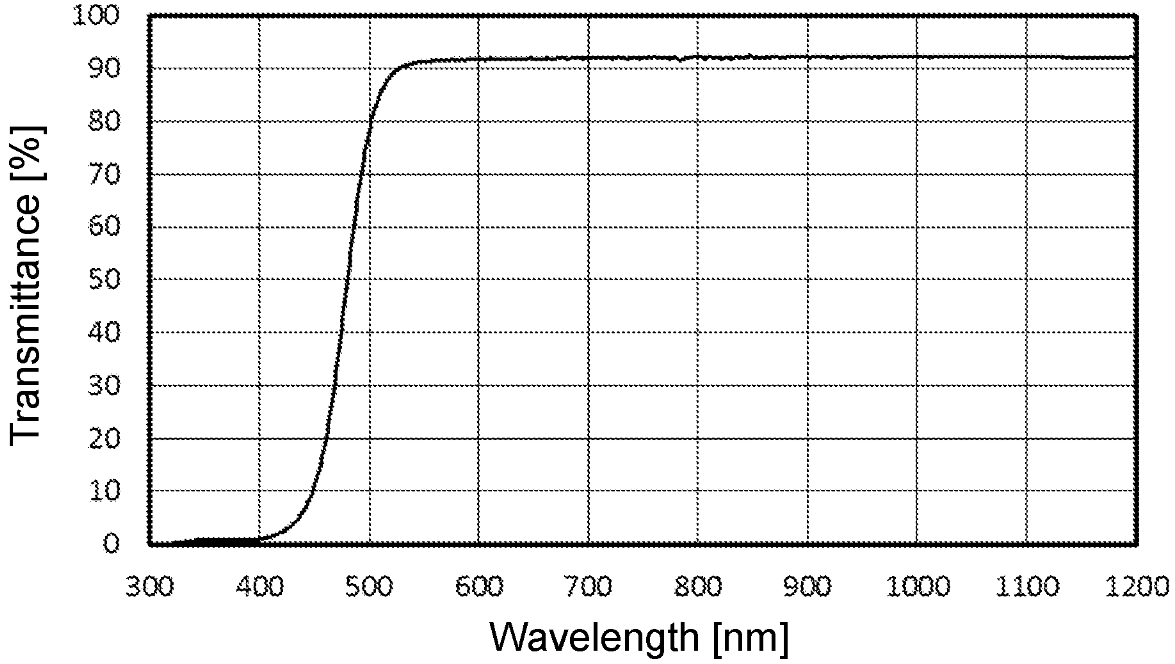
FIG. 19 shows a transmission spectrum of an optical filter according to Example 17.
Figure 20:
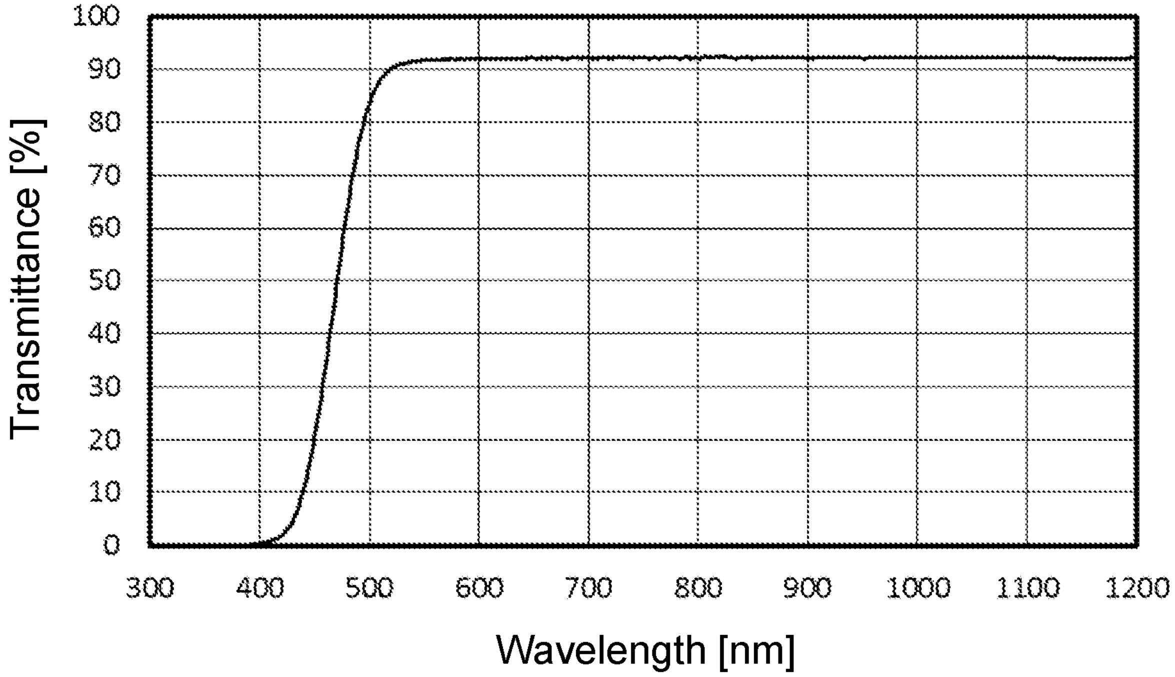
FIG. 20 shows a transmission spectrum of an optical filter according to Example 18.
Figure 21:
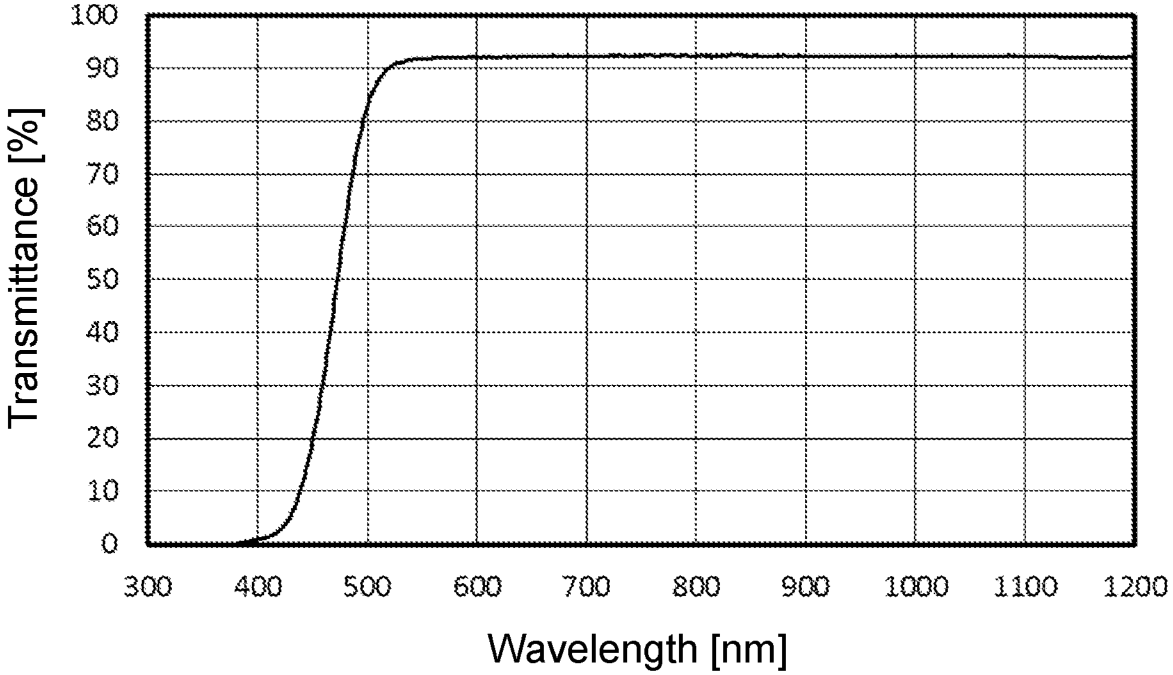
FIG. 21 shows a transmission spectrum of an optical filter according to Example 19.

Light-absorbing compositions according to Examples 3 and 4 were prepared in the same manner as in Example 2, except that the added amount of the ultraviolet absorber solution and the added amount of the metal-component-including liquid composition were changed as shown in Table 3. Coating films of the light-absorbing compositions were cured on transparent glass substrates in the same manner as in Example 2, except that the light-absorbing compositions according to Examples 3 and 4 were used instead of the light-absorbing composition according to Example 2. Light-absorbing films according to Examples 3 and 4 were thereby formed. Optical filters according to Examples 3 and 4 were produced in this manner. FIGS. 5 and 6 respectively show transmission spectra of the optical filters according to Examples 3 and 4. Furthermore, Table 5 shows wavelength- and transmittance-related properties obtained from FIGS. 5 and 6 and the thicknesses of the light-absorbing films.

Examples 5 to 8

Preparation of ultraviolet absorber solutions, preparation of metal-component-including liquid compositions, and preparation of light-absorbing compositions were performed in the same manner as in Example 1, except that the types of the components and the contents of the components were adjusted as shown in Table 3. Light-absorbing compositions according to Examples 5 to 8 were thereby obtained. For Examples 5 to 8, the metal-component-including compound (2-ii) was used in the preparation of the metal-component-including liquid compositions. For Examples 5 and 6, the ultraviolet absorber (1-i) was used in the preparation of the ultraviolet absorber solutions, and for Examples 7 and 8, the ultraviolet absorber (1-ii) was used in the preparation of the ultraviolet absorber solutions. The amount of solids in each light-absorbing composition was determined assuming that the metal component content in the metal-component-including compound (2-ii) was 11.3 mass %.

Coating films of the light-absorbing compositions were cured on transparent glass substrates in the same manner as in Example 1, except that the light-absorbing compositions according to Examples 5 to 8 were used instead of the light-absorbing composition according to Example 1. Light-absorbing films according to Examples 5 to 8 were thereby formed. Optical filters according to Examples 5 to 8 were produced in this manner. FIGS. 7 to 10 respectively show transmission spectra of the optical filters according to Examples 5 to 8. Furthermore, Table 5 shows wavelength- and transmittance-related properties obtained from FIGS. 7 to 10 and the thicknesses of the light-absorbing films.

Examples 9 to 19

Preparation of ultraviolet absorber solutions, preparation of metal-component-including liquid compositions, and preparation of light-absorbing compositions were performed in the same manner as in Example 1, except that the types of the components and the contents of the components were adjusted as shown in Table 3. Light-absorbing compositions according to Examples 9 to 19 were thereby obtained. For Examples 9 to 17, the ultraviolet absorber (1-i) was used in the preparation of the ultraviolet absorber solutions, and for Examples 18 and 19, the ultraviolet absorber (1-ii) was used in the preparation of the ultraviolet absorber solutions. For Examples 9 to 19, the metal-component-including compound (2-iii) was used in the preparation of the metal-component-including liquid compositions. The amount of solids in each light-absorbing composition was determined assuming that the metal component content in the metal-component-including compound (2-iii) was 13.2 mass %.

Coating films of the light-absorbing compositions were cured on transparent glass substrates in the same manner as in Example 1, except that the light-absorbing compositions according to Examples 9 to 19 were used instead of the light-absorbing composition according to Example 1. Light-absorbing films according to Examples 9 to 19 were thereby formed. Optical filters according to Examples 9 to 19 were produced in this manner. FIGS. 11 to 21 respectively show transmission spectra of the optical filters according to Examples 9 to 19. Furthermore, Table 5 shows wavelength- and transmittance-related properties obtained from FIGS. 11 to 21 and the thicknesses of the light-absorbing films.

Example 20

Figure 22:
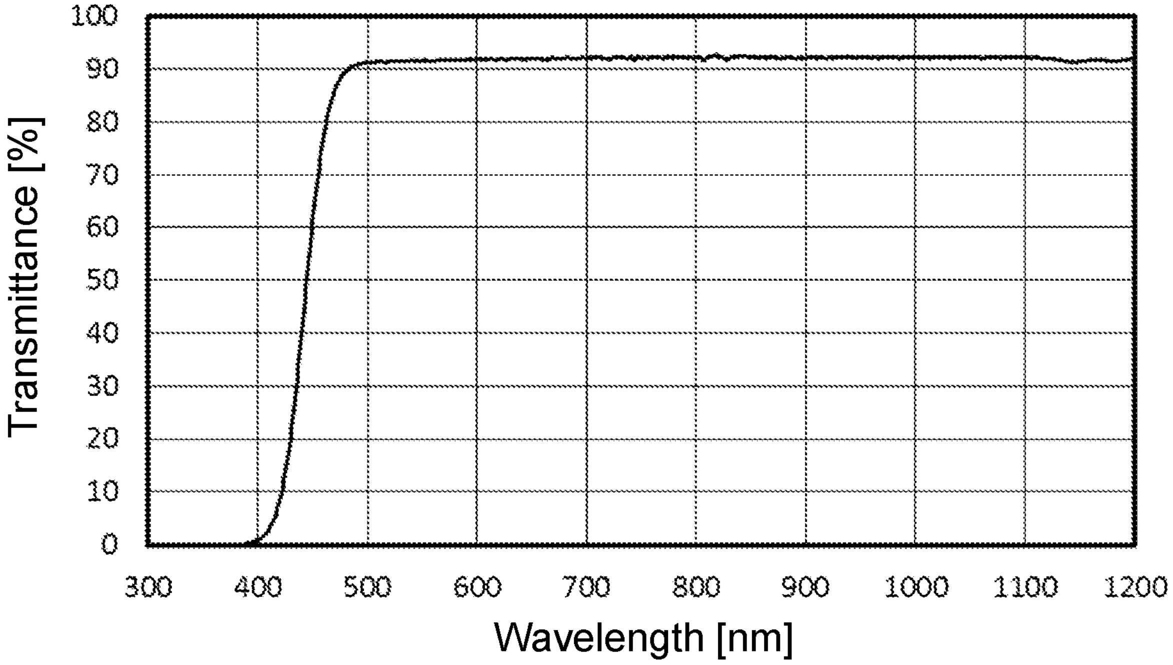
FIG. 22 shows a transmission spectrum of an optical filter according to Example 20.

A light-absorbing composition according to Example 20 was obtained in the same manner as in Example 1, except that the ultraviolet absorber (1-iii) was used instead of the ultraviolet absorber (1-i) to prepare an ultraviolet absorber solution according to Example 20. A coating film of the light-absorbing composition was cured on a transparent glass substrate in the same manner as in Example 1, except that the light-absorbing composition according to Example 20 was used instead of the light-absorbing composition according to Example 1. A light-absorbing film according to Example 20 was thereby formed. An optical filter according to Example 20 was produced in this manner. FIG. 22 shows a transmission spectrum of the optical filter according to Example 20. Furthermore, Table 5 shows wavelength- and transmittance-related properties obtained from FIG. 22 and the thickness of the light-absorbing film.

Comparative Example 1

Figure 23:
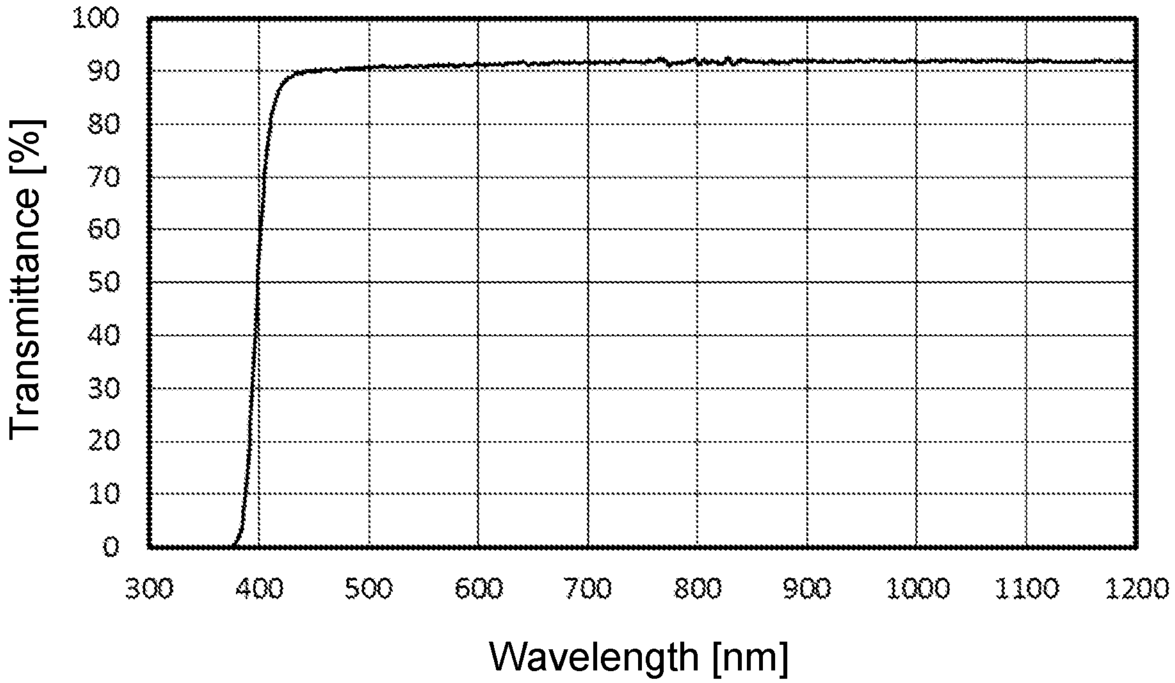
FIG. 23 shows a transmission spectrum of an optical filter according to Comparative Example 1.

An amount of 2.0 g of the ultraviolet absorber solution according to Example 1 and 10.0 g of a silicone resin (manufactured by Shin-Etsu Chemical Co., Ltd.; product name: KR-300) were mixed and then stirred for 30 minutes to obtain a light-absorbing composition according to Comparative Example 1. Table 4 shows the contents of the components and the mass ratio between the given components in the ultraviolet absorber solution and the light-absorbing composition. A coating film of the light-absorbing composition was cured on a transparent glass substrate in the same manner as in Example 1, except that the light-absorbing composition according to Comparative Example 1 was used instead of the light-absorbing composition according to Example 1. A light-absorbing film according to Comparative Example 1 was thereby formed. An optical filter according to Comparative Example 1 was produced in this manner. FIG. 23 shows a transmission spectrum of the optical filter according to Comparative Example 1. Furthermore, Table 5 shows wavelength- and transmittance-related properties obtained from FIG. 23 and the thickness of the light-absorbing film.

Comparative Example 2

Figure 24:
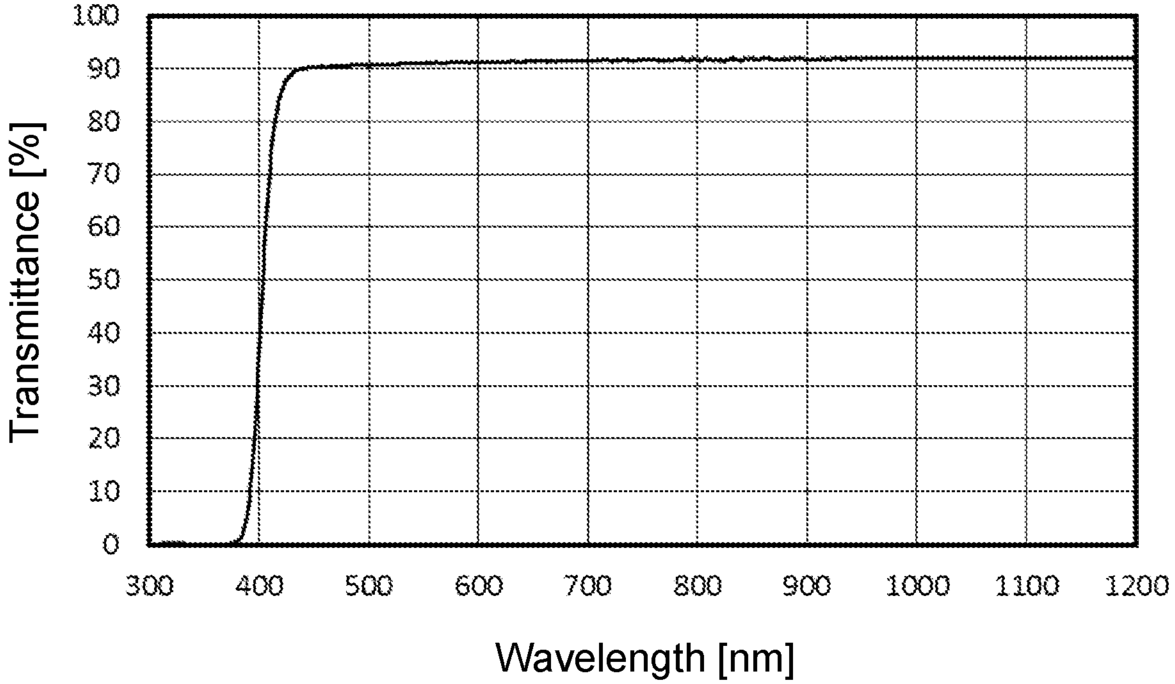
FIG. 24 shows a transmission spectrum of an optical filter according to Comparative Example 2.

An amount of 5.0 g of the ultraviolet absorber solution according to Example 2 and 10.0 g of a silicone resin (manufactured by Shin-Etsu Chemical Co., Ltd.; product name: KR-300) were mixed and then stirred for 30 minutes to obtain a light-absorbing composition according to Comparative Example 2. Table 4 shows the contents of the components and the mass ratio between the given components in the ultraviolet absorber solution and the light-absorbing composition. A coating film of the light-absorbing composition was cured on a transparent glass substrate in the same manner as in Example 1, except that the light-absorbing composition according to Comparative Example 2 was used instead of the light-absorbing composition according to Example 1. A light-absorbing film according to Comparative Example 2 was thereby formed. An optical filter according to Comparative Example 2 was produced in this manner. FIG. 24 shows a transmission spectrum of the optical filter according to Comparative Example 2. Furthermore, Table 5 shows wavelength- and transmittance-related properties obtained from FIG. 24 and the thickness of the light-absorbing film.

Comparative Example 3

Figure 25:
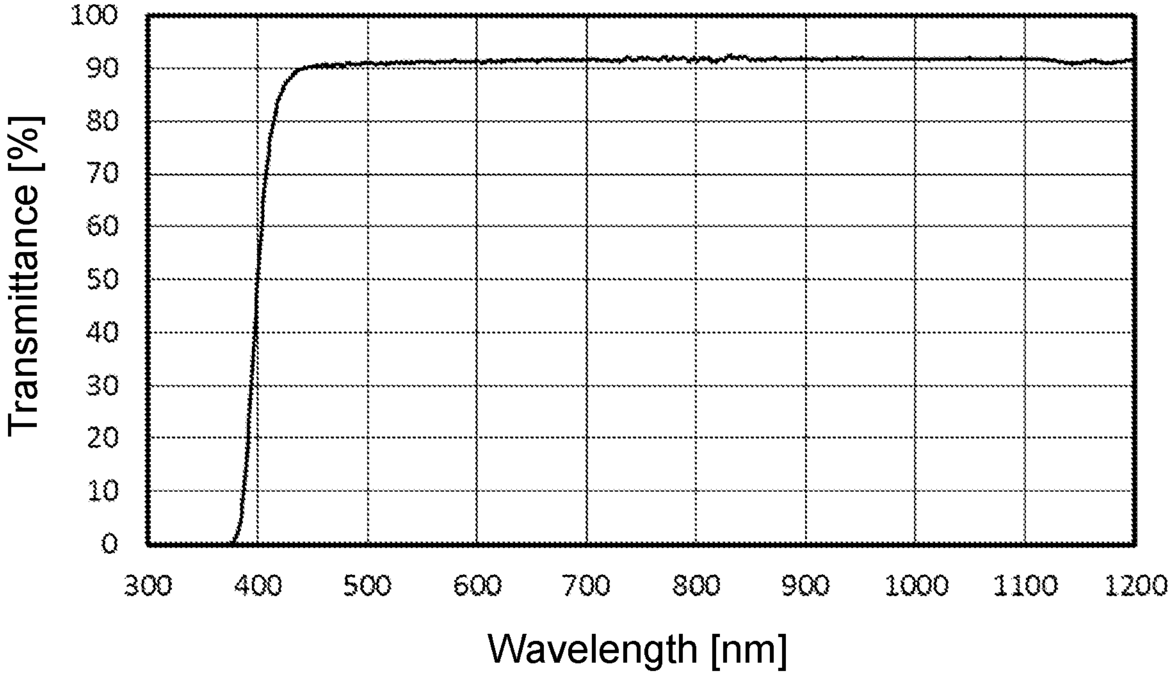
FIG. 25 shows a transmission spectrum of an optical filter according to Comparative Example 3.

An amount of 2.0 g of the ultraviolet absorber solution according to Example 20 and 10.0 g of a silicone resin (manufactured by Shin-Etsu Chemical Co., Ltd.; product name: KR-300) were mixed and then stirred for 30 minutes to obtain a light-absorbing composition according to Comparative Example 3. Table 4 shows the contents of the components and the mass ratio between the given components in the ultraviolet absorber solution and the light-absorbing composition. A coating film of the light-absorbing composition was cured on a transparent glass substrate in the same manner as in Example 1, except that the light-absorbing composition according to Comparative Example 3 was used instead of the light-absorbing composition according to Example 1. A light-absorbing film according to Comparative Example 3 was thereby formed. An optical filter according to Comparative Example 3 was produced in this manner. FIG. 25 shows a transmission spectrum of the optical filter according to Comparative Example 3. Furthermore, Table 5 shows wavelength- and transmittance-related properties obtained from FIG. 25 and the thickness of the light-absorbing film.

Comparative Examples 4 and 5

Figure 26:
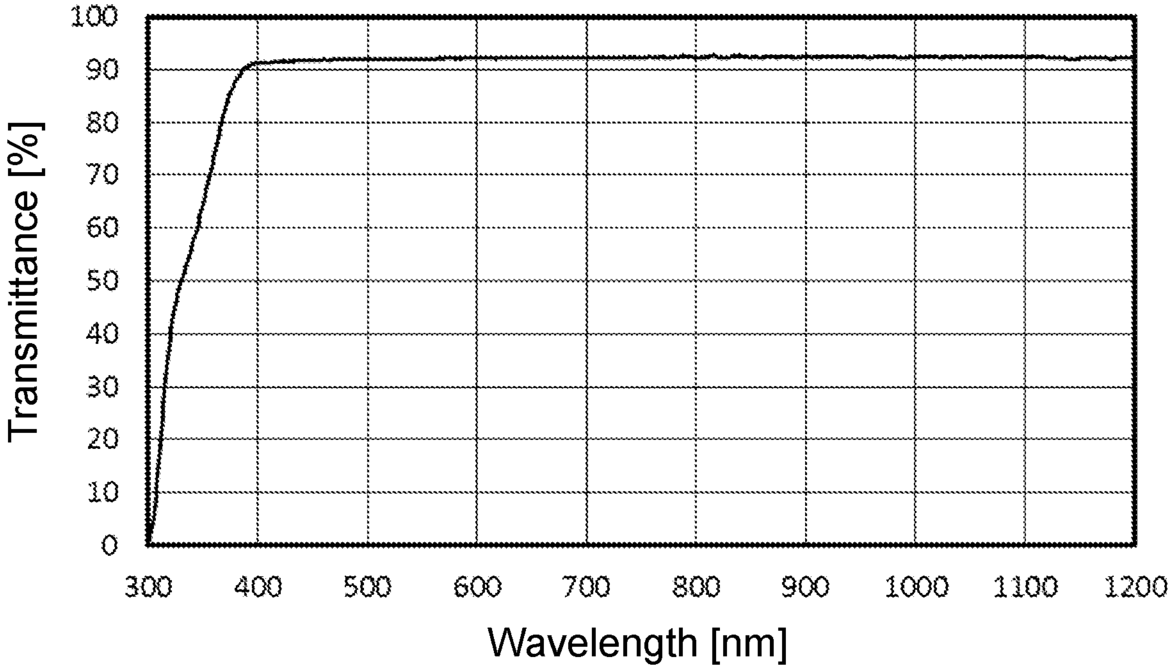
FIG. 26 shows a transmission spectrum of an optical filter according to Comparative Example 4.
Figure 27:
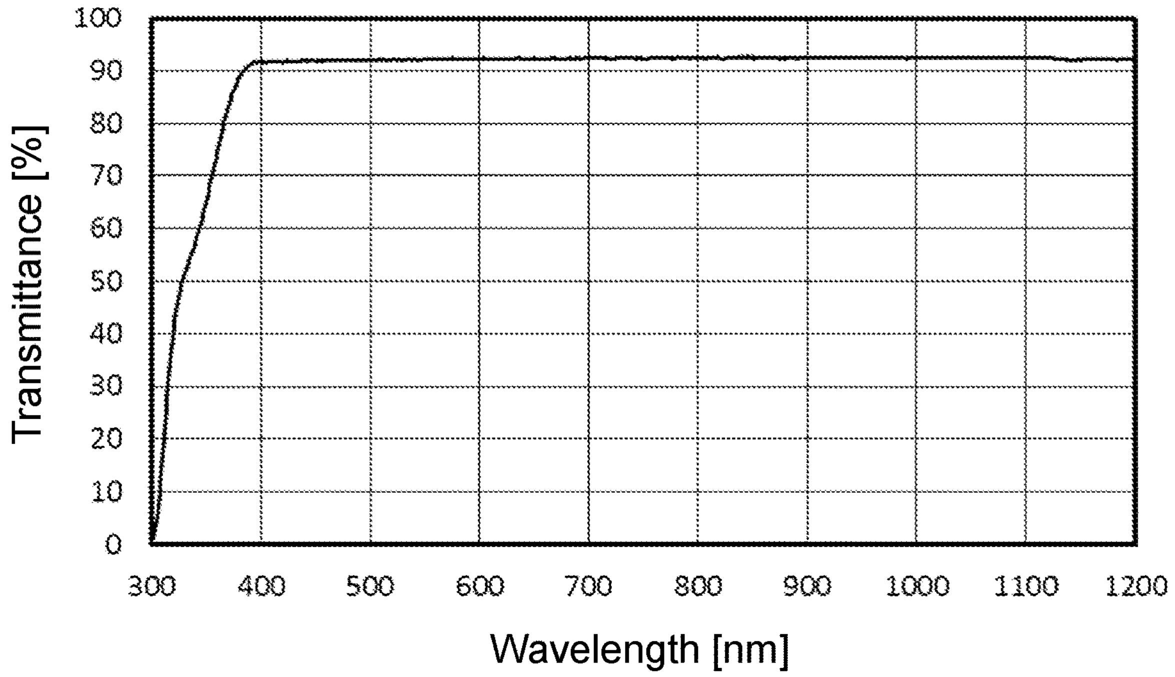
FIG. 27 shows a transmission spectrum of an optical filter according to Comparative Example 5.

An ultraviolet absorber solution according to Comparative Example 4 was prepared in the same manner as in Example 1, except that the ultraviolet absorber (1-iv) was used instead of the ultraviolet absorber (1-i). An amount of 2.0 g of the ultraviolet absorber solution according to Comparative Example 4 and 10.0 g of a silicone resin (manufactured by Shin-Etsu Chemical Co., Ltd.; product name: KR-300) were mixed and then stirred for 30 minutes to obtain a light-absorbing composition according to Comparative Example 4. An amount of 2.0 g of the ultraviolet absorber solution according to Comparative Example 4 and 10.0 g of the metal-component-including liquid composition according to Example 1 were mixed and then stirred for 30 minutes to obtain a light-absorbing composition according to Comparative Example 5. Coating films of the light-absorbing compositions were cured on transparent glass substrates in the same manner as in Example 1, except that the light-absorbing compositions according to Comparative Examples 4 and 5 were used instead of the light-absorbing composition according to Example 1. Light-absorbing films according to Comparative Examples 4 and 5 were thereby formed. Optical filters according to Comparative Examples 4 and 5 were produced in this manner. FIGS. 26 and 27 respectively show transmission spectra of the optical filters according to Comparative Examples 4 and 5. Furthermore, Table 5 shows wavelength- and transmittance-related properties obtained from FIGS. 26 and 27 and the thicknesses of the light-absorbing films.

As shown in Table 5, the transmittance $T_{400}$ at a wavelength of 400 nm is 1% or less for the optical filters according to Examples 1 to 20, and it has been confirmed that the optical filter according to Example 1 has good optical properties including a sufficiently high ultraviolet absorption ability. The maximum transmittance $T^{M}_{300-380}$ in the wavelength range of 300 to 380 nm is 1% or less for the optical filters according to Examples 1 to 20, $T^{M}_{300-380}$ is 0.5% or less for the optical filters according to Examples except for Examples 12 and 14 to 17, and $T^{M}_{300-380}$ is 0.15% or less for the optical filters according to Examples except for Examples 12 to 17. The average transmittance $T^{A}_{550-570}$ in the wavelength range of 550 to 570 nm is 90% or more for the optical filters according to Examples 1 to 20.

Figure 28:
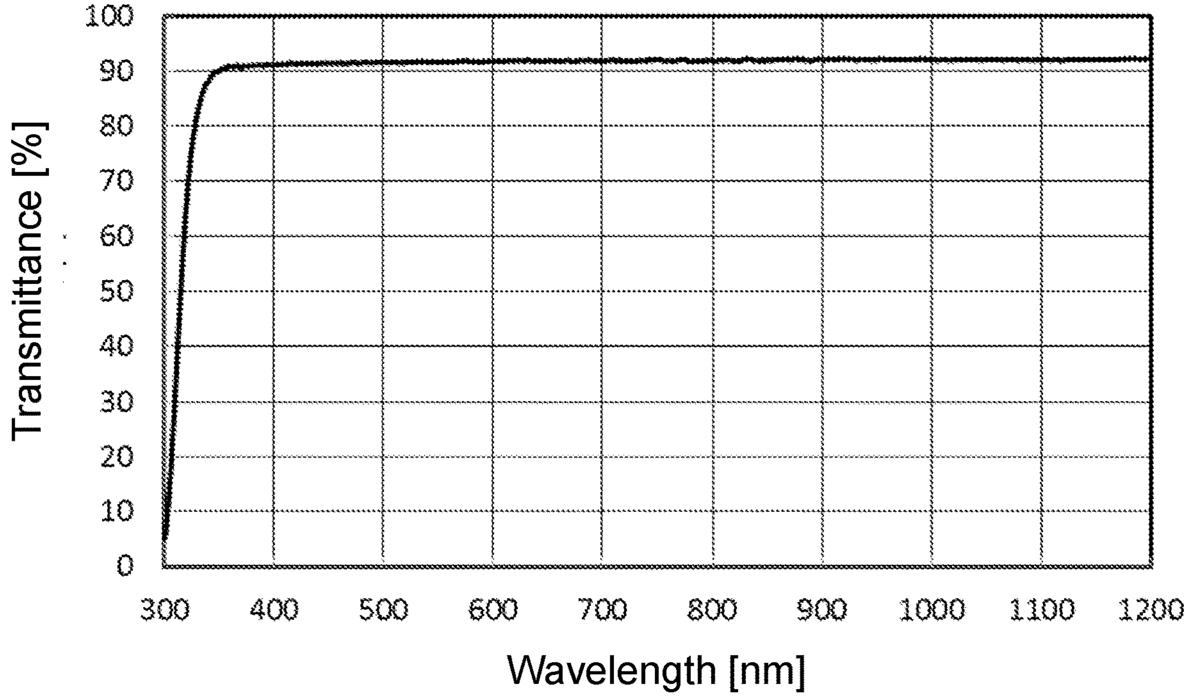
FIG. 28 shows a transmission spectrum of a transparent glass substrate.

FIG. 28 shows a transmission spectrum of a transparent glass substrate as used in Examples and Comparative Examples. This transmission spectrum suggests that the transmittance $T_{400}$ at a wavelength of 400 nm is 5% or less for the light-absorbing films according to Examples 1 to 20.

A comparison is made between the optical filter according to Example 1 and the optical filter according to Comparative Example 1. For the optical filter according to Comparative Example 1, $T_{400}$ is 55.25%. The optical filter according to Example 1 has a high ability to absorb light with a wavelength around 400 nm and longer wavelengths, compared to the optical filter according to Comparative Example 1. This suggests that the light absorption wavelength band shifts toward the long wavelength side due to an interaction, for example, in which the aluminum component being the metal component and the ultraviolet absorber partially form a complex in the light-absorbing film. Moreover, the average transmittance $T^{A}_{550-570}$ is high, namely 90% or more, for the optical filter according to Example 1. This suggests that appropriate inclusion of the ultraviolet absorber under the presence of an alkoxy group reduces scattering caused by asperities produced on a surface of the light-absorbing film by bleed out.

A comparison is made between the optical filter according to Example 2 and the optical filter according to Comparative Example 2. For the optical filter according to Comparative Example 2, $T_{400}$ is 36.39%. The optical filter according to Example 2 has a high ability to absorb light with a wavelength around 400 nm and longer wavelengths, compared to the optical filter according to Comparative Example 2. It is inferred that those revealed by the comparison between Example 1 and Comparative Example 1 are applicable to the case of Example 2 and Comparative Example 2.

The UV cut-off wavelength $\lambda_{UV}$ for the optical filters according to Examples 1 to 20 is 441 to 480 nm, and the UV cut-off wavelength $\lambda_{UV}$ is 450 to 480 nm for the optical filters according to Examples except for Examples 1 to 4 and 20.

As shown in Table 5, the difference between the UV cut-off wavelength $\lambda_{UV}$ for the optical filter according to Example 1 and the UV cut-off wavelength $\lambda_{UV}$ for the optical filter according to Comparative Example 1 is 42 nm. The difference between the UV cut-off wavelength $\lambda_{UV}$ for the optical filter according to Example 2 and the UV cut-off wavelength $\lambda_{UV}$ for the optical filter according to Comparative Example 2 is 41 nm. The difference between the UV cut-off wavelength $\lambda_{UV}$ for the optical filter according to Example 20 and the UV cut-off wavelength $\lambda_{UV}$ for the optical filter according to Comparative Example 3 is 45 nm. From these facts, it can be understood that when the light-absorbing film including the ultraviolet absorber further includes the metal component, a phenomenon occurs in which the UV cut-off wavelength shifts farther to the long wavelength side than the UV cut-off wavelength of the light-absorbing film including the ultraviolet absorber alone. This phenomenon is thought to occur due to a shift of the light absorption band of the light-absorbing film toward the long wavelength side or a shift of the maximum absorption wavelength toward the long wavelength side. This phenomenon is advantageous in imparting desired properties to the optical filter and improving the properties of the optical filter configured to be used with a solid-state image sensing device. The UV cut-off wavelength $\lambda_{UV}$ of the optical filter according to the present invention satisfies, for example, a requirement $|\lambda_{UV}-\lambda_{UV}^{R}|\geq 10$ nm or more so as to improve the properties of the optical filter configured to be used with a solid-state image sensing device. The symbol $\lambda_{UV}^{R}$ represents the UV cut-off wavelength $\lambda_{UV}$ of an optical filter produced in the same manner as for the optical filter according to the present invention, except that a light-absorbing film thereof does not include a metal component. The optical filter according to the present invention desirably satisfies a requirement $|\lambda_{UV}-\lambda_{UV}^{R}|\geq 20$ nm or more, more desirably a requirement $|\lambda_{UV}-\lambda_{UV}^{R}|\geq 35$ mm or more, even more desirably a requirement $|\lambda_{UV}-\lambda_{UV}^{R}|\geq 40$ nm or more.

According to the evaluation results for the optical filters according to Comparative Examples 4 and 5, when benzophenone having no hydroxy group in a molecule is used as an ultraviolet absorber, the above advantage is unable to be achieved regardless of whether the light-absorbing film includes the metal component. A comparison between Examples and Comparative Examples 4 and 5 suggests that a hydroxy group needs to be present in a molecule of the ultraviolet absorber to cause the UV cut-off wavelength to shift toward the long wavelength side and that an interaction, such as complex formation, between the hydroxy group or a hydroxy group from which a hydrogen atom has been eliminated and the metal component is necessary. Moreover, a light absorption mechanism of a benzophenone-based compound having a hydroxy group is thought to be based on a resonance structure related to abstraction and reception of a hydrogen atom between a carbonyl group and a hydroxy group in a molecule. Examples of such a substance that causes light absorption by the action of abstraction and reception of a hydrogen atom in a molecule include hydroxybenzophenone, salicylic acid, a benzotriazole-based compound, and a triazine compound. A benzotriazole-based compound and a triazine compound have a hydroxy group; a mechanism of abstraction and reception of a hydrogen atom occurs between the hydroxy group and a nitrogen atom in a molecule. On the other hand, to cause the UV cut-off wavelength or the light absorption band to shift by an interaction with the metal component, the use of an ultraviolet absorber, such as hydroxybenzophenone or salicylic acid, having a hydroxy group and a carbonyl group in a molecule is thought to be desirable.

According to Table 3, the ultraviolet absorber content in the light-absorbing composition is, for example, 0.05% to 3%, desirably 0.1% to 2%, more desirably 0.2% to 1% on a mass basis. The metal component content in light-absorbing composition is, for example, 0.005% to 5%, desirably 0.01 to 3%, more desirably 0.02% to 2% on a mass basis.

Moreover, according to Table 3, the ultraviolet absorber content in the light-absorbing film 10 is not limited to a particular value. The content is, for example, 0.1% to 10%, desirably 0.2% to 5%, more desirably 0.4% to 3% on a mass basis. Additionally, the metal component content in the light-absorbing film 10 is, for example, 0.02% to 5%, desirably 0.04% to 4%, more desirably 0.06% to 3.5% on a mass basis.

Example 21

An amount of 5.0 g of the ultraviolet absorber (1-i), 80.0 g and cyclohexanone, and 8.0 g of polyvinyl butyral were mixed and then stirred for 30 minutes. Next, 0.308 g of the metal-component-including compound (2-i) was mixed therewith and then stirred for 30 minutes to obtain a light-absorbing composition according to Example 21. Tables 1 and 2 show the details of the light absorber and the metal-component-including compound. Table 7 shows the contents of the components and the mass ratio between the given components in the light-absorbing composition according to Example 21. Incidentally, the proportion of the components in the light-absorbing composition according to Example 21 was determined assuming that the metal component content in the metal-component-including compound (2-i) was 6.5 mass % as shown in Table 2.

Figure 29:
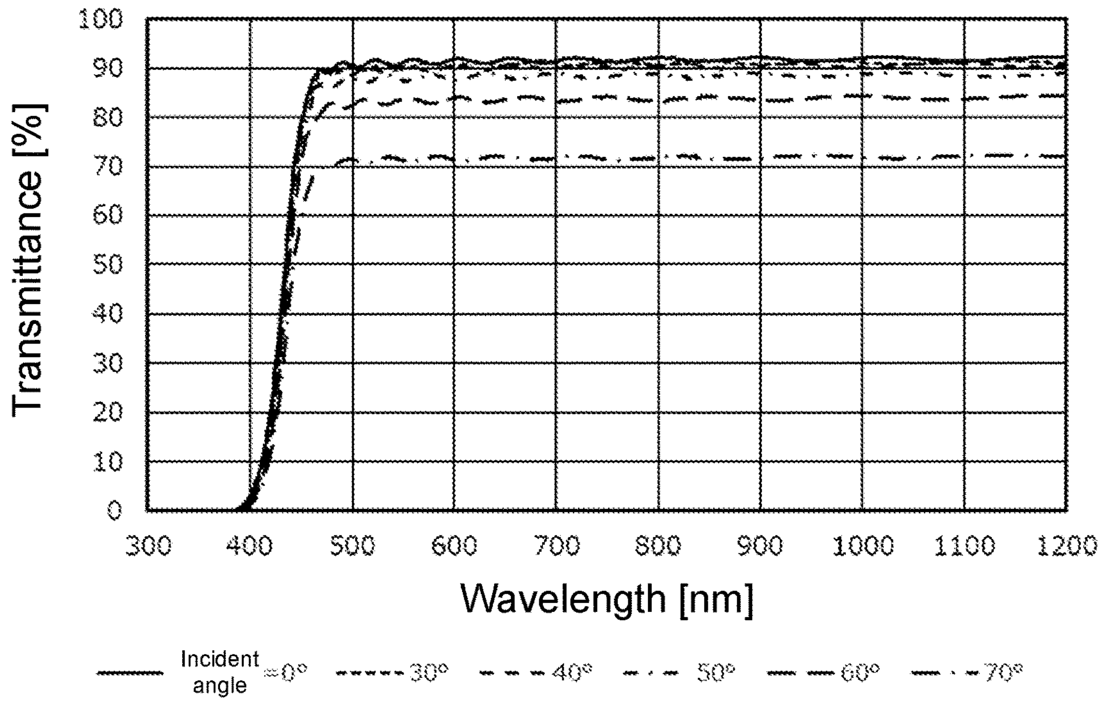
FIG. 29 shows transmission spectra of an optical filter according to Example 21.
Figure 30:
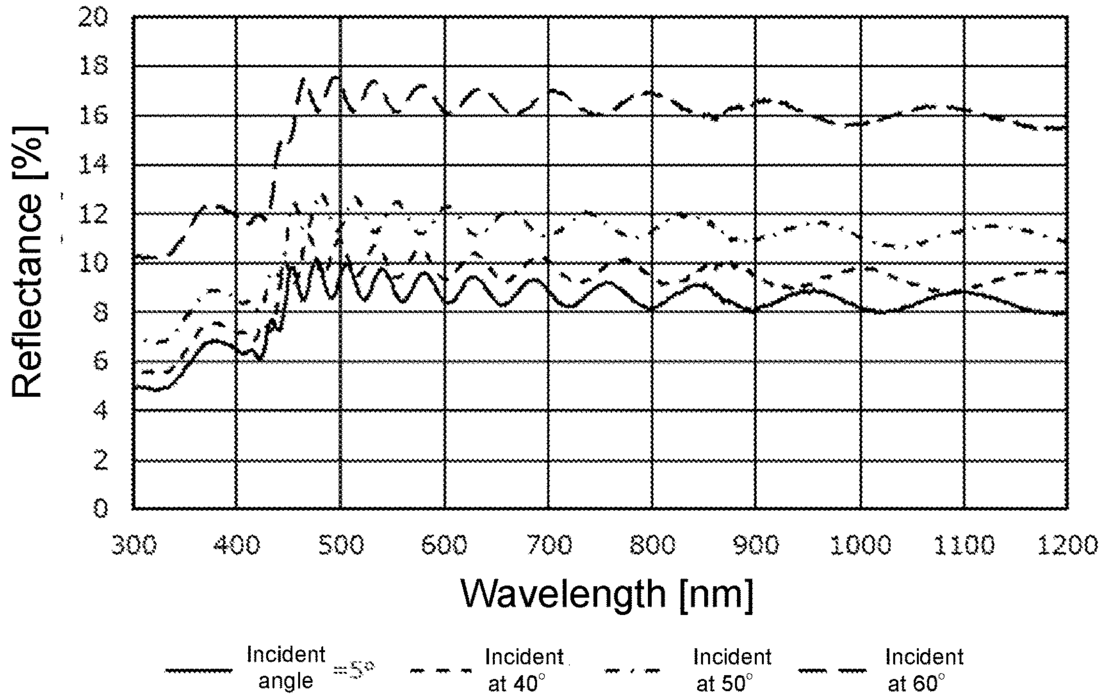
FIG. 30 shows reflection spectra of the optical filter according to Example 21.

The light-absorbing composition according to Example 21 was applied with a dispenser by spin coating to a central portion of one principal surface of a transparent glass substrate (manufactured by SCHOTT AG; product name: D263 T eco) made of borosilicate glass having dimensions of 76 mm×76 mm×0.21 mm to form a coating film. After sufficiently dried at room temperature, the coating film was put in an oven and subjected to heat treatment at 140° C. for 1 hour and then at 160° C. for 2 hours to complete the reaction. A light-absorbing film according to Example 21 was thereby obtained. An optical filter including the light-absorbing film according to Example 21 was produced in this manner. FIG. 29 shows transmission spectra measured for the optical filter according to Example 21 at incident angles of 0°, 30°, 40°, 50°, 60°, and 70°. FIG. 30 shows reflection spectra measured for the optical filter according to Example 21 at incident angles of 5°, 40°, 50°, and 60°. Furthermore, Table 8 shows wavelength- and transmittance-related properties obtained from FIG. 29 and the thickness of the light-absorbing film. Table 9 shows the incident angle dependence of the transmission spectra, the incident angle dependence being represented by parameters $|\lambda^{30}_{UV}-\lambda_{UV}|$, $|\lambda^{40}_{UV}-\lambda_{UV}|$, $|\lambda^{50}_{UV}-\lambda_{UV}|$, $|\lambda^{60}_{UV}-\lambda_{UV}|$, and $|\lambda^{70}_{UV}-\lambda_{UV}|$. Table 10 shows the maximum reflectances in the wavelength range of 300 nm to 450 nm and the maximum reflectances in the wavelength range of 300 nm to 600 nm in the transmission spectra at the incident angles.

Figure 31:
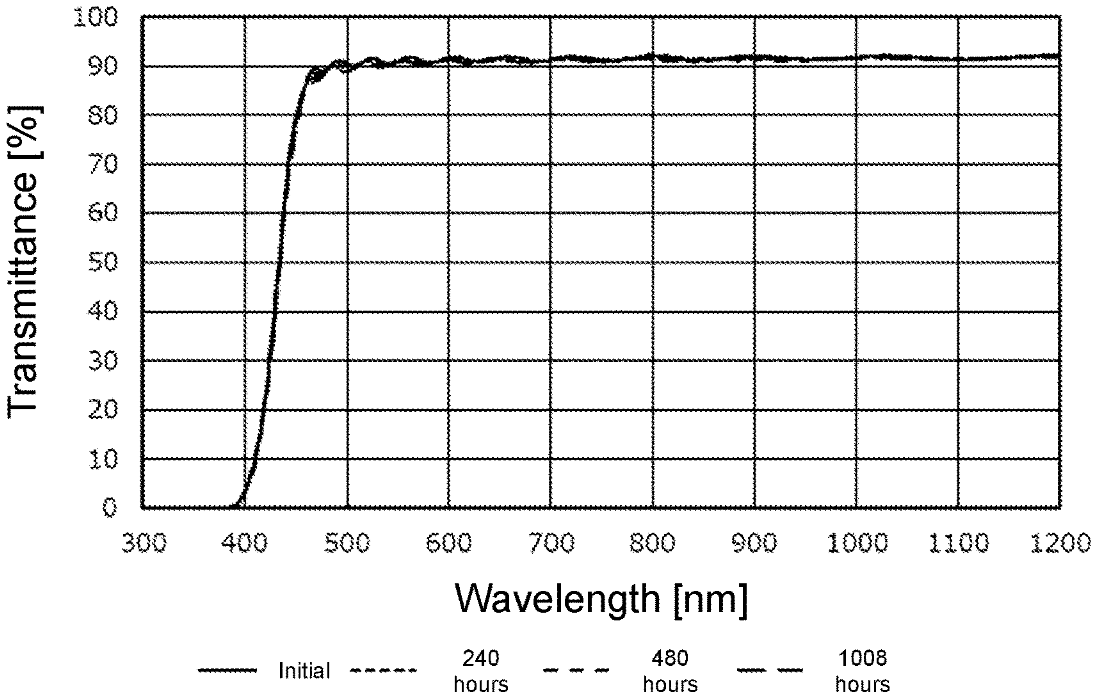
FIG. 31 shows transmission spectra of the optical filter according to Example 21 subjected to a high-temperature and high-humidity test.

A high-temperature and high-humidity test (damp heat test), in which an optical filter was left to stand in a thermo-hygrostat test chamber and exposed to an environment at a temperature of 85° C. and a relative humidity of 85% for 1008 hours, was performed for the optical filter according to Example 21. A thermo-hygrostat KCL-2000A manufactured by Tokyo Rikakikai Co., Ltd. was used as the thermo-hygrostat test chamber. The optical filter was taken out 240 hours and 480 hours after the start of the high-temperature and high-humidity test and was measured for transmission spectra. The measurement was performed at 25° C. at an incident angle of 0°. FIG. 31 shows transmission spectra of the optical filter according to Example 21 before and after the high-temperature and high-humidity test. Table 11 shows the values of $|\lambda^{DH\text{-}240}_{UV}-\lambda_{UV}|$ and $|T^{DH\text{-}240}_{480\text{-}600}-T^{m}_{480\text{-}600}|$, the values of $|\lambda^{DH\text{-}480}_{UV}-\lambda_{UV}|$ and $|T^{DH\text{-}480}_{480\text{-}600}-T^{m}_{480\text{-}600}|$, and the values of $|\lambda^{DH\text{-}1K}_{UV}-\lambda_{UV}|$ and $|T^{DH\text{-}1K}_{480\text{-}600}-T^{m}_{480\text{-}600}|$.

Figure 32:
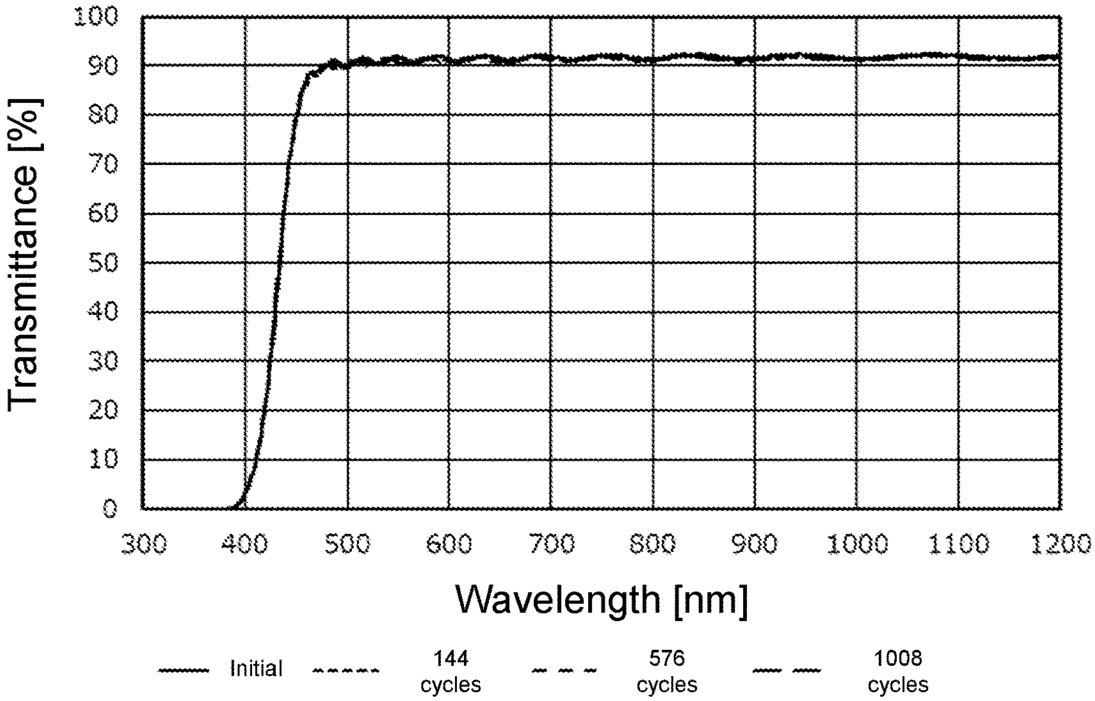
FIG. 32 shows transmission spectra of the optical filter according to Example 21 subjected to a heat cycle test.
Figure 33:
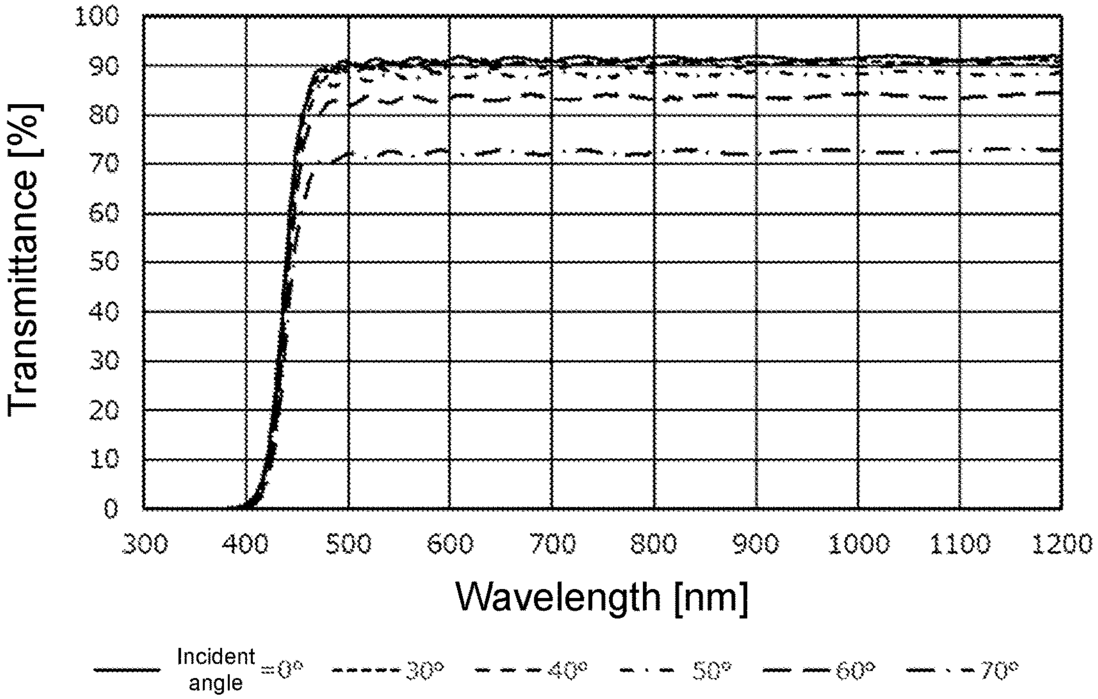
FIG. 33 shows transmission spectra of an optical filter according to Example 23.
Figure 34:
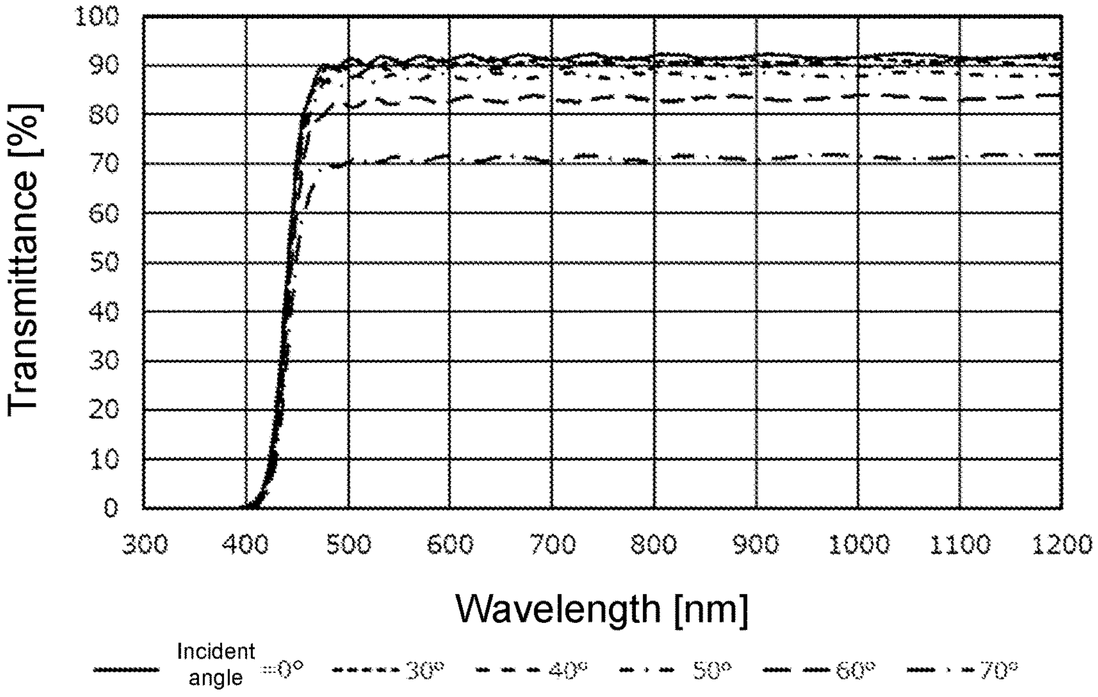
FIG. 34 shows transmission spectra of an optical filter according to Example 24.
Figure 35:
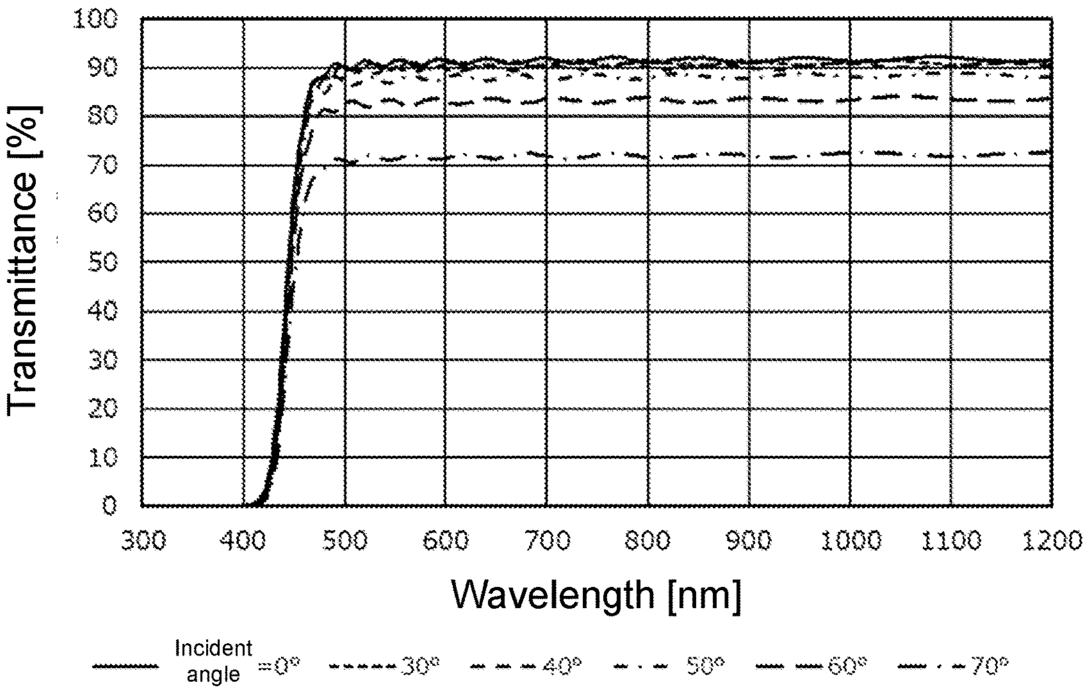
FIG. 35 shows transmission spectra of an optical filter according to Example 26.
Figure 36:
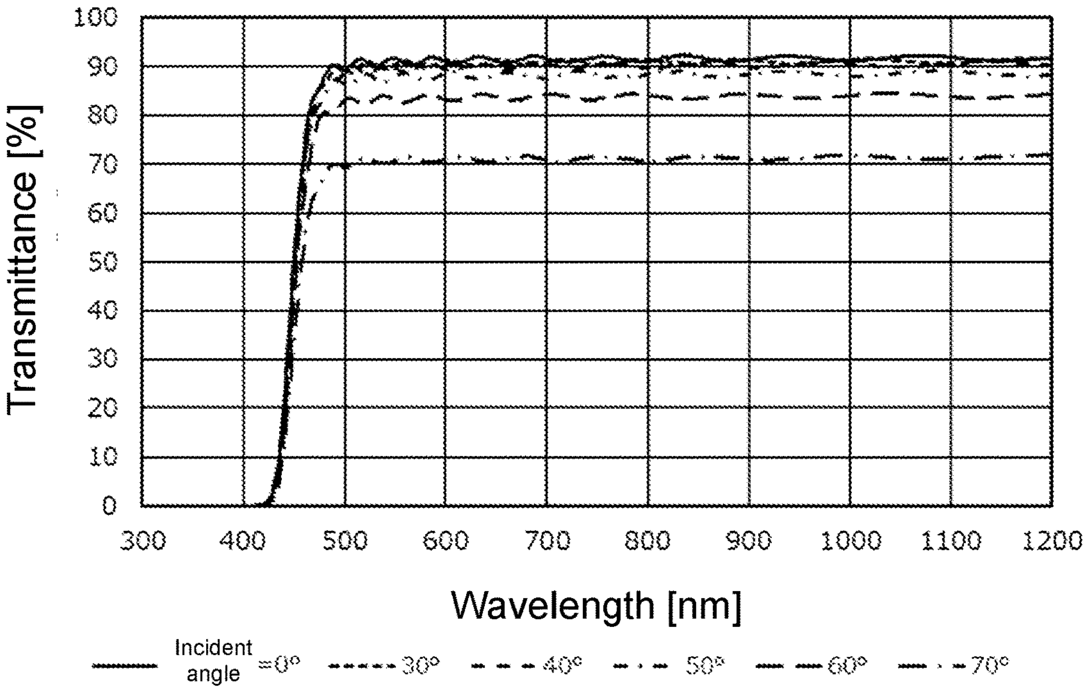
FIG. 36 shows transmission spectra of an optical filter according to Example 32.
Figure 37:
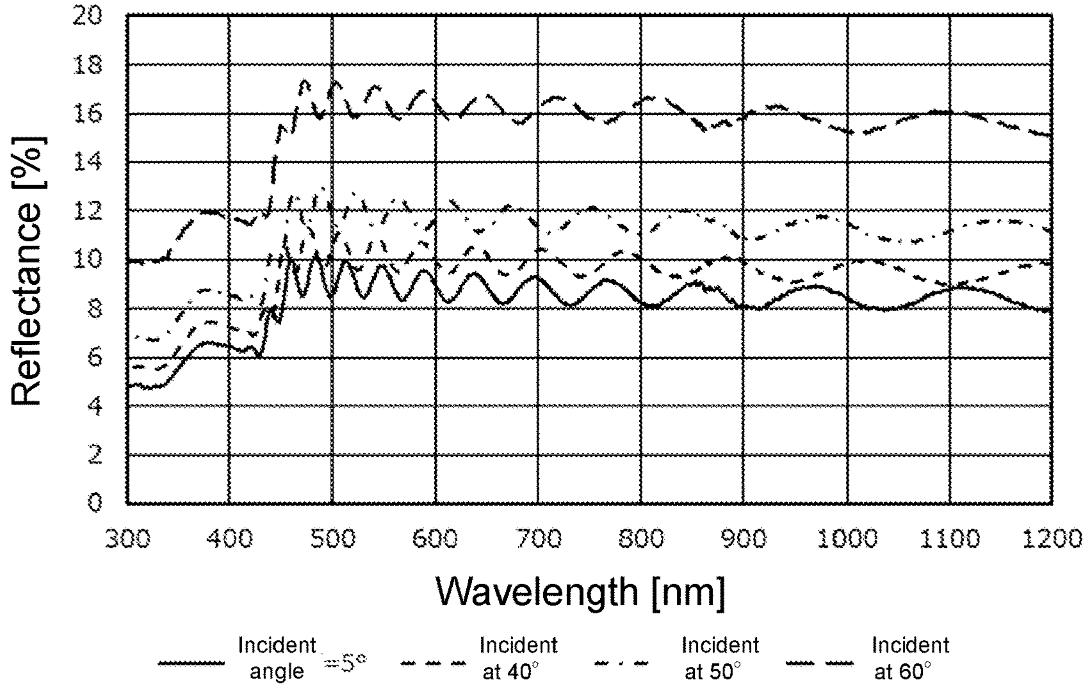
FIG. 37 shows reflection spectra of an optical filter according to Example 23.
Figure 38:
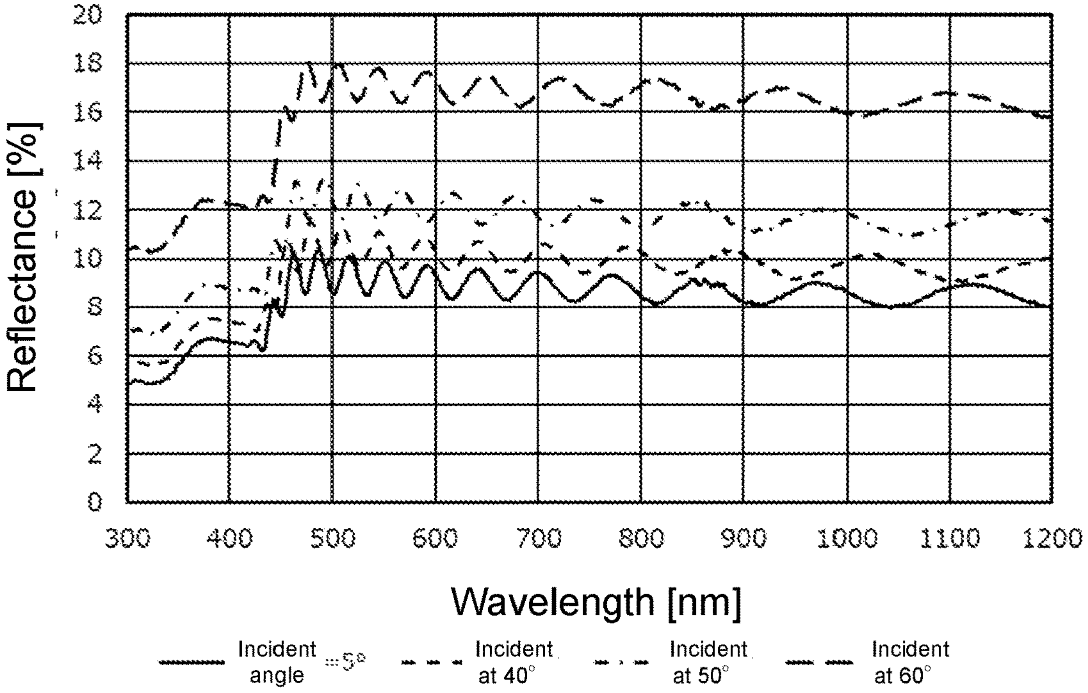
FIG. 38 shows reflection spectra of an optical filter according to Example 24.
Figure 39:
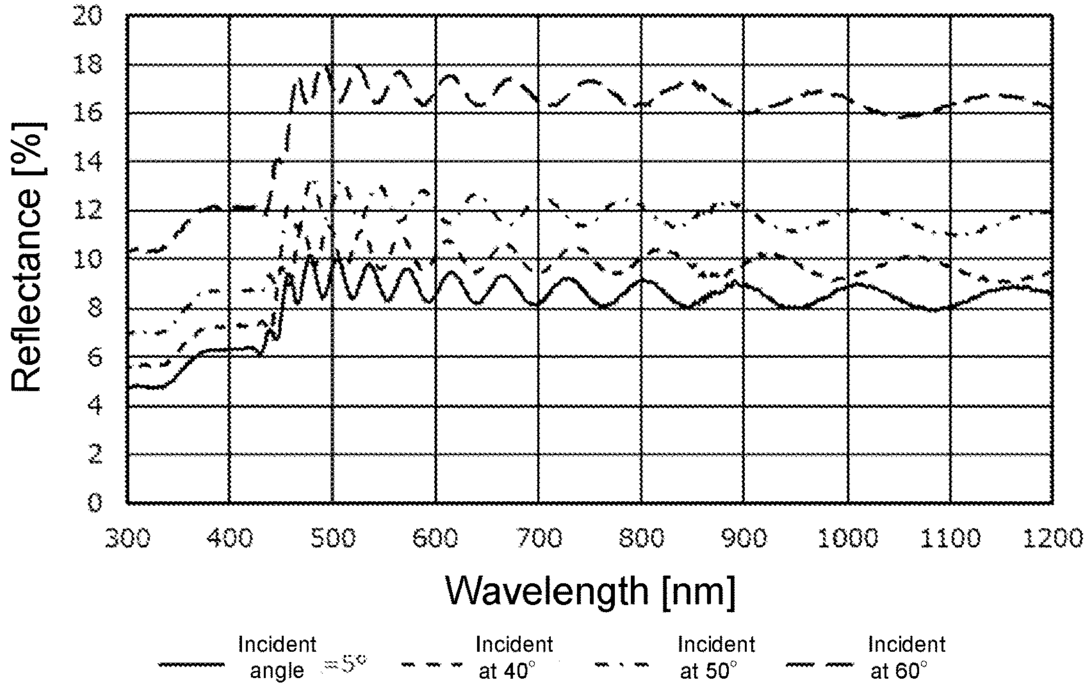
FIG. 39 shows reflection spectra of an optical filter according to Example 26.
Figure 40:
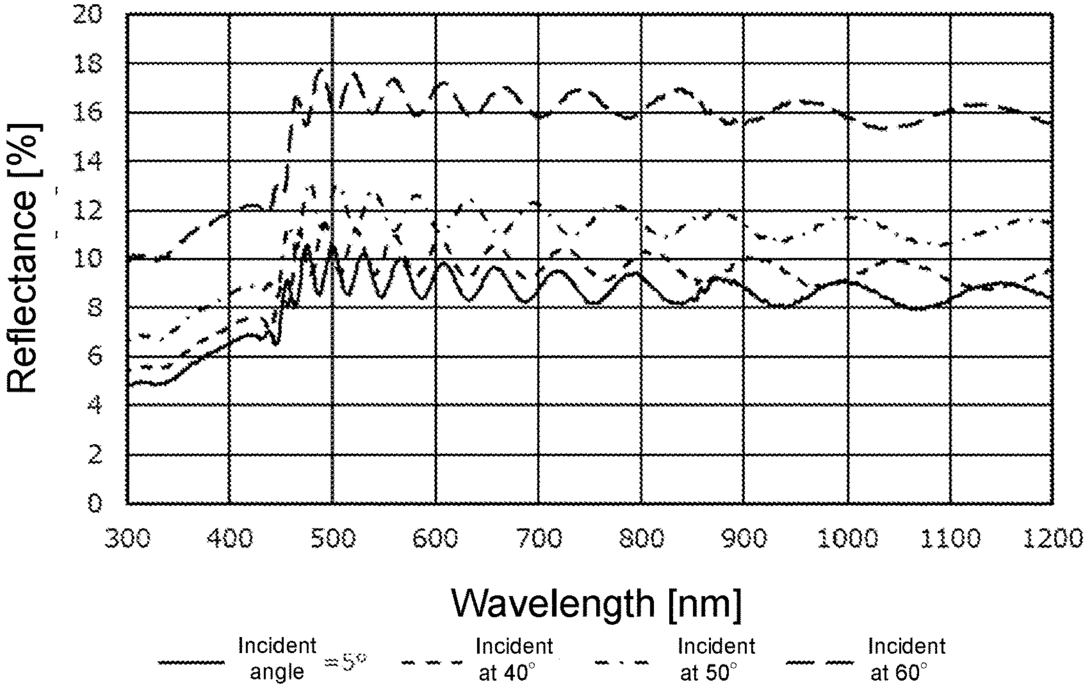
FIG. 40 shows reflection spectra of an optical filter according to Example 32.

The optical filter according to Example 21 yet to undergo the high-temperature and high-humidity test was left to stand in a heat cycle chamber, and a heat cycle test between 85° C. and −40° C. was performed 1008 cycles. The temperature inside the heat cycle chamber was kept at 85° C. and −40° C. for 30 minutes each. It took 5 minutes for the inside temperature to increase or decrease from either temperature to the other. A thermal shock tester TSA-103ES manufactured by ESPEC Corporation was used as the heat cycle chamber. The optical filter was taken out after 144 cycles and 576 cycles and was measured for transmission spectra. FIG. 32 shows transmission spectra of the optical filter according to Example 21 before and after the heat cycle test. The measurement was performed at 25° C. at an incident angle of 0°. Table 12 shows the values of $|\lambda^{HC\text{-}144}_{UV}-\lambda_{UV}|$ and $|T^{HC\text{-}144}_{480\text{-}600}-T^{m}_{480\text{-}600}|$, the values of $|\lambda^{HC\text{-}576}_{UV}-\lambda_{UV}|$ and $|T^{HC\text{-}576}_{480\text{-}600}-T^{m}_{480\text{-}600}|$, and the values of $|\lambda^{HC\text{-}1K}_{UV}-\lambda_{UV}|$ and $|T^{HC\text{-}1K}_{480\text{-}600}-T^{m}_{480\text{-}600}|$.

Examples 22 to 35

Light-absorbing compositions according to Examples 22 to 35 and optical filters including light-absorbing films according to Examples 22 to 35 were produced in the same manner as in Example 21 using the materials under the production conditions as shown in Table 1, Table 2 or 6, Table 7 and Table 8. For each of Examples 26 and 32, a transparent glass substrate provided with a fluorine compound coating was used; the light-absorbing film was formed on the transparent glass substrate and was then peeled off to obtain an optical filter consisting of the light-absorbing film.

Transmission spectra were measured for the optical filters according to Examples 22 to 35 at incident angles of 0°, 30°, 40°, 50°, 60°, and 70°. FIGS. 33 to 36 show the transmission spectra of the optical filters according to Examples 23, 24, 26, and 32. Table 8 shows the parameters obtained from the transmission spectra measured for the optical filters according to Examples 22 to 35 at an incident angle of 0°.

Reflection spectra were measured for the optical filters according to Examples 22 to 35 at incident angles of 5°, 40°, 50°, and 60°. FIGS. 37 to 40 show the reflection spectra of the optical filters according to Examples 23, 24, 26, and 32, respectively. Table 10 shows the maximum reflectances in the wavelength range of 300 nm to 450 nm and the maximum reflectances in the wavelength range of 300 nm to 600 nm in the reflection spectra of the optical filters according to Examples 21, 23, 24 to 29, and 32 at the incident angles.

The high-temperature and high-humidity test and the heat cycle test were performed for the optical filters according to Examples 23, 24, 26, and 32 in the same manner as in Example 21. Tables 11 and 12 show the parameters of the optical filters according to Examples 23, 24, 26, and 32 as for Example 21.

Example 36

An antireflection film was formed by coating on each principal surface of the optical filter according to Example 23 to obtain an optical filter according to Example 36. Each antireflection film included a single-layer film formed by the sol-gel process and including silicon oxide such as $SiO_2$. A liquid precursor (alkoxysilane-including composition) of the antireflection film was prepared, the liquid precursor containing at least an alkoxysilane compound and water. This alkoxysilane-including composition included methyltriethoxysilane (MTES) and tetraethoxysilane (TEOS) at a mass ratio of 4:1. This alkoxysilane-including composition further included water and ethanol as its solvent, and was prepared by mixing these components.

The alkoxysilane composition was applied to both surfaces of the optical filter according to Example 23 by spin coating. One of the surfaces of the optical filter is a surface of the light-absorbing film, and the other surface of the optical filter is a surface of the transparent glass substrate. In the application of the alkoxysilane composition, the alkoxysilane composition was applied to one of the surfaces to form a coating film, which was left at room temperature for 1 minutes for pre-drying, followed by application of the alkoxysilane composition to the other surface. Subsequently, a sintering treatment was performed at 160° C. for about 1 hour to evaporate and remove an excess of the solvent. The coating film was cured by hydrolysis and polycondensation of the alkoxysilane to obtain antireflection films. The optical filter according to Example 36 was obtained in this manner. Each of the antireflection films was porous and had a thickness of approximately 180 nm.

Figure 41:
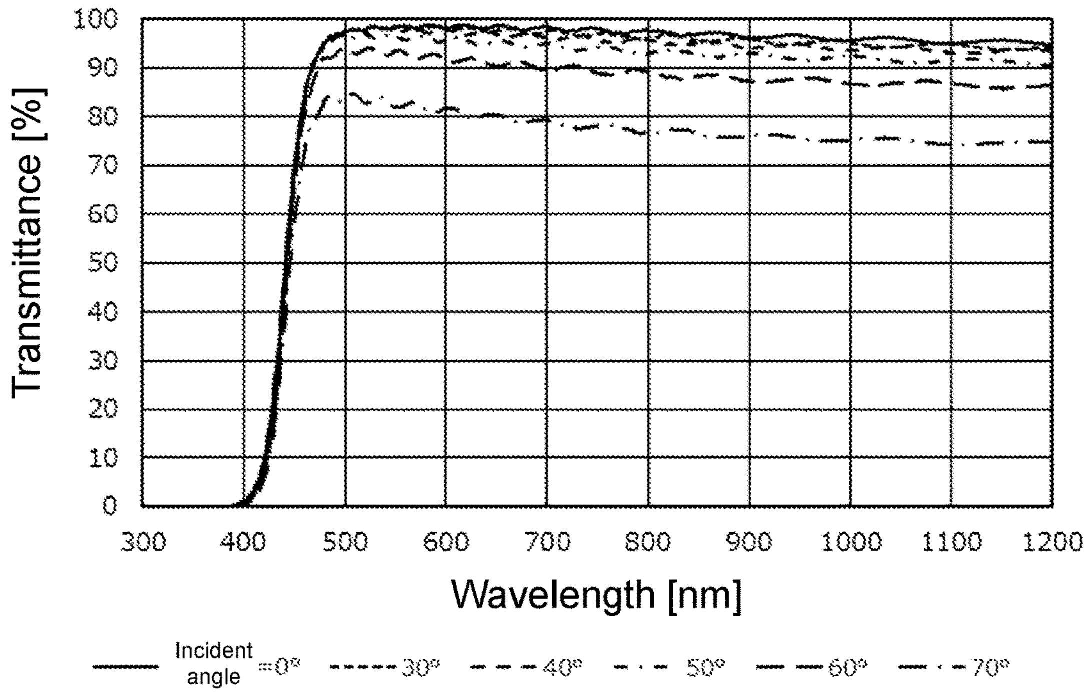
FIG. 41 shows transmission spectra of an optical filter according to Example 36.

Transmission spectra were measured for the optical filter according to Example 36 at incident angles of 0°, 30°, 40°, 50°, 60°, and 70°. FIG. 41 shows the transmission spectra of the optical filter according to Example 36. Table 8 shows the parameters obtained from the transmission spectrum measured for the optical filter according to Example 36 at an incident angle of 0°.

Figure 42:
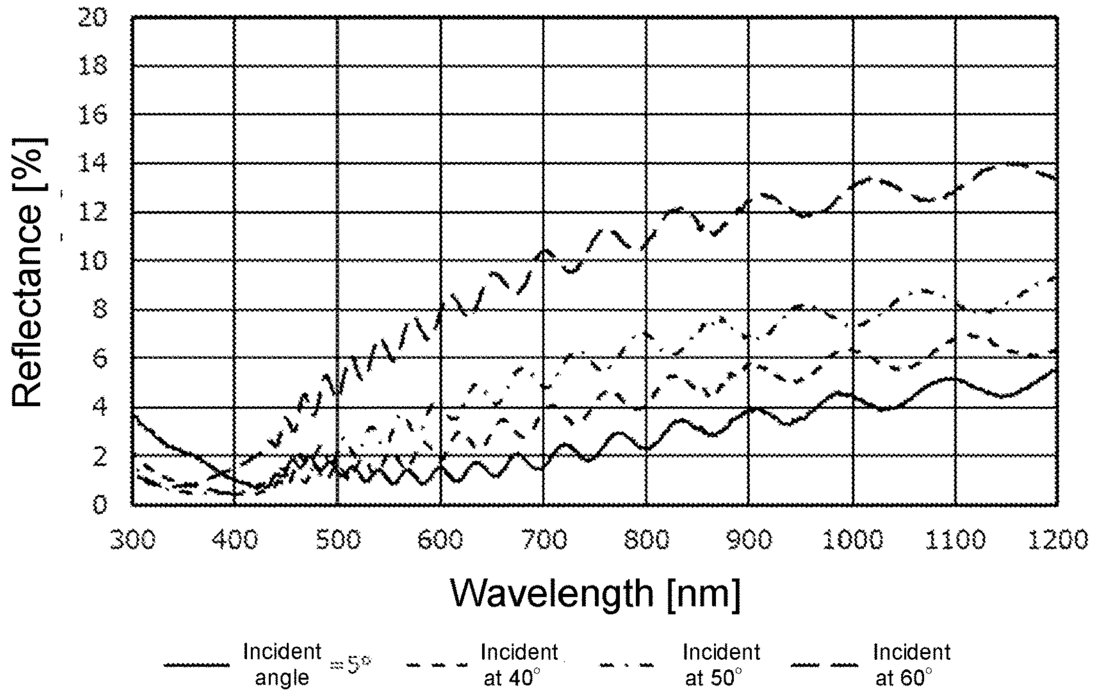
FIG. 42 shows a reflection spectrum of the optical filter according to Example 36.

Reflection spectra were measured for the optical filter according to Example 36 at incident angles of 5°, 40°, 50°, and 60°. FIG. 42 shows the reflection spectra of the optical filter. Table 10 shows the maximum reflectances in the wavelength range of 300 nm to 450 nm and the maximum reflectances in the wavelength range of 300 nm to 600 nm in the reflection spectra of the optical filter according to Example 36 at the incident angles.

Examples 37 to 41

Figure 43:
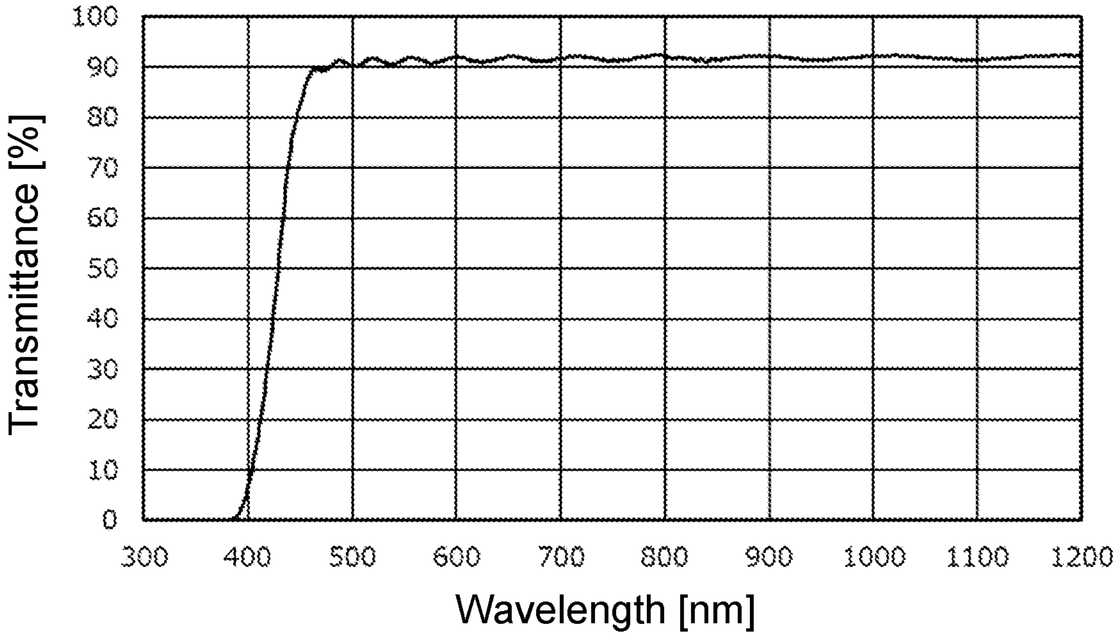
FIG. 43 shows a transmission spectrum of an optical filter according to Example 38.
Figure 44:
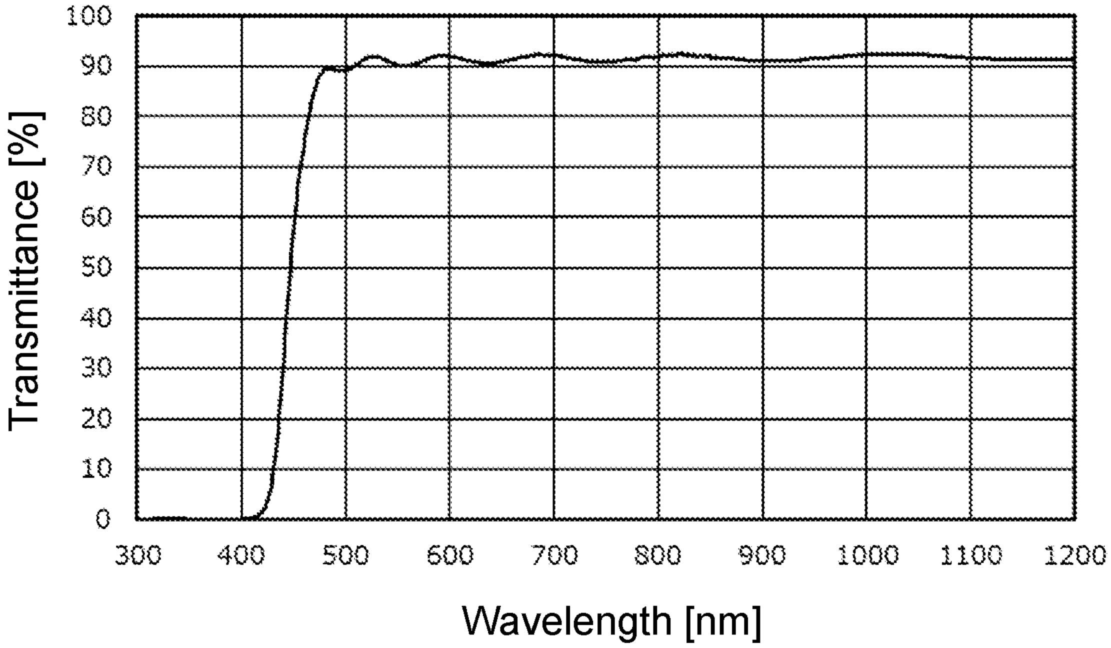
FIG. 44 shows a transmission spectrum of an optical filter according to Example 41.

Light-absorbing compositions according to Examples 37 to 41 and optical filters including light-absorbing films according to Examples 37 to 41 were produced in the same manner as in Example 21 using the materials under the production conditions as shown in Table 1, Table 2, Table 7 and Table 8. Transmission spectra were measured for the optical filters according to Examples 37 to 41 at incident angles of 0°, 30°, 40°, 50°, 60°, and 70°. FIG. 43 and FIG. 44 show the transmission spectra of the optical filters according to Examples 38 and 41, respectively. Table 8 shows the parameters obtained from the transmission spectra measured for the optical filters according to Examples 37 to 41 at an incident angle of 0°.

Comparative Example 6

Figure 45:
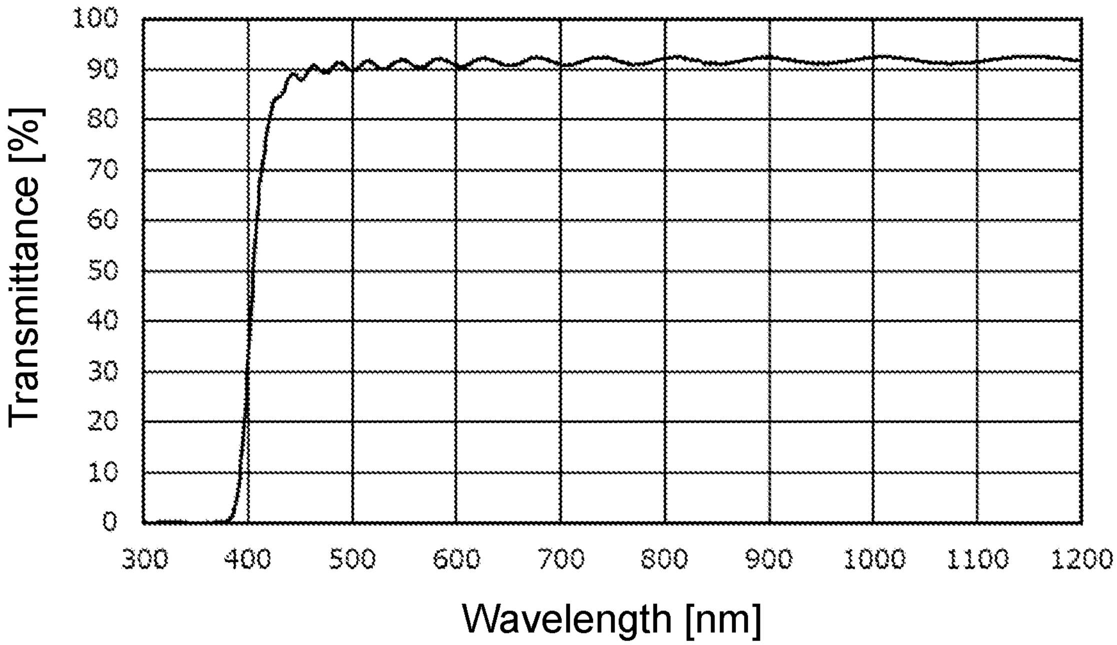
FIG. 45 shows a transmission spectrum of an optical filter according to Comparative Example 6.

A light-absorbing composition according to Comparative Example 6 and an optical filter including a light-absorbing film according to Comparative Example 6 were produced in the same manner as in Example 21 using the materials under the production conditions as shown in Table 1, Table 2, Table 7 and Table 8. Transmission spectra were measured for the optical filter according to Comparative Example 6 at incident angles of 0°, 30°, 40°, 50°, 60°, and 70°. FIG. 45 shows the transmission spectrum of the optical filter according to Comparative Example 6. Table 8 shows the parameters obtained from the transmission spectrum measured for the optical filter according to Comparative Example 6 at an incident angle of 0°.

TABLE 3

| | Ultraviolet absorber solution | | | Metal-component-including liquid composition | | Light-absorbing composition Added amount | |
|---|---|---|---|---|---|---|---|
| | UV absorber | UV absorber content [mass %] | Solvent | Metal-component-including compound | Metal-component-including compound content [mass %] | UV absorber solution [g] | Metal-component-including liquid composition [g] |
| Ex. 1 | (1-i) | 5.0 | Ethanol | (2-i) | 0.62 | 2.0 | 10.0 |
| Ex. 2 | (1-ii) | 2.0 | Toluene | (2-i) | 0.62 | 5.0 | 10.0 |
| Ex. 3 | (1-ii) | 2.0 | Toluene | (2-i) | 0.62 | 2.5 | 10.0 |
| Ex. 4 | (1-ii) | 2.0 | Toluene | (2-i) | 0.62 | 1.3 | 10.0 |
| Ex. 5 | (1-i) | 5.0 | Ethanol | (2-ii) | 0.71 | 2.0 | 10.0 |
| Ex. 6 | (1-i) | 5.0 | Ethanol | (2-ii) | 0.71 | 1.0 | 10.0 |
| Ex. 7 | (1-ii) | 2.0 | Toluene | (2-ii) | 0.71 | 5.0 | 10.0 |
| Ex. 8 | (1-ii) | 2.0 | Toluene | (2-ii) | 0.71 | 2.5 | 10.0 |
| Ex. 9 | (1-i) | 5.0 | Ethanol | (2-iii) | 1.59 | 2.0 | 10.0 |
| Ex. 10 | (1-i) | 5.0 | Ethanol | (2-iii) | 1.59 | 1.0 | 10.0 |
| Ex. 11 | (1-i) | 5.0 | Ethanol | (2-iii) | 1.59 | 0.5 | 10.0 |
| Ex. 12 | (1-i) | 5.0 | Ethanol | (2-iii) | 6.36 | 2.0 | 10.0 |
| Ex. 13 | (1-i) | 5.0 | Ethanol | (2-iii) | 6.36 | 1.0 | 10.0 |
| Ex. 14 | (1-i) | 5.0 | Ethanol | (2-iii) | 6.36 | 0.5 | 10.0 |
| Ex. 15 | (1-i) | 5.0 | Ethanol | (2-iii) | 12.73 | 2.0 | 10.0 |
| Ex. 16 | (1-i) | 5.0 | Ethanol | (2-iii) | 12.73 | 1.0 | 10.0 |
| Ex. 17 | (1-i) | 5.0 | Ethanol | (2-iii) | 12.73 | 0.5 | 10.0 |
| Ex. 18 | (1-ii) | 2.0 | Toluene | (2-iii) | 1.59 | 5.0 | 10.0 |
| Ex. 19 | (1-ii) | 2.0 | Toluene | (2-iii) | 1.59 | 2.5 | 10.0 |
| Ex. 20 | (1-iii) | 5.0 | Ethanol | (2-i) | 0.62 | 2.0 | 10.0 |

| | Light-absorbing composition | | | |
|---|---|---|---|---|
| | Content of component | | | |
| | UV absorber [mass %] | Metal component [mass %] | Mass ratio of ultraviolet absorber to metal component | Molar ratio of ultraviolet absorber to metal component |
| Ex. 1 | 0.83 | 0.03 | 24.75 | 2.71 |
| Ex. 2 | 0.67 | 0.03 | 24.75 | 2.43 |
| Ex. 3 | 0.40 | 0.03 | 12.37 | 1.22 |
| Ex. 4 | 0.22 | 0.04 | 6.19 | 0.61 |
| Ex. 5 | 0.83 | 0.07 | 12.47 | 2.42 |
| Ex. 6 | 0.45 | 0.07 | 6.24 | 1.21 |
| Ex. 7 | 0.67 | 0.05 | 12.47 | 2.18 |
| Ex. 8 | 0.40 | 0.06 | 6.24 | 1.09 |
| Ex. 9 | 0.83 | 0.17 | 4.78 | 0.93 |
| Ex. 10 | 0.45 | 0.19 | 2.39 | 0.46 |
| Ex. 11 | 0.24 | 0.20 | 1.20 | 0.23 |
| Ex. 12 | 0.83 | 0.70 | 1.20 | 0.23 |
| Ex. 13 | 0.45 | 0.76 | 0.60 | 0.12 |
| Ex. 14 | 0.24 | 0.80 | 0.30 | 0.06 |
| Ex. 15 | 0.83 | 1.40 | 0.60 | 0.12 |
| Ex. 16 | 0.45 | 1.53 | 0.30 | 0.06 |

TABLE 3-continued

| | | | | |
|---|---|---|---|---|
| Ex. 17 | 0.24 | 1.60 | 0.15 | 0.03 |
| Ex. 18 | 0.67 | 0.14 | 4.78 | 0.83 |
| Ex. 19 | 0.40 | 0.17 | 2.39 | 0.42 |
| Ex. 20 | 0.83 | 0.03 | 24.75 | 2.43 |

| | Light-absorbing film | | | |
|---|---|---|---|---|
| | Content of component | | Mass ratio of | Molar ratio of |
| | Ultraviolet absorber [mass %] | Metal component [mass %] | ultraviolet absorber to metal component | ultraviolet absorber to metal component |
| Ex. 1 | 1.96 | 0.08 | 24.75 | 2.71 |
| Ex. 2 | 1.96 | 0.08 | 24.75 | 2.43 |
| Ex. 3 | 0.99 | 0.08 | 12.37 | 1.22 |
| Ex. 4 | 0.50 | 0.08 | 6.19 | 0.61 |
| Ex. 5 | 1.96 | 0.16 | 12.47 | 2.42 |
| Ex. 6 | 0.99 | 0.16 | 6.24 | 1.21 |
| Ex. 7 | 1.96 | 0.16 | 12.47 | 2.18 |
| Ex. 8 | 0.99 | 0.16 | 6.24 | 1.09 |
| Ex. 9 | 1.95 | 0.41 | 4.78 | 0.93 |
| Ex. 10 | 0.99 | 0.41 | 2.39 | 0.46 |
| Ex. 11 | 0.50 | 0.41 | 1.20 | 0.23 |
| Ex. 12 | 1.93 | 1.61 | 1.20 | 0.23 |
| Ex. 13 | 0.97 | 1.63 | 0.60 | 0.12 |
| Ex. 14 | 0.49 | 1.64 | 0.30 | 0.06 |
| Ex. 15 | 1.90 | 3.18 | 0.60 | 0.12 |
| Ex. 16 | 0.96 | 3.21 | 0.30 | 0.06 |
| Ex. 17 | 0.48 | 3.23 | 0.15 | 0.03 |
| Ex. 18 | 1.95 | 0.41 | 4.78 | 0.83 |
| Ex. 19 | 0.99 | 0.41 | 2.39 | 0.42 |
| Ex. 20 | 1.96 | 0.08 | 24.75 | 2.43 |

TABLE 4

| | Ultraviolet absorber solution | | | Metal-component-including liquid composition | | Light-absorbing composition Added amount | |
|---|---|---|---|---|---|---|---|
| | Ultraviolet absorber | Ultraviolet absorber content [mass %] | Solvent | Metal-component-including compound | Metal-component-including compound content [mass %] | Ultraviolet absorber solution [g] | Metal-component-including liquid composition [g] |
| Comp. Ex. 1 | (1-i) | 5.0 | Ethanol | — | — | 2.0 | 10.0 |
| Comp. Ex. 2 | (1-ii) | 2.0 | Toluene | — | — | 5.0 | 10.0 |
| Comp. Ex. 3 | (1-iii) | 5.0 | Ethanol | — | — | 2.0 | 10.0 |
| Comp. Ex. 4 | (1-iv) | 5.0 | Ethanol | — | — | 2.0 | 10.0 |
| Comp. Ex. 5 | (1-iv) | 5.0 | Ethanol | (2-i) | 0.62 | 2.0 | 10.0 |

TABLE 4-continued

| | Light-absorbing composition: Content of component: Ultraviolet absorber [mass %] | Light-absorbing composition: Content of component: Metal component [mass %] | Mass ratio of ultraviolet absorber to metal component | Molar ratio of ultraviolet absorber to metal component |
|---|---|---|---|---|
| Comp. Ex. 1 | 0.83 | 0 | — | — |
| Comp. Ex. 2 | 0.67 | 0 | — | — |
| Comp. Ex. 3 | 0.83 | 0 | — | — |
| Comp. Ex. 4 | 0.83 | 0 | — | — |
| Comp. Ex. 5 | 0.83 | 0.03 | 24.75 | 3.66 |

| | Light-absorbing film: Content of component: Ultraviolet absorber [mass %] | Light-absorbing film: Content of component: Metal component [mass %] | Mass ratio of ultraviolet absorber to metal component | Molar ratio of ultraviolet absorber to metal component |
|---|---|---|---|---|
| Comp. Ex. 1 | 1.96 | 0 | — | — |
| Comp. Ex. 2 | 1.96 | 0 | — | — |
| Comp. Ex. 3 | 1.96 | 0 | — | — |
| Comp. Ex. 4 | 1.96 | 0 | — | — |
| Comp. Ex. 5 | 1.96 | 0.08 | 24.75 | 3.66 |

TABLE 5

| | Film thickness [μm] | Optical properties in transmission spectrum: Maximum transmittance in wavelength range of 300 nm to 380 nm [%] $T^{M}_{300\text{-}380}$ | Transmittance at wavelength of 400 nm [%] $T_{400}$ | Transmittance at wavelength of 410 nm [%] $T_{410}$ | Wavelength which lies in wavelength range of 350 nm to 500 nm and at which transmittance is 50% [nm] $\lambda_{UV}$ | Minimum transmittance in wavelength range of 480 nm to 600 nm [%] $T^{m}_{480\text{-}600}$ | Average transmittance in wavelength range of 550 nm to 570 nm [%] $T^{A}_{550\text{-}570}$ | Ratio between transmittance at ($\lambda_{UV}$ − 10) nm and transmittance at ($\lambda_{UV}$ + 10) nm $T^{0}_{UV+}/T^{0}_{UV-}$ |
|---|---|---|---|---|---|---|---|---|
| Ex. 1 | 31 | 0.11 | 0.92 | 2.20 | 442 | 88.32 | 90.41 | 2.95 |
| Ex. 2 | 46 | 0.10 | 0.39 | 1.26 | 444 | 90.57 | 92.20 | 3.00 |
| Ex. 3 | 63 | 0.04 | 0.73 | 1.99 | 444 | 89.02 | 90.79 | 2.79 |
| Ex. 4 | 127 | 0.09 | 0.96 | 2.36 | 443 | 90.03 | 91.32 | 2.80 |
| Ex. 5 | 91 | 0.01 | 0.01 | 0.02 | 462 | 77.62 | 92.06 | 2.36 |
| Ex. 6 | 90 | 0.02 | 0.10 | 0.28 | 456 | 82.14 | 92.04 | 2.28 |
| Ex. 7 | 60 | 0.01 | 0.12 | 0.31 | 457 | 82.86 | 91.86 | 2.36 |
| Ex. 8 | 74 | 0.07 | 0.41 | 0.76 | 454 | 83.89 | 92.04 | 2.39 |
| Ex. 9 | 54 | 0.13 | 0.82 | 1.55 | 475 | 57.90 | 91.98 | 1.79 |
| Ex. 10 | 38 | 0.01 | 0.03 | 0.08 | 484 | 44.05 | 91.67 | 1.89 |
| Ex. 11 | 94 | 0.09 | 0.52 | 1.01 | 481 | 49.25 | 90.76 | 1.85 |
| Ex. 12 | 18 | 0.68 | 0.67 | 0.94 | 480 | 51.05 | 91.84 | 1.88 |
| Ex. 13 | 35 | 0.49 | 0.84 | 1.31 | 479 | 53.11 | 91.52 | 1.90 |
| Ex. 14 | 47 | 0.54 | 0.91 | 1.43 | 480 | 50.40 | 91.93 | 1.95 |
| Ex. 15 | 18 | 0.51 | 0.87 | 1.37 | 475 | 58.74 | 91.87 | 1.92 |
| Ex. 16 | 23 | 0.65 | 0.95 | 1.46 | 477 | 55.58 | 91.58 | 1.95 |
| Ex. 17 | 53 | 0.83 | 0.97 | 1.41 | 481 | 49.77 | 91.42 | 1.97 |
| Ex. 18 | 54 | 0.01 | 0.41 | 0.83 | 471 | 63.82 | 91.81 | 1.85 |
| Ex. 19 | 68 | 0.14 | 0.90 | 1.45 | 473 | 61.12 | 91.92 | 1.84 |
| Ex. 20 | 160 | 0.02 | 0.89 | 2.84 | 445 | 89.60 | 91.63 | 2.38 |
| Comp. Ex. 1 | 30 | 1.17 | 55.25 | 79.47 | 399 | 90.38 | 91 | 5.75 |
| Comp. Ex. 2 | 32 | 0.64 | 36.39 | 71.24 | 404 | 90.49 | 91.06 | 5.18 |
| Comp. Ex. 3 | 15 | 1.22 | 50.25 | 74.18 | 400 | 90.63 | 91.16 | 4.37 |
| Comp. Ex. 4 | 61 | 87.89 | 91.11 | 91.23 | 350 | 91.84 | 92.03 | 1.3 |
| Comp. Ex. 5 | 71 | 88.7 | 91.66 | 91.61 | 350 | 91.9 | 92.12 | 1.3 |

TABLE 6

| Metal-component-including compound | Metal component | Name of complex salt | Solvent and solvent content [mass %] | Metal component content [mass %] |
|---|---|---|---|---|
| (2-iv) | Al | Aluminum bis(ethyl acetoacetate) mono(acetylacetonate) | 2-Propanol 24.0 | 5.3 |

TABLE 6-continued

| Metal-component-including compound | Metal component | Name of complex salt | Solvent and solvent content [mass %] | Metal component content [mass %] |
|---|---|---|---|---|
| (2-v) | Ti | Titanium diisopropoxy bis(acetylacetonate) | 2-Propanol 25.0 | 9.9 |
| (2-vi) | Ti | Titanium tetraacetylacetonate | 2-Propanol 35.0 | 7.0 |

TABLE 7

| | Ultraviolet absorber: Ultraviolet absorber | Ultraviolet absorber: Added amount [g] | Metal-component-including compound: Metal-component-including compound | Metal-component-including compound: Added amount [g] | Curable resin: PVB [g] | Curable resin: PVF [g] | Solvent | Mass ratio of ultraviolet absorber to metal component | Molar ratio of ultraviolet absorber to metal component | Ultraviolet absorber content in light-absorbing composition [mass %] | Metal component content in light-absorbing composition [mass %] |
|---|---|---|---|---|---|---|---|---|---|---|---|
| Ex. 21 | (1-i) | 5.0 | (2-i) | 0.308 | 8.0 | 0 | 80.0 | 249.75 | 27.37 | 5.36 | 0.021 |
| Ex. 22 | (1-i) | 5.0 | (2-i) | 0.431 | 0 | 8.0 | 80.0 | 178.48 | 19.56 | 5.36 | 0.021 |
| Ex. 23 | (1-ii) | 5.0 | (2-i) | 0.554 | 8.0 | 0 | 80.0 | 138.85 | 13.66 | 5.35 | 0.030 |
| Ex. 24 | (1-i) | 5.0 | (2-iv) | 0.792 | 8.0 | 0 | 80.0 | 119.12 | 13.05 | 5.34 | 0.038 |
| Ex. 25 | (1-ii) | 5.0 | (2-iv) | 0.906 | 8.0 | 0 | 80.0 | 104.13 | 10.24 | 5.33 | 0.045 |
| Ex. 26 | (1-i) | 5.0 | (2-v) | 0.545 | 8.0 | 0 | 80.0 | 92.67 | 18.02 | 5.32 | 0.051 |
| Ex. 27 | (1-i) | 5.0 | (2-vi) | 0.857 | 8.0 | 0 | 80.0 | 83.35 | 16.2 | 5.35 | 0.058 |
| Ex. 28 | (1-i) | 5.0 | (2-i) | 1.015 | 8.0 | 0 | 80.0 | 75.79 | 8.3 | 5.33 | 0.064 |
| Ex. 29 | (1-i) | 5.0 | (2-i) | 1.108 | 0 | 8.0 | 80.0 | 69.43 | 7.61 | 5.32 | 0.070 |
| Ex. 30 | (1-i) | 5.0 | (2-iv) | 1.200 | 0 | 8.0 | 80.0 | 64.1 | 7.02 | 5.31 | 0.077 |
| Ex. 31 | (1-i) | 5.0 | (2-i) | 1.292 | 8.0 | 0 | 80.0 | 59.54 | 6.52 | 5.31 | 0.083 |
| Ex. 32 | (1-i) | 5.0 | (2-v) | 0.474 | 8.0 | 0 | 80.0 | 55.52 | 27.78 | 5.30 | 0.089 |
| Ex. 33 | (1-i) | 5.0 | (2-i) | 1.477 | 8.0 | 0 | 80.0 | 52.08 | 5.71 | 5.35 | 0.096 |
| Ex. 34 | (1-i) | 5.0 | (2-i) | 1.569 | 8.0 | 0 | 80.0 | 49.03 | 5.37 | 5.29 | 0.102 |
| Ex. 35 | (1-i) | 5.0 | (2-i) | 1.754 | 8.0 | 0 | 80.0 | 43.86 | 4.81 | 5.29 | 0.108 |
| Ex. 36 | (1-ii) | 5.0 | (2-i) | 0.554 | 8.0 | 0 | 80.0 | 138.85 | 13.66 | 5.28 | 0.120 |
| Ex. 37 | (1-i) | 5.0 | (2-i) | 0.160 | 0 | 8.0 | 80.0 | 480.77 | 52.68 | 5.37 | 0.011 |
| Ex. 38 | (1-i) | 5.0 | (2-i) | 0.231 | 8.0 | 0 | 80.0 | 333.00 | 36.49 | 5.36 | 0.016 |
| Ex. 39 | (1-i) | 5.0 | (2-i) | 1.938 | 8.0 | 0 | 80.0 | 39.69 | 4.35 | 5.27 | 0.133 |
| Ex. 40 | (1-i) | 5.0 | (2-i) | 1.938 | 8.0 | 0 | 80.0 | 39.69 | 4.35 | 5.27 | 0.133 |
| Ex. 41 | (1-i) | 5.0 | (2-i) | 1.938 | 8.0 | 0 | 80.0 | 39.69 | 4.35 | 5.27 | 0.133 |
| Comp. Ex. 6 | (1-i) | 5.0 | — | 0 | 8.0 | 0 | 80.0 | — | — | 5.38 | 0.000 |

TABLE 8

| | Production conditions (Light-absorbing film): Rotation speed in spin coating [rpm] | Production conditions (Light-absorbing film): Film thickness [μm] | Optical properties in transmission spectrum: Maximum transmittance in wavelength range of 300 nm to 380 nm [%] $T^{M}_{300\text{-}380}$ | Transmittance at wavelength of 400 nm [%] $T_{400}$ | Transmittance at wavelength of 410 nm [%] $T_{410}$ | Wavelength which lies in wavelength range of 350 nm to 500 nm and at which transmittance is 50% [nm] $\lambda_{UV}$ | Minimum transmittance in wavelength range of 480 nm to 600 nm [%] $T^{m}_{480\text{-}600}$ | Average transmittance in wavelength range of 550 nm to 570 nm [%] $T^{A}_{550\text{-}570}$ | Ratio between transmittance at ($\lambda_{UV}$ − 10) nm and transmittance at ($\lambda_{UV}$ + 10) nm $T^{0}_{UV+}/T^{0}_{UV-}$ |
|---|---|---|---|---|---|---|---|---|---|
| Ex. 21 | 500 | 2.3 | 0.04 | 3.06 | 8.71 | 434 | 89.54 | 91.68 | 2.63 |
| Ex. 22 | 500 | 2.4 | 0.02 | 1.47 | 4.54 | 437 | 89.26 | 91.33 | 2.92 |
| Ex. 23 | 500 | 2.4 | 0.02 | 0.91 | 3.03 | 439 | 89.00 | 91.25 | 2.94 |
| Ex. 24 | 500 | 2.6 | 0.02 | 0.48 | 1.73 | 441 | 89.28 | 91.12 | 3.09 |
| Ex. 25 | 500 | 2.8 | 0.02 | 0.22 | 0.88 | 443 | 88.88 | 91.31 | 3.16 |
| Ex. 26 | 500 | 2.8 | 0.02 | 0.12 | 0.48 | 444 | 88.39 | 91.21 | 3.35 |
| Ex. 27 | 500 | 2.9 | 0.02 | 0.07 | 0.30 | 445 | 89.22 | 91.01 | 3.41 |
| Ex. 28 | 500 | 2.8 | 0.02 | 0.05 | 0.22 | 446 | 88.94 | 90.64 | 3.46 |
| Ex. 29 | 500 | 2.9 | 0.02 | 0.03 | 0.13 | 447 | 88.05 | 91.35 | 3.50 |
| Ex. 30 | 500 | 2.8 | 0.02 | 0.02 | 0.09 | 448 | 88.81 | 90.51 | 3.43 |
| Ex. 31 | 500 | 2.5 | 0.02 | 0.02 | 0.06 | 448 | 88.76 | 90.81 | 3.72 |
| Ex. 32 | 500 | 2.7 | 0.02 | 0.01 | 0.04 | 449 | 87.94 | 90.85 | 3.70 |
| Ex. 35 | 1000 | 2.1 | 0.05 | 0.02 | 0.06 | 450 | 88.02 | 91.46 | 3.33 |

TABLE 8-continued

| | Production conditions (Light-absorbing film) | | Optical properties in transmission spectrum | | | | | | |
|---|---|---|---|---|---|---|---|---|---|
| | Rotation speed in spin coating [rpm] | Film thickness [μm] | Maximum transmittance in wavelength range of 300 nm to 380 nm [%] $T^M_{300\text{-}380}$ | Transmittance at wavelength of 400 nm [%] $T_{400}$ | Transmittance at wavelength of 410 nm [%] $T_{410}$ | Wavelength which lies in wavelength range of 350 nm to 500 nm and at which transmittance is 50% [nm] $\lambda_{UV}$ | Minimum transmittance in wavelength range of 480 nm to 600 nm [%] $T^m_{480\text{-}600}$ | Average transmittance in wavelength range of 550 nm to 570 nm [%] $T^A_{550\text{-}570}$ | Ratio between transmittance at $(\lambda_{UV} - 10)$ nm and transmittance at $(\lambda_{UV} + 10)$ nm $T^0_{UV+}/T^0_{UV-}$ |
| Ex. 36 | 500 | 2.8 | 0.03 | 1.12 | 3.37 | 441 | 95.35 | 98.53 | 2.73 |
| Ex. 37 | 500 | 2.5 | 0.06 | 9.74 | 24.83 | 425 | 89.48 | 91.10 | 2.09 |
| Ex. 38 | 500 | 2.5 | 0.06 | 6.70 | 17.21 | 429 | 90.20 | 91.64 | 2.30 |
| Ex. 39 | 500 | 2.8 | 0.02 | 0.01 | 0.01 | 454 | 85.32 | 91.24 | 3.27 |
| Ex. 40 | 1000 | 2.1 | 0.04 | 0.01 | 0.04 | 451 | 86.00 | 90.19 | 3.19 |
| Ex. 41 | 2000 | 1.6 | 0.28 | 0.11 | 0.31 | 447 | 89.07 | 90.29 | 3.13 |
| Comp. Ex. 6 | 500 | 2.9 | 0.33 | 32.14 | 64.20 | 406 | 89.61 | 90.83 | 3.90 |

TABLE 9

| | $\lvert\lambda^{30}_{UV} - \lambda_{UV}\rvert$ [nm] | $\lvert\lambda^{40}_{UV} - \lambda_{UV}\rvert$ [nm] | $\lvert\lambda^{50}_{UV} - \lambda_{UV}\rvert$ [nm] | $\lvert\lambda^{60}_{UV} - \lambda_{UV}\rvert$ [nm] | $\lvert\lambda^{70}_{UV} - \lambda_{UV}\rvert$ [nm] |
|---|---|---|---|---|---|
| Example 21 | 1 | 2 | 3 | 4 | 8 |
| Example 23 | 1 | 1 | 2 | 4 | 7 |
| Example 24 | 1 | 1 | 3 | 4 | 8 |
| Example 25 | 1 | 1 | 2 | 4 | 7 |
| Example 26 | 1 | 2 | 2 | 4 | 7 |
| Example 27 | 1 | 1 | 2 | 4 | 7 |
| Example 29 | 1 | 1 | 2 | 4 | 8 |
| Example 32 | 1 | 2 | 2 | 4 | 8 |
| Example 36 | 1 | 1 | 2 | 3 | 5 |

TABLE 10

| | Maximum reflectance in wavelength range of 300 nm to 450 nm (Incident angle: 5°) [%] $R^5_{300\text{-}450}$ | Maximum reflectance in wavelength range of 300 nm to 600 nm (Incident angle: 5°) [%] $R^5_{300\text{-}600}$ | Maximum reflectance in wavelength range of 300 nm to 450 nm (Incident angle: 40°) [%] $R^{40}_{300\text{-}450}$ | Maximum reflectance in wavelength range of 300 nm to 600 nm (Incident angle: 40°) [%] $R^{40}_{300\text{-}600}$ | Maximum reflectance in wavelength range of 300 nm to 450 nm (Incident angle: 60°) [%] $R^{60}_{300\text{-}450}$ | Maximum reflectance in wavelength range of 300 nm to 600 nm (Incident angle: 60°) [%] $R^{60}_{300\text{-}600}$ |
|---|---|---|---|---|---|---|
| Ex. 21 | 9.5 | 10.2 | 10.0 | 11.1 | 15.0 | 17.5 |
| Ex. 23 | 8.0 | 10.1 | 10.1 | 11.3 | 15.5 | 17.3 |
| Ex. 24 | 8.3 | 10.3 | 9.6 | 11.5 | 15.9 | 18.0 |
| Ex. 25 | 8.0 | 10.1 | 9.5 | 11.5 | 15.5 | 18.1 |
| Ex. 26 | 7.7 | 10.2 | 9.6 | 11.4 | 14.1 | 18.0 |
| Ex. 27 | 8.5 | 10.2 | 8.3 | 11.3 | 14.3 | 17.6 |
| Ex. 29 | 7.5 | 10.3 | 8.9 | 11.5 | 14.6 | 18.1 |
| Ex. 32 | 7.7 | 10.6 | 8.8 | 11.5 | 13.0 | 17.7 |
| Ex. 36 | 3.7 | 3.7 | 2.2 | 2.6 | 3.6 | 7.9 |

TABLE 11

| | 240 hours later | | 480 hours later | | 1008 hours later | |
|---|---|---|---|---|---|---|
| | $\lvert\lambda^{DH\text{-}240}_{UV} - \lambda_{UV}\rvert$ [nm] | $\lvert T^{DH240}_{480\text{-}600} - T^m_{480\text{-}660}\rvert$ [%] | $\lvert\lambda^{DH\text{-}480}_{UV} - \lambda_{UV}\rvert$ [nm] | $\lvert T^{DH480}_{480\text{-}600} - T^m_{480\text{-}660}\rvert$ [%] | $\lvert\lambda^{DH\text{-}1K}_{UV} - \lambda_{UV}\rvert$ [nm] | $\lvert T^{DH\text{-}1K}_{480\text{-}600} - T^m_{480\text{-}660}\rvert$ [%] |
| Example 21 | 1 | 0.3 | 1 | 0.6 | 1 | 0.5 |
| Example 23 | 1 | 0.4 | 1 | 0.6 | 2 | 0.8 |
| Example 24 | 1 | 0.3 | 2 | 1.1 | 2 | 1.6 |
| Example 26 | 1 | 0.7 | 1 | 0.9 | 3 | 1.1 |

TABLE 11-continued

| | 240 hours later | | 480 hours later | | 1008 hours later | |
|---|---|---|---|---|---|---|
| | $\|\lambda^{DH\text{-}240}_{UV} - \lambda_{UV}\|$ [nm] | $\|T^{DH240}_{480\text{-}600} - T^{m}_{480\text{-}660}\|$ [%] | $\|\lambda^{DH\text{-}480}_{UV} - \lambda_{UV}\|$ [nm] | $\|T^{DH480}_{480\text{-}600} - T^{m}_{480\text{-}660}\|$ [%] | $\|\lambda^{DH\text{-}1K}_{UV} - \lambda_{UV}\|$ [nm] | $\|T^{DH\text{-}1K}_{480\text{-}600} - T^{m}_{480\text{-}660}\|$ [%] |
| Example 32 | 1 | 0.4 | 2 | 0.8 | 1 | 0.9 |
| Example 36 | 1 | 0.3 | 1 | 0.5 | 2 | 0.5 |

TABLE 12

| | 144 cycles later | | 576 cycles later | | 1008 cycles later | |
|---|---|---|---|---|---|---|
| | $\|\lambda^{HC\text{-}144}_{UV} - \lambda_{UV}\|$ [nm] | $\|T^{HC\text{-}144}_{480\text{-}600} - T^{m}_{480\text{-}660}\|$ [%] | $\|\lambda^{HC\text{-}576}_{UV} - \lambda_{UV}\|$ [nm] | $\|T^{HC\text{-}576}_{480\text{-}600} - T^{m}_{480\text{-}660}\|$ [%] | $\|\lambda^{HC\text{-}1K}_{UV} - \lambda_{UV}\|$ [nm] | $\|T^{HC\text{-}1K}_{480\text{-}600} - T^{m}_{480\text{-}660}\|$ [%] |
| Example 21 | 1 | 0.4 | 1 | 0.4 | 1 | 0.5 |
| Example 23 | 1 | 0.3 | 2 | 0.4 | 2 | 0.7 |
| Example 24 | 0 | 0.3 | 1 | 0.5 | 1 | 0.5 |
| Example 26 | 1 | 0.6 | 2 | 0.8 | 3 | 1.0 |
| Example 32 | 1 | 0.3 | 2 | 0.5 | 2 | 0.8 |
| Example 36 | 0 | 0.3 | 0 | 0.5 | 2 | 0.5 |

The invention claimed is:

1. A light-absorbing composition comprising:

an ultraviolet absorber including at least one selected from the group consisting of a benzophenone-based compound represented by the following formula (A1) and a salicylic-acid-based compound represented by the following formula (B)

(A1)

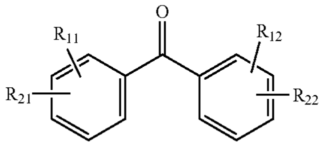

where at least one of $R_{11}$, $R_{12}$, $R_{21}$, and $R_{22}$ is a hydroxy group; and in the case where the $R_{11}$, the $R_{12}$, the $R_{21}$, or the $R_{22}$ is a functional group other than a hydroxy group, a plurality of the $R_{11s}$, a plurality of the $R_{12s}$, a plurality of the $R_{21s}$, or a plurality of the $R_{22s}$ are optionally present and at least one of the $R_{11}$, the $R_{12}$, the $R_{21}$, and the $R_{22}$ is optionally absent, (B)

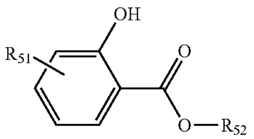

where $R_{51}$ is optionally a hydroxy group, a carboxy group, a halogen-containing group, an alkyl group having 1 to 12 carbon atoms, an aryl group having 6 to 12 carbon atoms, or an alkoxy group having 1 to 12 carbon atoms; a plurality of the $R_{51s}$ are optionally present or the $R_{51}$ is optionally absent; and $R_{52}$ is a hydrogen atom, an aryl group, or a halogenated aryl group in which one or more hydrogen atoms are substituted by a halogen atom; and a metal component-compound including a metal component and an organic oxy group to which at least a portion of the metal component is bonded.

2. The light-absorbing composition according to claim 1, wherein the light-absorbing composition is capable of being cured to form a light-absorbing film, and wherein a transmitted light incident on the light-absorbing film at an incident angle of 0° has a transmittance spectrum that includes a transmittance $T_{400}$ of 5% or less at a wavelength of 400 nm.

3. The light-absorbing composition according to claim 1, wherein the benzophenone-based compound represented by the following formula (A1) includes a compound represented by the following formula (A2):

(A2)

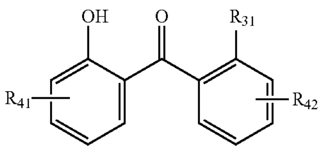

where $R_{31}$ is a hydrogen atom, a hydroxy group, a carboxyl group, an aldehyde group, a halogen atom, a halogen-containing group, an alkyl group having 1 to 12 carbon atoms, or an alkoxy group having 1 to 12 carbon atoms; $R_{41}$ and $R_{42}$ are each optionally a hydroxy group, a carboxyl group, an aldehyde group, a halogen-containing group, an alkyl group having 1 to 12 carbon atoms, an aryl group having 6 to 12 carbon atoms, or an alkoxy group having 1 to 12 carbon atoms, or the $R_{41}$ and the $R_{42}$ are optionally absent; and a plurality of the $R_{41s}$ are optionally present and a plurality of the $R_{42}$s are optionally present.

4. The light-absorbing composition according to claim 1, wherein the metal component-compound includes an alkoxide including the metal component.

5. The light-absorbing composition according to claim 1, wherein the metal component includes at least one selected from the group consisting of Li, Na, Mg, Ca, Sr, Ba, Ge, Sn, Pb, Al, Ga, In, Tl, Zn, Cd, Cu, Ag, Au, Ni, Pd, Pt, Co, Rh, Ir, Fe, Mn, Cr, Mo, W, V, Nb, Ta, Ti, and Zr.

6. The light-absorbing composition according to claim 1, wherein a molar ratio of the ultraviolet absorber to the metal component is 0.001 to 10.

7. A method for producing a light-absorbing film, the method comprising:

applying the light-absorbing composition according to claim 1 on a substrate; and heating the light-absorbing composition at a temperature of 120° C. or higher.

8. A light-absorbing film comprising:

an ultraviolet absorber including at least one selected from the group consisting of a benzophenone-based compound represented by the following formula (A1) and a salicylic-acid-based compound represented by the following formula (B)

(A1)

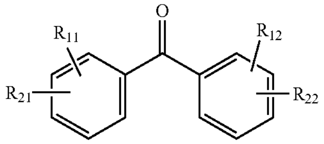

where at least one of $R_{11}$, $R_{12}$, $R_{21}$, and $R_{22}$ is a hydroxy group; and in the case where the $R_{11}$, the $R_{12}$, the $R_{21}$, or the $R_{22}$ is a functional group other than a hydroxy group, a plurality of the $R_{11s}$, a plurality of the $R_{12s}$, a plurality of the $R_{21s}$, or a plurality of the $R_{22s}$ are optionally present and at least one of the $R_{11}$, the $R_{12}$, the $R_{21}$, and the $R_{22}$ is optionally absent, (B)

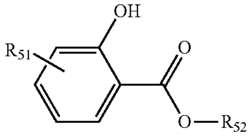

where $R_{51}$ is optionally a hydroxy group, a carboxy group, a halogen-containing group, an alkyl group having 1 to 12 carbon atoms, an aryl group having 6 to 12 carbon atoms, or an alkoxy group having 1 to 12 carbon atoms; a plurality of the $R_{51s}$ are optionally present or the $R_{51}$ is optionally absent; and $R_{52}$ is a hydrogen atom, an aryl group, or a halogenated aryl group in which one or more hydrogen atoms are substituted by a halogen atom; and a metal component-compound including a metal component and an organic oxy group to which at least a portion of the metal component is bonded.

9. The light-absorbing film according to claim 8, wherein a transmitted light incident on the light-absorbing film at an incident angle of 0° has a transmittance spectrum that includes a transmittance T400 of 5% or less at a wavelength of 400 nm.

10. The light-absorbing film according to claim 8, wherein the benzophenone-based compound represented by the following formula (A1) include a compound represented by the following formula (A2):

(A2)

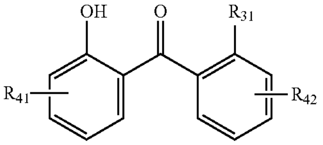

where $R_{31}$ is a hydrogen atom, a hydroxy group, a carboxyl group, an aldehyde group, a halogen atom, a halogen-containing group, an alkyl group having 1 to 12 carbon atoms, or an alkoxy group having 1 to 12 carbon atoms; $R_{41}$ and $R_{42}$ are each optionally a hydroxy group, a carboxyl group, an aldehyde group, a halogen-containing group, an alkyl group having 1 to 12 carbon atoms, an aryl group having 6 to 12 carbon atoms, or an alkoxy group having 1 to 12 carbon atoms, or the $R_{41}$ and the $R_{42}$ are optionally absent; and a plurality of the $R_{41}$s are optionally present and a plurality of the $R_{42}$s are optionally present.

11. The light-absorbing film according to claim 8, wherein the metal component-compound includes an alkoxide including the metal component.

12. The light-absorbing film according to claim 8, wherein the metal component includes at least one selected from the group consisting of Li, Na, Mg, Ca, Sr, Ba, Ge, Sn, Pb, Al, Ga, In, Tl, Zn, Cd, Cu, Ag, Au, Ni, Pd, Pt, Co, Rh, Ir, Fe, Mn, Cr, Mo, W, V, Nb, Ta, Ti, and Zr.

13. An optical filter comprising the light-absorbing film according to claim 8.

14. The optical filter according to claim 13, wherein a transmitted light incident on the optical filter at an incident angle of 0° has a transmittance spectrum that includes a maximum transmittance $T^{M}_{300\text{-}380}$ of 3% or less in a wavelength range of 300 to 380 nm.

15. The optical filter according to claim 14, wherein the transmittance spectrum includes an ultraviolet cut-off wavelength Av at which a transmittance is 50% and that is in a wavelength range of 405 nm to 500 nm.

16. The optical filter according to claim 14, wherein the transmittance spectrum includes an average transmittance $T^{A}_{550\text{-}570}$ of 87% or more in a wavelength range of 550 to 570 nm.

* * * * *